United States Patent

Negishi

[19]

[11] Patent Number: 6,166,750
[45] Date of Patent: Dec. 26, 2000

[54] IMAGE PROCESSING APPARATUS AND METHOD FOR ADDING PREDETERMINED ADDITIONAL INFORMATION TO AN IMAGE BY ADDING A PREDETERMINED NUMBER OF UNIT DOTS TO PARTIAL COLOR COMPONENT DATA OF THE IMAGE

[75] Inventor: Akira Negishi, Fujisawa, Japan

[73] Assignee: Canon Kabushiki Kaisha, Tokyo, Japan

[21] Appl. No.: 08/009,735

[22] Filed: Jan. 27, 1993

[30] Foreign Application Priority Data

Jan. 31, 1992 [JP] Japan ..................................... 4-017046
Feb. 27, 1992 [JP] Japan ..................................... 4-041033

[51] Int. Cl.[7] ............................. B41J 2/415; G03G 13/04
[52] U.S. Cl. ......................................... 347/131; 358/296
[58] Field of Search ..................................... 358/443, 448, 358/380, 256, 296; 350/18; 355/133; 382/2, 17; 347/131; 399/181

[56] References Cited

U.S. PATENT DOCUMENTS

| | | |
|---|---|---|
| 3,997,873 | 12/1976 | Thornton . |
| 4,709,274 | 11/1987 | Tanioka . |
| 4,723,149 | 2/1988 | Harada . |
| 4,739,377 | 4/1988 | Allen . |
| 4,780,806 | 10/1988 | Wada et al. . |
| 4,788,575 | 11/1988 | Ito et al. . |
| 4,870,503 | 9/1989 | Miura . |
| 4,891,666 | 1/1990 | Gordon . |
| 4,908,873 | 3/1990 | Philibert et al. . |
| 5,047,864 | 9/1991 | Fujito . |
| 5,097,348 | 3/1992 | Suetaka . |
| 5,126,838 | 6/1992 | Ohsawa et al. . |
| 5,149,140 | 9/1992 | Mowry, Jr. et al. . |
| 5,216,724 | 6/1993 | Suzuki et al. . |
| 5,327,258 | 7/1994 | Ueda . |
| 5,457,540 | 10/1995 | Kajita . |

FOREIGN PATENT DOCUMENTS

| | | |
|---|---|---|
| 079153 | 5/1983 | European Pat. Off. . |
| 0342060 | 11/1989 | European Pat. Off. . |
| 342060 | 11/1989 | European Pat. Off. . |
| 3229616 | 2/1984 | Germany . |
| 60-229572 | 11/1985 | Japan . |
| 01061777 | 3/1989 | Japan . |
| 64-61777 | 3/1989 | Japan . |
| 60229572 | 11/1992 | Japan . |
| 2101376 | 1/1983 | United Kingdom . |

OTHER PUBLICATIONS

"Hitachi—IP/200 High–Performance Image Processor", Hitachi Review, No. 4, Tokyo, Japan, pp. 195–204 (Aug. 1989).

*Primary Examiner*—John Barlow
*Assistant Examiner*—Raquel Yvette Gordon
*Attorney, Agent, or Firm*—Fitzpatrick, Cella, Harper & Scinto

[57] ABSTRACT

Provided are an image processing method and apparatus in which there is little deterioration in picture quality when specific information specifying a copying machine or the user thereof is added to image data. Pixel data in an 8×4 array at a predetermined position of the image data is modulated by subtracting a predetermined value α from 2×4 pixel data 2302 and 2×4 pixel data 2303 and adding the predetermined value a to 4×4 pixel data 2301 in such a manner that the number of pixels from which the predetermined value is subtracted and the number of pixels to which the predetermined value is added will become equal. The modulated data serves as a unit of added information. A plurality of units of the added information are arranged on the image data and the added information is represented by the mutual positional relationship of the plurality of information units.

10 Claims, 47 Drawing Sheets

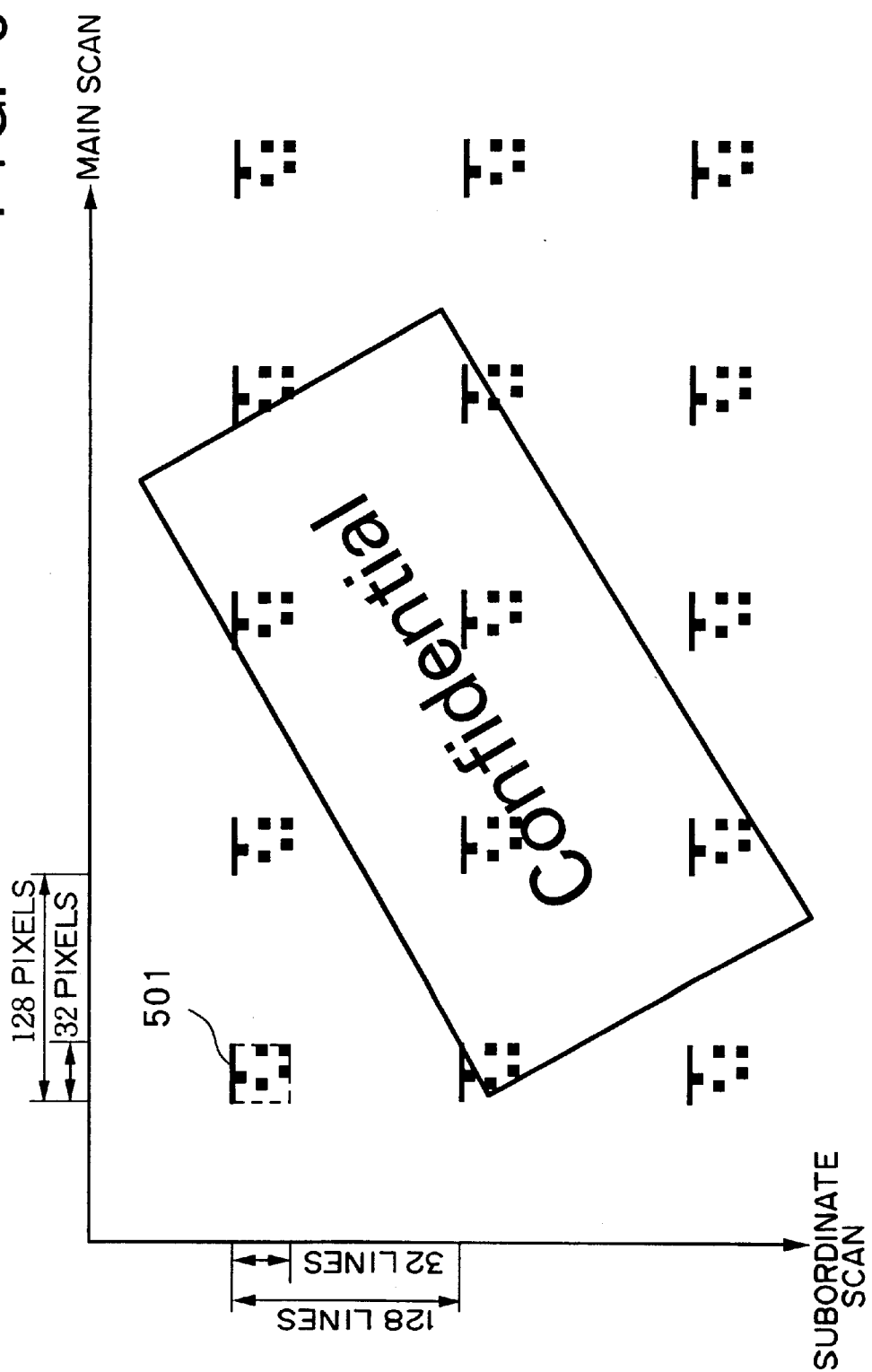

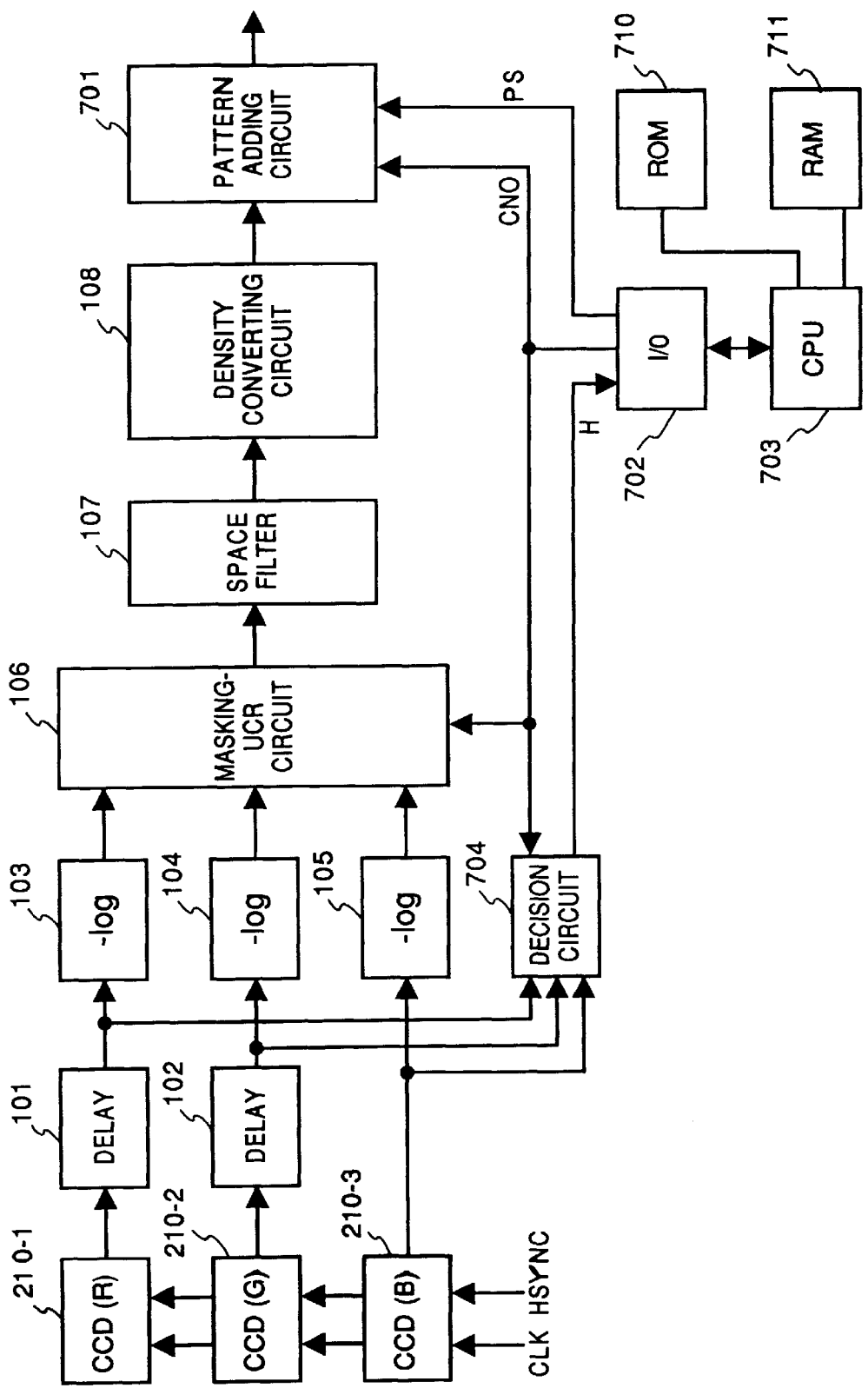

FIG. 23
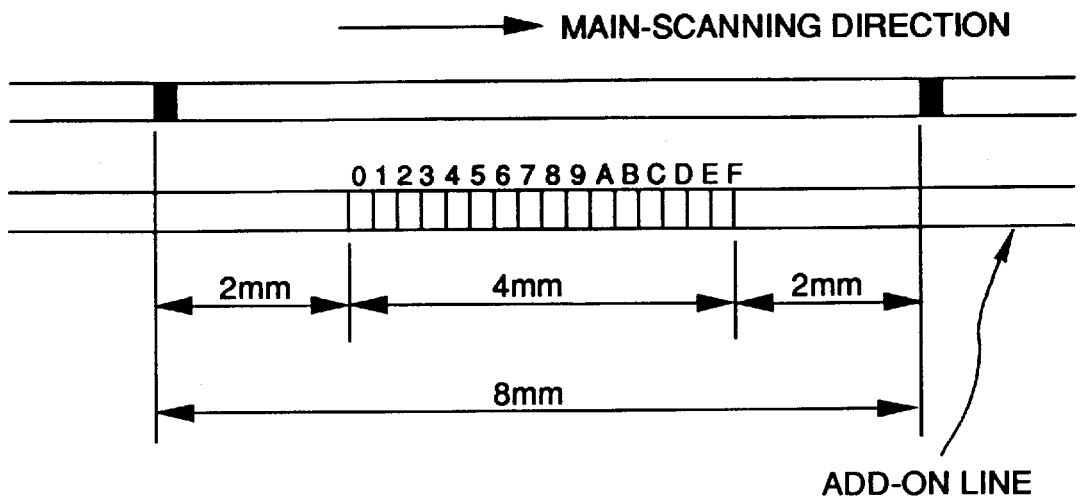
FIG. 24
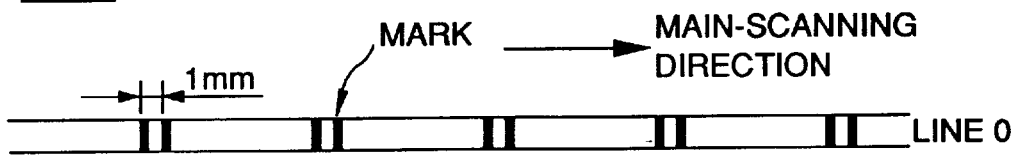
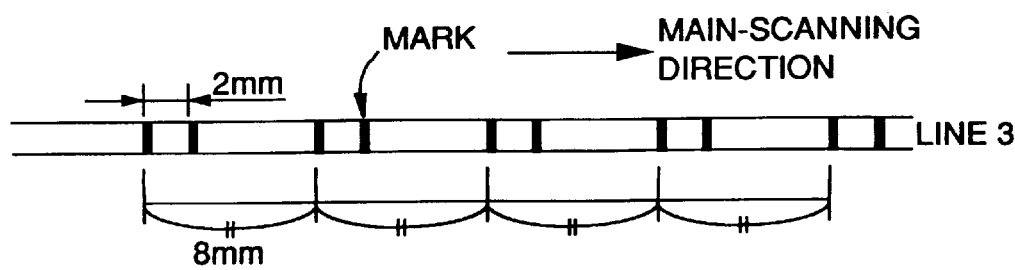

FIG. 28

| CNO SIGNAL | PRINT OUTPUT |
|---|---|
| 0 | MAGENTA (M) |
| 1 | CYAN (C) |
| 2 | YELLOW (Y) |
| 3 | BLACK (BK) |

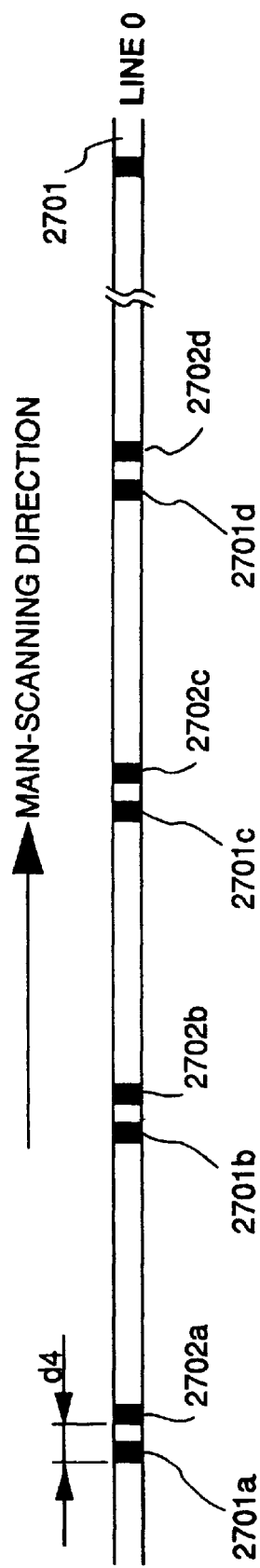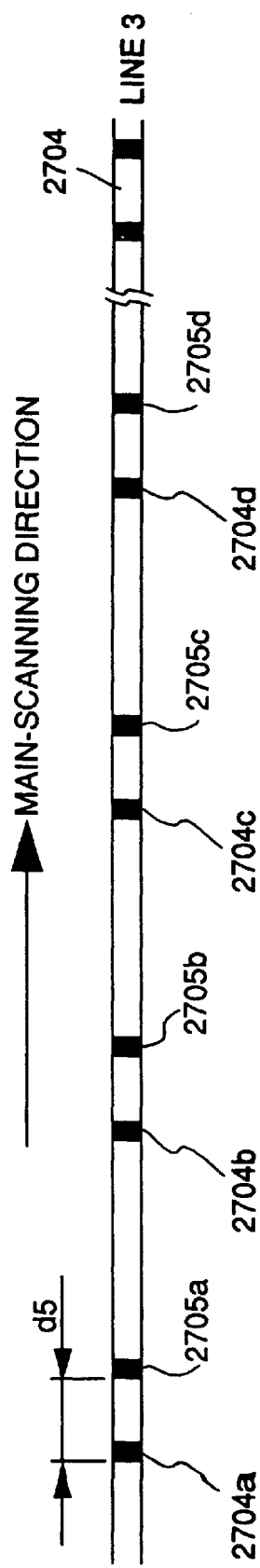

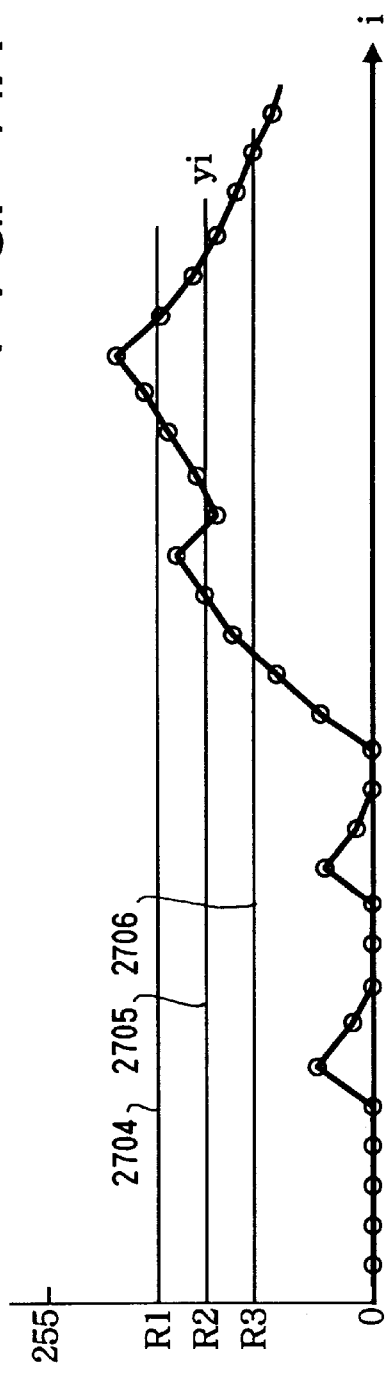
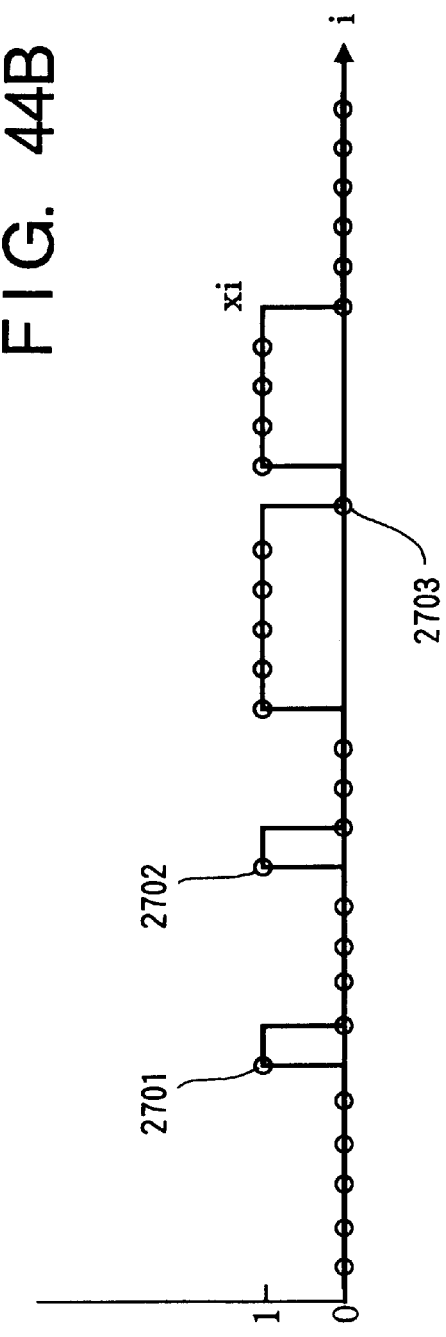
FIG. 44A
FIG. 44B

IMAGE PROCESSING APPARATUS AND METHOD FOR ADDING PREDETERMINED ADDITIONAL INFORMATION TO AN IMAGE BY ADDING A PREDETERMINED NUMBER OF UNIT DOTS TO PARTIAL COLOR COMPONENT DATA OF THE IMAGE

BACKGROUND OF THE INVENTION

1. Field of the Invention

This invention relates to an image processing method and apparatus and, by way of example, to an image processing method and apparatus for modulating image data and adding specific information to the image data.

2. Description of the Related Art

The recent improvement in the capabilities and performance of color copying machines and color printers has been accompanied by an increase in the crime of counterfeiting bank notes and securities by making unlawful use of these devices.

In order to prevent such crime, techniques have been proposed in which data relating to an image pattern corresponding to a specific original is registered beforehand in a color copying machine or color printer itself and unlawful copying if is forcibly inhibited when this data is identified. For example, see the specification of U.S. Ser. No. 07/351,165, filed on May 12, 1989.

However, with this method of preventing counterfeiting, there is a limitation upon the number of image patterns capable of being registered, and therefore it is impossible to prevent the counterfeiting of all types of bank notes and securities.

Further, in a color copying machine and color printer having an external interface, there are cases in which such a counterfeiting preventing circuit will not function. For example, if the image data sent from the external interface has a format in which the items of the three primary colors of red (R), green (G) and blue (B) arrive substantially simultaneously pixel by pixel, the aforementioned counterfeiting preventing circuit is capable of operating. However, if the image data has a data format made to conform to the individual characteristics of the printer, as in the manner of cyan (C), magenta (M), yellow (Y) and black (K), the reproducible combinations of colors are plural in number. This necessitates a plurality of image patterns for the purpose of making decisions, the decisions for preventing counterfeiting become very complicated to make and the number of images capable of being judged diminish. Furthermore, in a case where the image data of each color component is sent field-sequentially color by color, the image data must be stored in memory in order for the image to be judged. This results in higher equipment cost and makes it very expensive to effect the judgments needed to prevent counterfeiting.

Further, even if the foregoing problem relating to an image signal from an external interface is solved, this will not make it possible to avoid a picture closely resembling a registered bank note from being judged erroneously as being a bank note or a soiled bank note from being judged erroneously as not being a bank note.

With this as a background, the applicant has already proposed (see U.S. Ser. No. 07/856,996 filed on Mar. 24, 1992) a technique through which information capable of specifying a copying machine or the person making a copy is added to the reproduced image. More specifically, the image signal is modulated by a pattern of numerals or symbols, such as the manufacturing number of the copying machine, with regard to a color component (yellow, for example) least noticeable to the human eye, this color being selected from among the output color components (e.g., magenta, cyan, yellow, black) of the copying machine.

However, even though yellow is the output color component most difficult for the eye to see, the effect upon the image when the image signal is modulated cannot be ignored in the technique described above. In particular, when a color copying machine is used in design-related applications, an impediment encountered is that patterns not present in the original are brought into view. In a case where an image in a host computer is printed out using the external interface of the color copying machine, it is possible to directly output computer graphics and, hence, uniform areas are likely at the image signal level. If the yellow component is modulated at such time, added patterns become readily conspicuous at portions that are a uniform light gray or light blue.

Further, in a method in which a pattern is represented by units that are a collection of several numerals or characters and all added patterns are constructed by repeating this unit pattern at a fixed interval, a problem that arises is that the patterns become readily conspicuous because they are gathered closely together. In addition, since the human eye recognizes regular patterns such as the above-mentioned added patterns more easily than patterns in a random array, the patterns become even more noticeable when they are placed on a lattice. If the degree of modulation of the image signal is reduced in an effort to solve these problems, the added patterns may not be read, depending upon the specific originals.

Accordingly, there is a need for a modulating method and measures for dealing with patterns that satisfy contradictory requirements, namely a requirement that copies of certain originals such as bank notes be made positively identifiable as copies through some method and a requirement that such identification not be readily apparent to the eye in all output images.

SUMMARY OF THE INVENTION

Accordingly, an object of the present invention is to solve the aforementioned problems encountered in the prior art.

More specifically, an object of the present invention is to reduce the effects impressed upon the picture quality of a reproduced image when predetermined information is added to an input image.

According to the present invention, the foregoing objects are attained by providing an image processing apparatus comprising generating means for generating multilevel image data for each pixel of an image, adding means for adding predetermined information by modulating the multilevel image data, output means for outputting the modulated multilevel image data, and control means for controlling the adding means so that the average level of the multilevel image data is substantially preserved when the adding means adds the predetermined information.

Another object of the present invention is to preserve the color tone of a reproduced color image when predetermined information is added to an input color image.

According to the present invention, the foregoing object is attained by providing an image processing apparatus comprising generating means for generating multilevel image data for a plurality of components, adding means for adding predetermined information on to the multilevel image data of at least one of the plurality of color components, output means for outputting the modulated multilevel image data processed by the adding means, and control means for controlling the adding means so that color tone of a color image represented by the multilevel image data outputted by the output means is preserved when the adding means adds the predetermined information.

A further object of the present invention is to provide a novel image modulating method.

According to the present invention, the foregoing object is attained by providing an image processing method comprising a generating step of generating multilevel image data for each pixel of an image, an increasing step of increasing level of multilevel image data of a pixel of interest, a decreasing step of decreasing the level of multilevel image data of a pixel near the pixel of interest, and an adding step of adding predetermined information by using the multilevel image data increased at the increasing step and decreased at the decreasing step.

Yet another object of the invention is to inhibit the copying of an original that is not meant for copying.

A further object of the invention is to attain the foregoing objects through a simply constructed apparatus.

A further object of the invention is to provide an image processing method suited to high-speed processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram illustrating an example of the results of copying according to the first embodiment;

FIG. 7 is a block diagram illustrating the construction of an image scanner according to a second embodiment of the present invention;

FIG. 23 is a diagram for describing an example of an added pattern according to a third embodiment;

FIG. 24 is a diagram for describing a method of adding marks according to a third embodiment;

FIG. 25 is a diagram showing an example of the results of copying in a case where a common pattern is added on;

FIG. 28 is a diagram showing the relationship between a CNO signal and print output according to an eighth embodiment;

FIGS. 33 and 34A and 34B are diagrams showing an example of a method of expressing information by add-on lines according to the eighth embodiment;

FIGS. 44A and 44B are diagram showing the input and output of the integrator according to the ninth embodiment;

DESCRIPTION OF THE PREFERRED EMBODIMENTS

Preferred embodiments of the present invention will now be described in detail with reference to the accompanying drawings.

In the embodiments that follow, a copying machine is illustrated as an example of application of the invention. However, the present invention is not limited to a copying machine. For example, it goes without saying that the invention is applicable to various devices such as a scanner for reading an image, a printer or a computer which processes image data.

The term "specific original" mentioned below is assumed to cover not only originals such as bank notes and securities the copying of which is forbidden by law but also originals having a specific use, such as confidential documents.

First Embodiment

Overview of Apparatus

Figure 2:
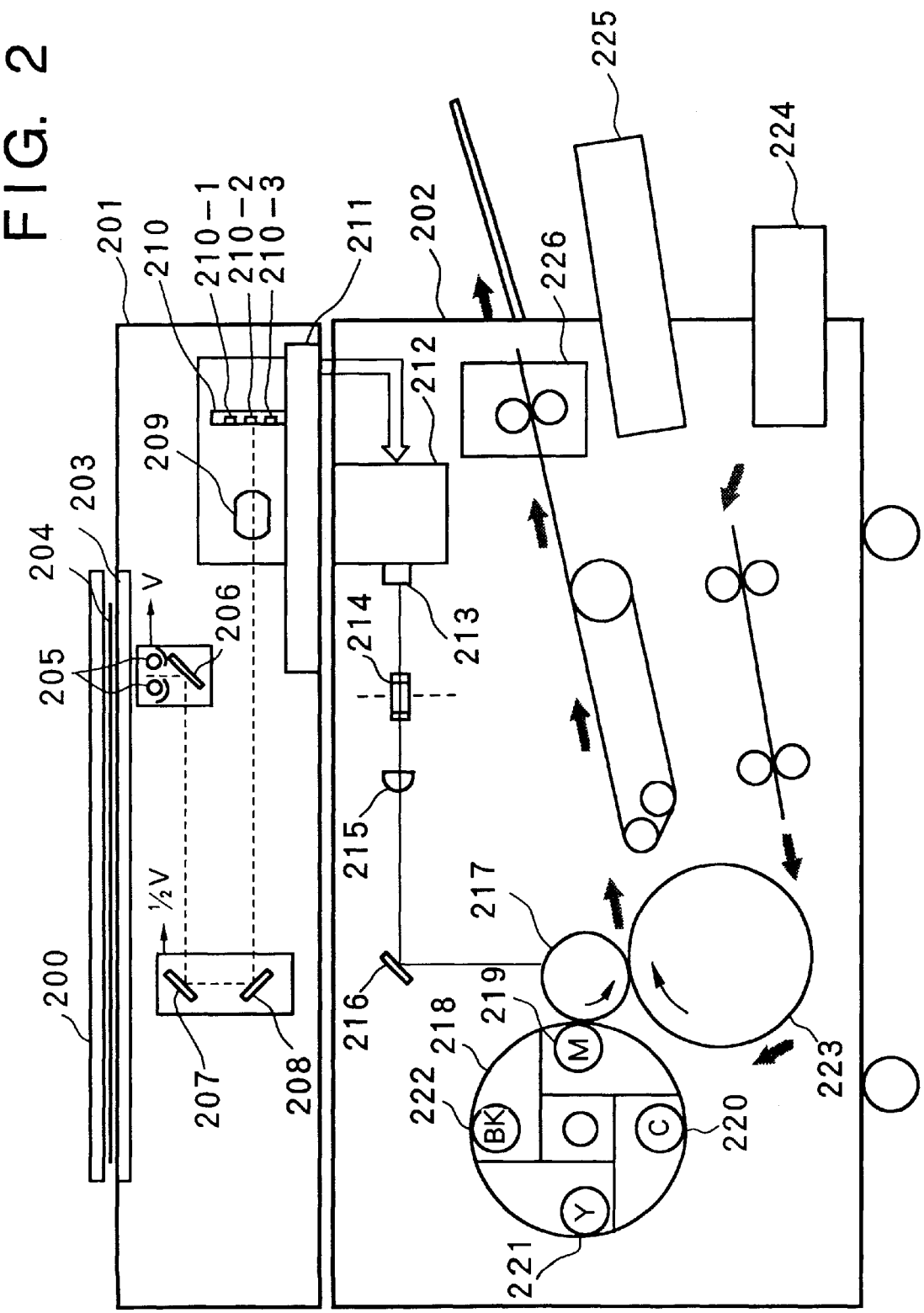
FIG. 2 is a sectional view showing the internal construction of a copying machine according to the first embodiment of the invention.

FIG. 2 is a sectional view showing the internal construction of a copying machine according to a first embodiment of the present invention.

In FIG. 2, numeral 201 denotes an image scanning section for reading an original at a resolution of 400 dpi (dot/inch) and performing digital signal processing. Numeral 202 designates a printing section for printing out an image, which corresponds to the original image read by the scanning section 201, on paper in full color at the resolution of 400 dpi.

The image scanning section 201 includes a pressure plate 200 having a mirror surface. An original 204 on a glass platen 203 is irradiated by means of lamps 205, an image is formed on a three-line sensor (hereinafter referred to as a "CCD") 210 of the colors red (R), green (G) and blue (B) via mirrors 206, 207, 208 and a lens 209, and the image is sent to a signal processor 211 as red (R), green (G) and blue (B) components of full-color information. The entire surface of the original is scanned (subordinate scanning) by mechanically moving the lamps 205 and mirror 206 at a velocity v as well as the mirrors 207, 208 at a velocity ½ v in a direction perpendicular to the electrical scanning direction (main-scanning direction) of the CCD 210.

The signal processor 211 electrically processes the read image signal, separates the signal into magenta (M), cyan (C), yellow (Y) and black (Bk) components and sends these components to the printing section 202. At least one component among the M, C, Y, Bk components is sent to the printing section 202 per scan of the original in the image scanning section 201, and a single print-out is completed by a total of four scans of the original.

The M, C, Y, Bk image signals received from the image scanning section 201 are sent to a laser driver 212. The laser driver 212 modulates and drives a semiconductor laser 213 in dependence upon the particular image signal sent. The laser light is made to scan across a photosensitive drum 217 via a polygon mirror 214, an f-θ lens 215 and a mirror 216.

Numeral 218 denotes a revolving developer comprising a magenta developing section 219, a cyan developing section 220, a yellow developing section 221 and a black developing section 222. These four developers come into alternate contact with the photosensitive drum 217 so that an electrostatic latent image formed on the photosensitive drum 217 is developed by means of toners. Numeral 223 denotes a transfer drum upon which paper fed from a paper cassette 224 or 225 is wound so that the image developed on the photosensitive drum 217 may be transferred to the paper.

After the four colors M, C, Y, Bk have thus been transferred successively, the paper is passed through a fixing unit 226 to fix the toners on the paper, after which the paper is ejected.

Image Scanner

Figure 1:
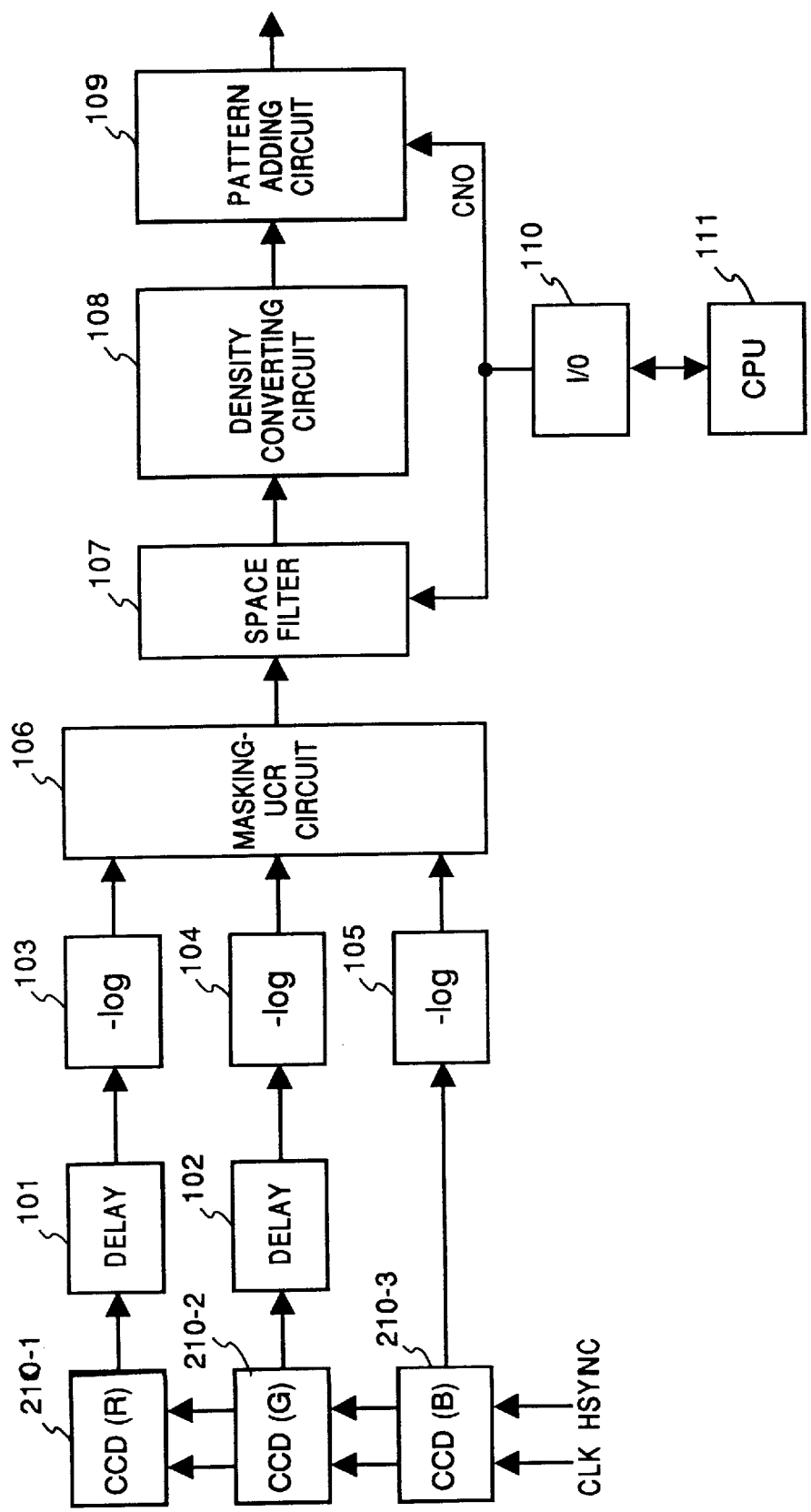
FIG. 1 is a block diagram illustrating the construction of an image scanner according to a first embodiment of the present invention.

FIG. 1 is a block diagram showing the construction of an image scanning section 201 according to the first embodiment of the present invention.

Numerals 210-1, 210-2, 210-3 in FIG. 1 denote CCD (solid-state image sensing device) line sensors having spectral sensitivity characteristics for red (R), green (G) and blue (B), respectively. The output signal of each line sensor is subjected to an A/D conversion, after which it is outputted as an eight-bit (0~255) signal.

The sensors 210-1, 210-2, 210-3 used in the present embodiment are arranged so as to be spaced apart a fixed distance, as illustrated in the specification of U.S. Pat. No. 4,999,717, and therefore a displacement in terms of time is corrected using delay elements 101 and 102.

Numerals 103, 104, 105 are log converters constituted by a look-up table ROM or RAM for converting a luminance signal into a density signal. Numeral 106 denotes a well-known masking-UCR (undercolor removal) circuit. In the masking-UCR circuit 106, each of the magenta (M), cyan (C), yellow (Y) and black (Bk) signals for image formation are generated at a prescribed bit length (e.g., eight bits) in frame-sequential fashion, based upon the RGB signals inputted thereto, whenever there is a reading operation, Numeral 107 denotes a space filter circuit which corrects the space-frequency characteristic of the output signal from the circuit 106. Numeral 108 denotes a density converting circuit for correcting the output signal in conformity with the density characteristic possessed by the printer 202. Like the log converters 103~105, this circuit is constituted by a ROM or RAM.

Numeral 111 denotes a microcomputer (hereinafter referred to as a "CPU") for supervising control of the apparatus, and numeral 110 denotes an input/output port (hereinafter referred to as an "I/O port") connected to the CPU 111.

A CNO signal is a two-bit output-color selecting signal. This is a control signal which indicates the order of the four reading operations. FIG. 28 is a diagram showing the relationship between the CNO signal and print output according to the first embodiment. The CNO signal is generated within the CPU 111 and is inputted to the masking-UCR circuit 106 via the I/O port 110 to change over the operating conditions.

Numeral 109 denotes a pattern adding circuit for adding a pattern to an image currently being outputted. The added pattern represents predetermined information in a color that is difficult to discriminate by the human eye.

Pattern Adding Circuit

Figure 3:
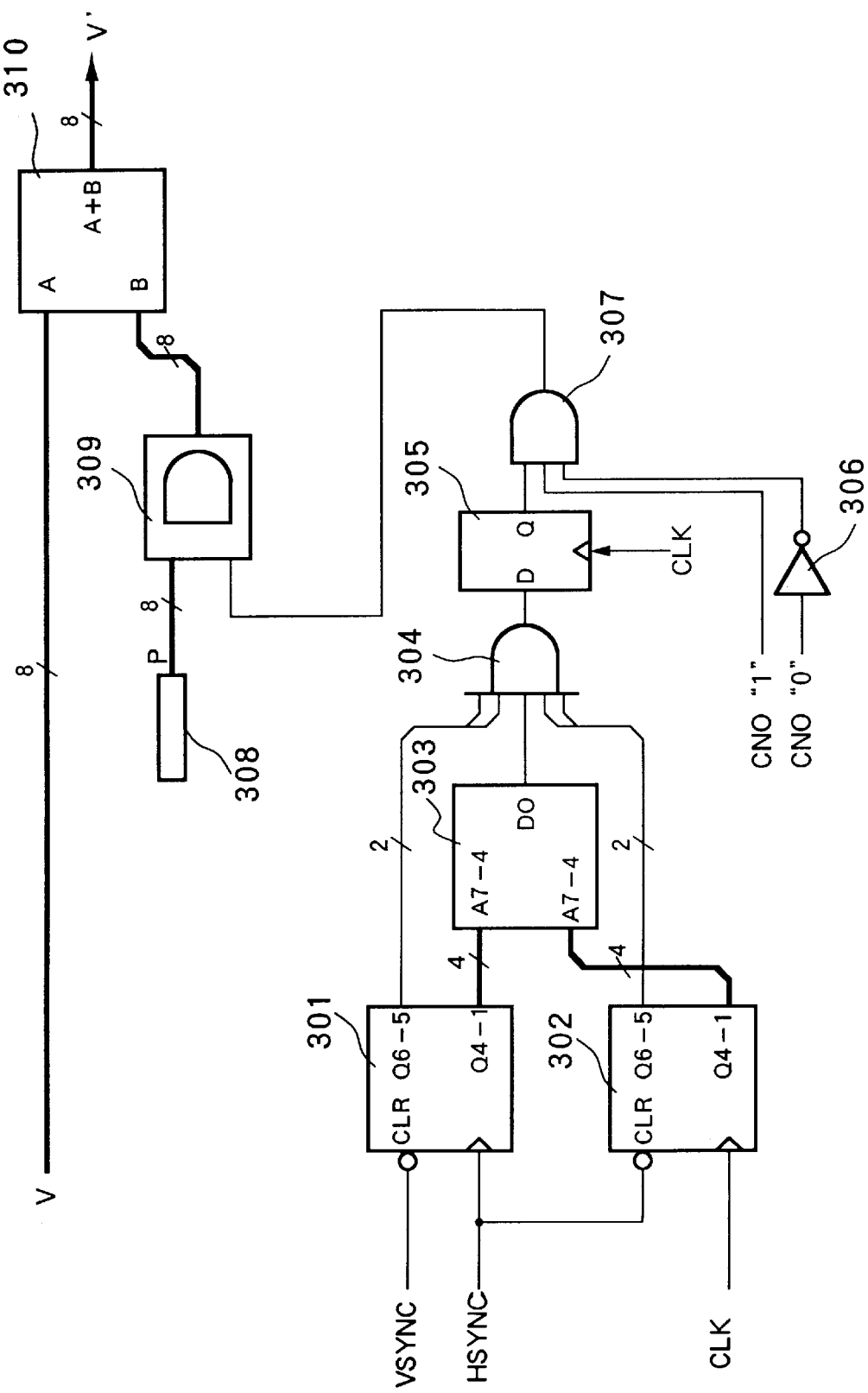
FIG. 3 is a block diagram showing the construction of a pattern adding circuit according to the first embodiment.

FIG. 3 is a block diagram showing the construction of the pattern adding circuit 109 according to the first embodiment. As shown in FIG. 3, the pattern adding circuit includes a subordinate-scan counter 301, a main-scan counter 302, a look-up table RAM (hereinafter referred to as a "LUT") 303, an AND gate 304, a flip-flop 305, an inverter 306, an AND gate 307, a register 308, an AND gate 309 and an adder 310.

The subordinate-scan counter 301 repeatedly counts a main-scan synchronizing signal HSYNC, which is employed in reading using the CCDs 210, at a seven-bit width, namely at a period of 128. Similarly, the main-scan counter 302 counts a pixel synchronizing signal CLK at the seven-bit width or period of 128. The LUT 303 is a random-access memory (hereinafter referred to as a "RAM") in which a pattern to be added is held. The LUT 303 has two inputs. One is a signal composed of four bits of the counted value from the subordinate-scan counter 301. These are the five lower order bits of the count minus the least significant bit. The other is a signal composed of four bits of the counted value from the main-scan counter 302. These similarly are the five lower order bits of the count minus the least significant bit. Reference is made to only one bit of the output of the LUT 303. The AND gate 304 takes the AND between this bit and the two higher order bits of each of the counters 301 and 302. The result of the AND operation is synchronized by the CLK signal in flip-flop 305, and the AND gate 307 takes the AND between the output of the flip-flop 305 and two signals, namely the inverse of a CNO signal "0", which is the lower order bit of the two-bit CNO signal, and a CNO signal "1", which is the higher order bit of the two-bit CNO signal. The output of the AND gate 307 is delivered to the AND gate 309. This is a signal which is effective only when CNO=2 holds, namely when printing currently is being performed in the color yellow (see FIG. 28).

The level (amount of modulation) of the added pattern is stored in the register 308 in advance and is rendered effective by the AND gate 309 only when CNO=2 holds (only for a yellow field). The pattern level is added to frame-sequential image data V by an adder 310.

It should be noted that the added pattern is added on using yellow toner only so that it will not be easily discriminated by the human eye. The reason for this is that the human eye has only a weak ability to discriminate patterns painted using yellow toner.

Figure 4:
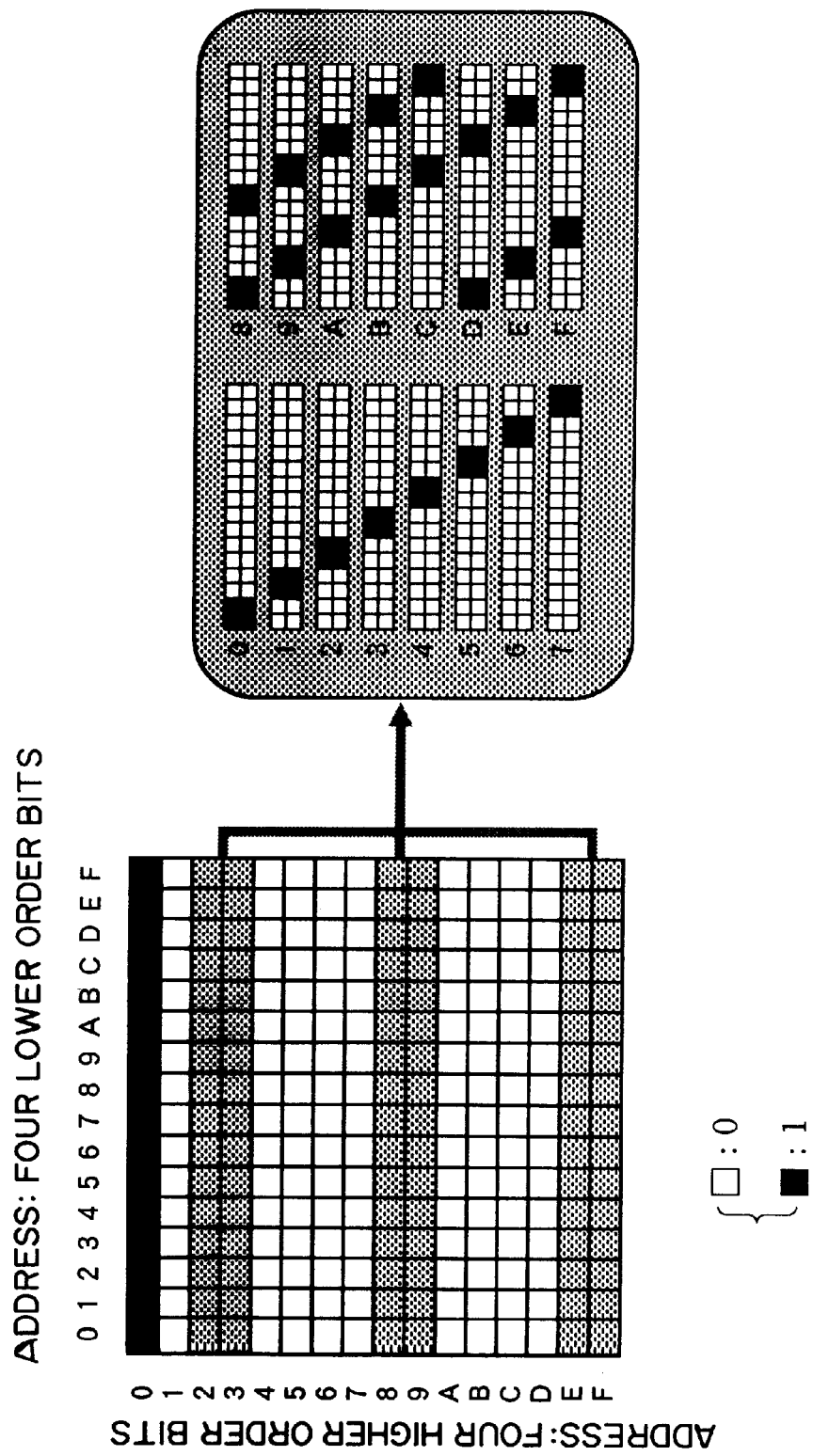
FIG. 4 is a diagram for describing an added pattern according to the first embodiment.

FIG. 4 is a diagram for describing an added pattern according to the first embodiment.

The LUT 303 stores the dot pattern, namely the added pattern, of the kind shown in FIG. 4. One box (which corresponds to 2×2 or four pixels, as will be described later) in FIG. 4 corresponds to one bit stored in the LUT 303. A white box indicates that the output of the LUT 303 is 0, and a black box indicates that the output of the LUT 303 is 1. Further, the horizontal direction is equivalent to the four lower order bits of an address, while the vertical direction is equivalent to the four higher order bits of an address. The added pattern is composed of 256 bits. The line (the upper-most line) for which the four higher order bits of the address are 0 on the left side of FIG. 4 is a reference mark that represents a reference position. The six lines (shown to be shaded on the left side of FIG. 4) for which the four higher order bits of the address are 2, 3, 8, 9, E, F are lines on which dots are placed. Two lines are used as a unit. By printing one or two dots each composed of 2×2 bits at decided locations of each pair of lines, as shown on the right side of FIG. 4, 16 items of information may be expressed. More specifically, each pair of lines represents four-bit information. Since three of these line pairs are located below the reference mark, combined information of a total of 12 bits can be expressed. The reason for spacing the line pairs apart rather than making them adjacent is that if the pairs of lines of dot arrangements were to run continuously, as in the manner "BBB" or "123", the dots would connect with one another vertically or diagonally and present a pattern that would be too conspicuous. Adopting the above-mentioned spacing prevents this.

It is so arranged that the data to be added can be written in the LUT 303 of FIG. 3 from the CPU (not shown). For example, information for specifying the origin of a copied document, such as information capable of specifying the copying machine as by a model number or manufacturing number, as well as the date and time of the copy, is written in the LUT in a state in which it has been converted into data indicative of the added pattern.

Since data devoid of the least significant bit of the main-scan counter 302 and subordinate-scan counter 301 in FIG. 3 enters the LUT 303, the single bit from the LUT 303 corresponds to 2×2 or four pixels on the copy. The reasons for this is as follows: In the printer 202 of this embodiment, 200-line processing (PWM processing in which two-pixel data is processed using pulses of one period) is executed in a half-tone image area, as illustrated in the specification of U.S. Pat. No. 5,119,185, and therefore cases arise in which pattern addition using a single pixel unit results in a pattern that is difficult to read. Accordingly, four pixels are employed, as mentioned above.

Results of Copying

FIG. 5 is a diagram showing an example of results of copying according to the first embodiment. FIG. 6 is a diagram for describing the effects of the first embodiment.

In FIG. 5, numeral 501 denotes an added pattern. The data stored in the LUT 303 is added on as an image. In order that a pattern signifying "3FC" will be difficult for the human eye to discriminate, in the example shown in FIG. 5 a pattern of 32×32 pixels is added and this is repeated every 128 pixels in the main-scanning direction and every 128 lines in the subordinate-scanning direction. By putting this into the form of a manufacturing number specific to the machine or a pattern obtained by coding the manufacturing number, the machine used to make the copy can be specified by examining the pattern subsequently added to the copy.

In the present embodiment, the pitch at which the patterns are added is every 128 pixels in the main-scanning direction and every 128 lines in the subordinate-scanning direction. Since resolution according to this embodiment is 400 dpi (dot/inch), the patterns are added on approximately every 8 mm. This is an interval that assures that the added patterns will be placed upon the easy-to-read watermark or margin of a bank note.

Figure 6A:
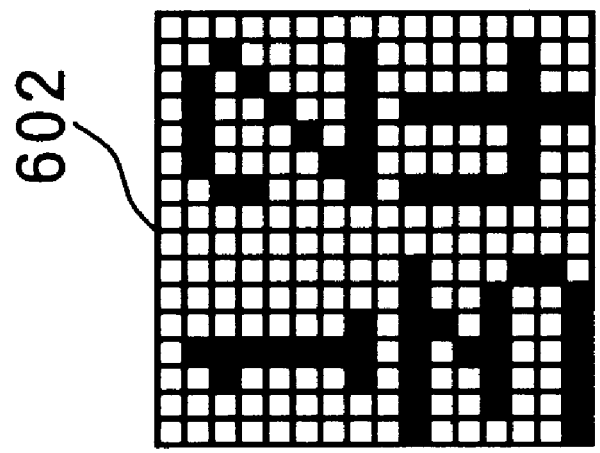
FIGS. 6A and 6B are diagram for describing the effects of the first embodiment.
Figure 6B:
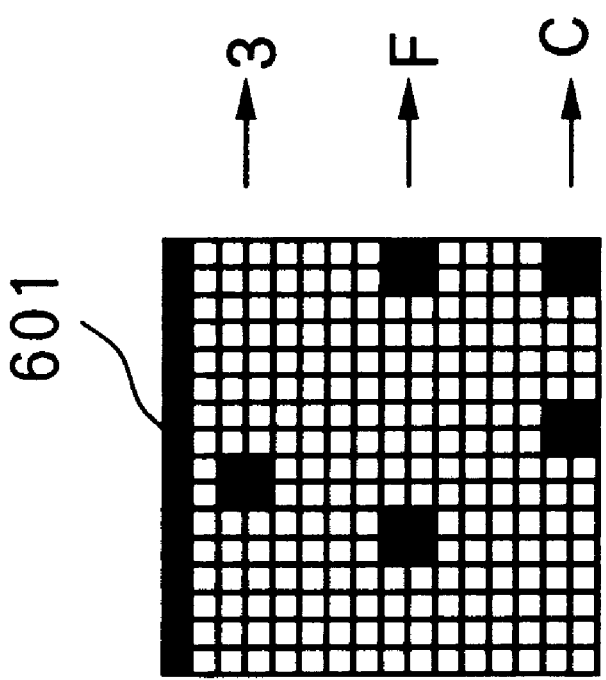

As for the method of using the added pattern described above, employing a pattern of the kind shown in FIG. 6A, as is done in this embodiment, makes it possible to reduce the number of modulated pixels so as to make the added pattern less conspicuous. This is preferred over FIG. 6B, in which the image signal is modulated using the numerical values as is.

Thus, in accordance with the first embodiment as described above, a specific added pattern is recorded on a copy in the form of a mark representing a positional reference and a pattern comprising one or more dots in order to specify the apparatus used in making the copy. As a result, the number of pixels modulated can be reduced when the pattern is added, the added pattern can be made less conspicuous and it is possible to reduce a deterioration in picture quality. Furthermore, converting the added pattern into a pattern of an array of dots is a form of coding operation. Accordingly, an additional effect of this embodiment is that it is difficult for this pattern to be willfully manipulated by a third party.

Second Embodiment

In the first embodiment described above, the invention is directed to the prevention of a deterioration in picture quality caused by a pattern specifying the origin of copy. However, the invention is not limited to the first embodiment but covers also a second embodiment in which the possibility that an original to be copied is a specific original the reproduction whereof is prohibited is judged based upon multiple values and the level (amount of modulation) of the added pattern is changed in dependence upon the judgment rendered.

The second embodiment of the invention will now be described.

FIG. 7 is a block diagram illustrating the construction of the image scanning section 201 according to the second embodiment of the present invention. Since the overview of the apparatus is the same as that of the first embodiment, circuits having similar arrangements and functions are designated by like reference characters and need not be described again. This block diagram differs from that of FIG. 1 showing the image scanning section of the first embodiment in that a decision circuit 704 for judging specific originals is provided. Further, FIG. 7 illustrates a ROM 710 storing a program for operating a CPU 703, and a RAM 711 used as the work area of various programs. A program in accordance with the flowchart of FIG. 17, for example, is stored in the ROM 710.

The decision circuit 704 for judging specific originals judges the possibility that an inputted image contains at least one specific original (a bank note, a security, etc.) from a plurality thereof registered in advance, and outputs a decision signal H, which is indicative of this possibility, in the form of multivalued two bits (four levels of 0~3). More specifically, the decision circuit 704 outputs a signal indicative of H=3 when it is most likely that the input image contains at least one specific original from a plurality thereof, outputs H=2, H=1 as the likelihood of the foregoing declines, and outputs H=0 when the foregoing is least likely to hold (namely when there is no possibility that the input image contains a specific original). Further, in this embodiment, the CNO signal described earlier also enters the decision circuit 704. In accordance with the CNO signal, the decision circuit 704 changes over the judgment criteria in conformity with each of the four reading operations, whereby a decision regarding different specific originals can be rendered in each reading operation. For example, if eight types of specific originals are to be subjected to judgment in one reading operation, then it is possible to render a decision regarding a total of 32 types of specific originals through four reading operations.

Processing of an added pattern can be changed in dependence upon a two-bit pattern-level selecting signal PS specified by the CPU 703. This will be described below.

Decision Circuit

Figure 8:
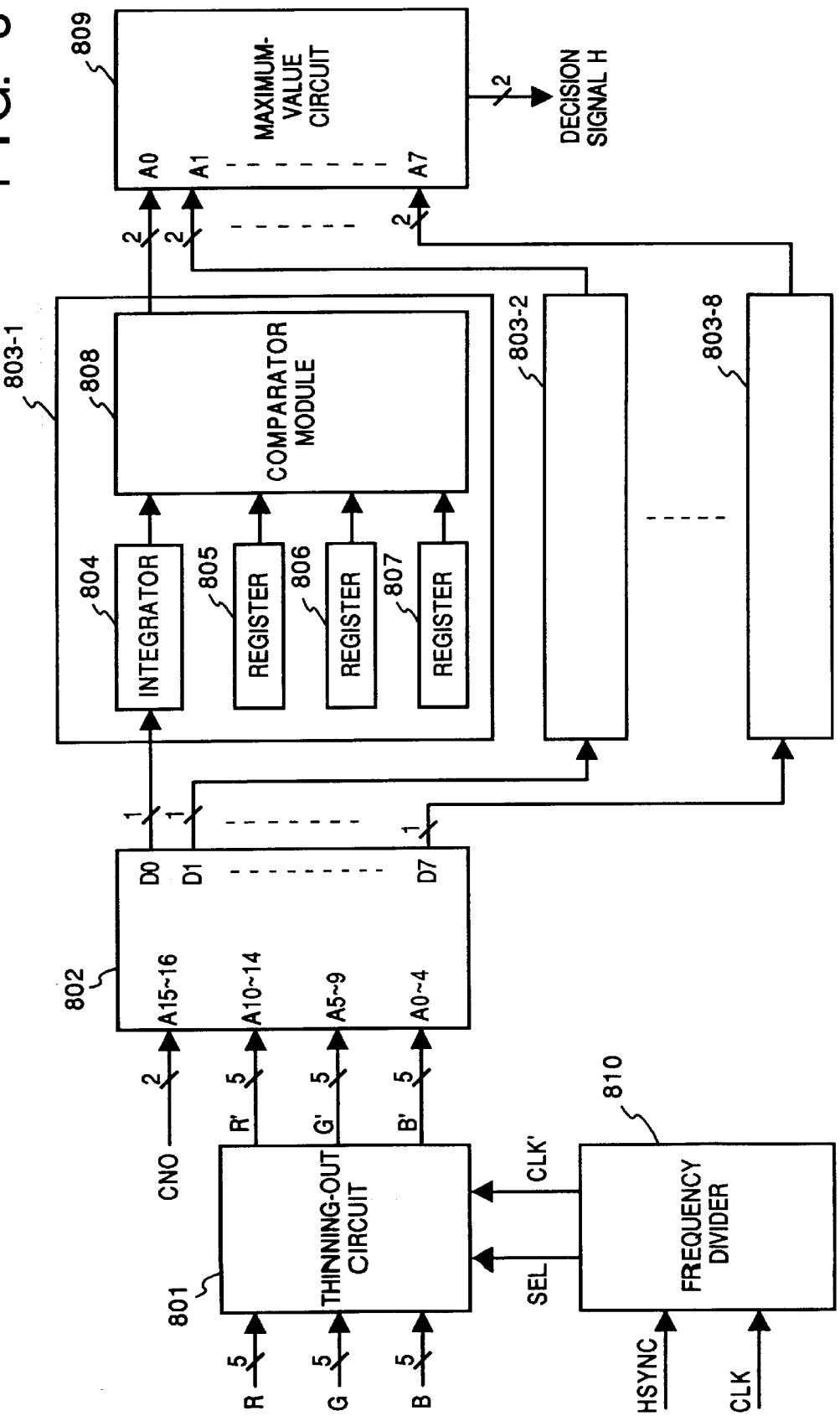
FIG. 8 is a block diagram illustrating the construction of a decision circuit according to the second embodiment.

FIG. 8 is a block diagram illustrating the construction of the decision circuit 704 according to the second embodiment. Numeral 801 denotes a thinning-out circuit for thinning out data in order to lighten the processing load of the decision circuit 704. Numeral 802 denotes a color-matching look-up table (hereinafter referred to as a "LUT") for color-matching the image of an original that has been read in and the images of a plurality of types of specific images (documents such as bank notes and securities prohibited from being reproduced) that have been prepared in advance. The distribution of the shades of color of 32 types of specific originals is investigated in advance, and it is determined whether the color shades of relevant pixels coincide with the color shades of the specific originals. The result of these judgments is stored in the LUT 802.

More specifically, the CNO signal, which is a field-sequential signal, is inputted to the LUT 802 as the two higher order address bits thereof, and the five higher order bits of the thinned-out image signal of each of the colors R, G, B are inputted to the 15 lower order bits of the LUT. Signals indicative of whether or not the shades of color of relevant pixels agree with the shades of color in eight types of specific originals are outputted simultaneously in correspondence with eight-bit data with regard to respective ones of the values 0~3 of the CNO signals, as shown in FIG. 28. In the four read scanning operations, decisions are rendered with regard to a total of 32 types of specific originals.

Numerals 803-1, 803-2, . . . , 803-8 denote color-shade judging circuits, each of which is composed of identical hardware, namely an integrator 804, a registers 805, 806, 807 and a comparator module 808. Numeral 809 designates a maximum-value circuit for outputting the maximum value among the results of judgment (output values) from the color-shade judging circuits 803-1, 803-2, . . . , 803-8. That is, when a single reading operation is performed, the maximum-value circuit 809 delivers the result of judgment as a decision signal H with regard to a specific original, from among eight types thereof, most likely to be present in the image of the original that has been read.

Numeral 810 denotes a frequency divider circuit that produces and outputs SEL and CLK' from CLK and HSYNC inputted thereto.

Timing Chart

Figure 9:
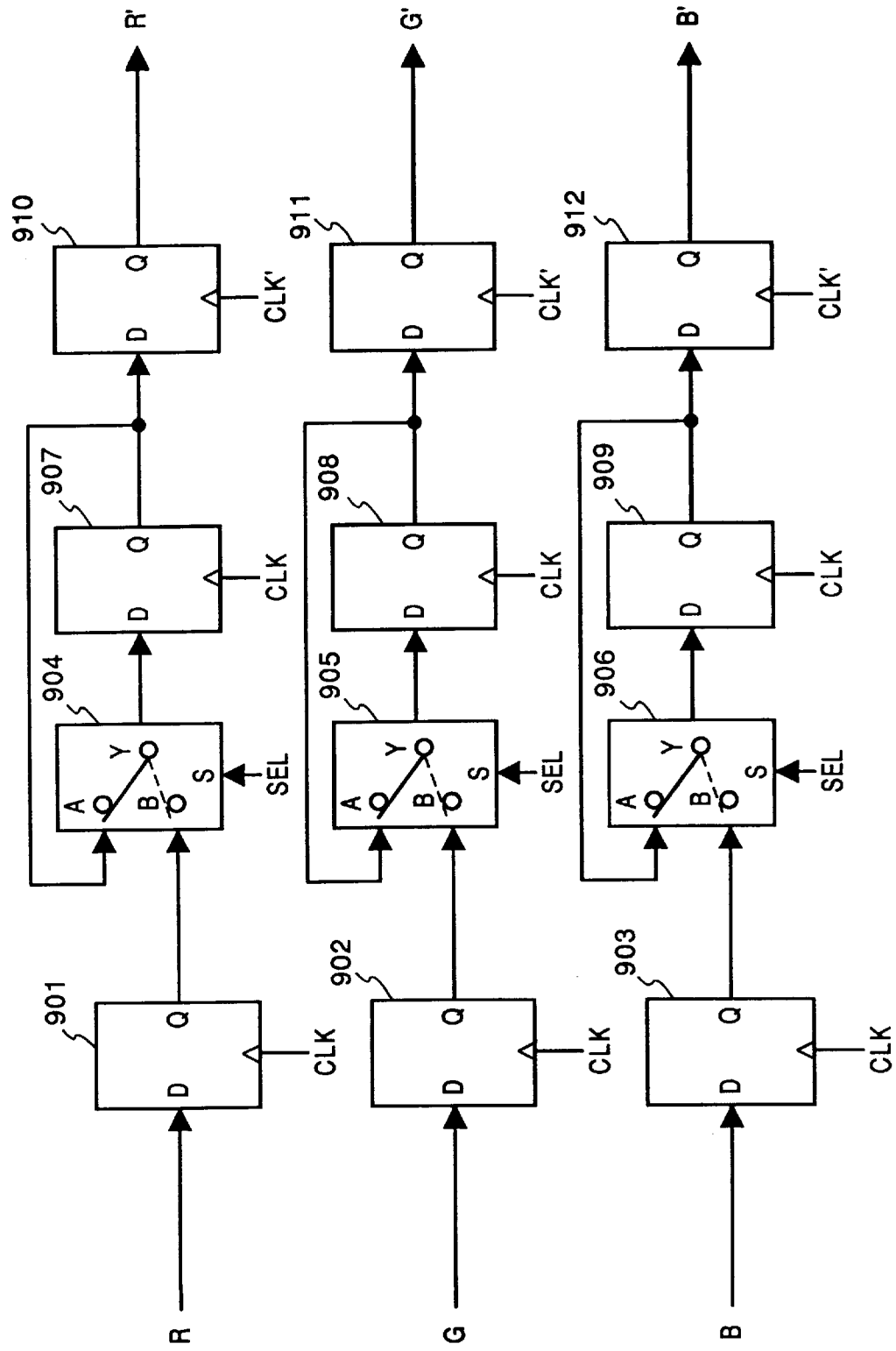
FIG. 9 is a circuit diagram showing the construction of a thinning-out circuit according to the second embodiment.
Figure 10:
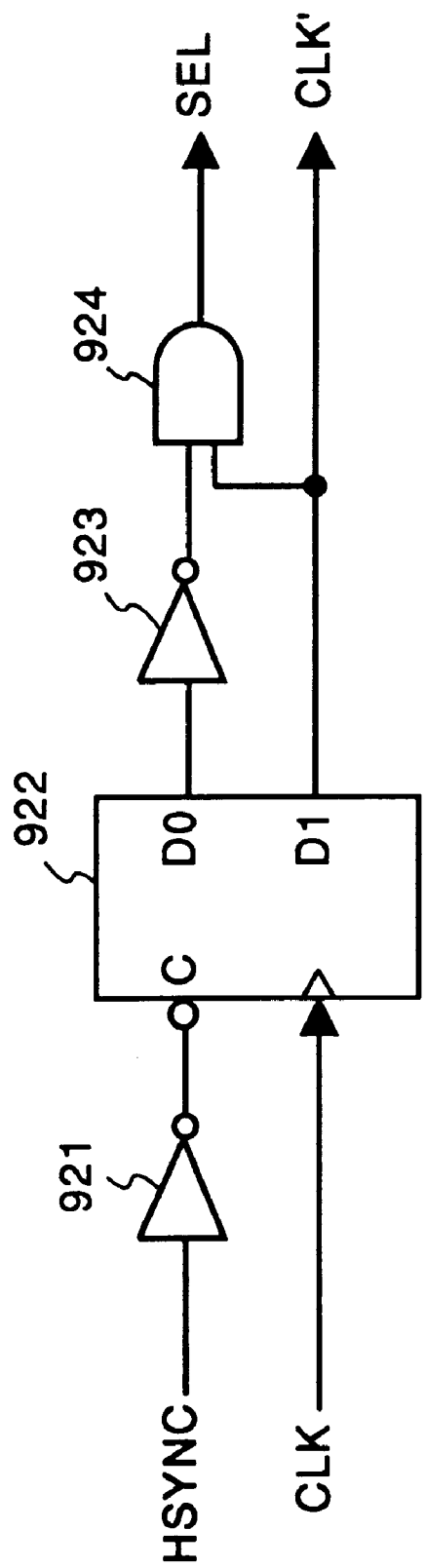
FIG. 10 is a circuit diagram showing the construction of a frequency divider circuit according to the second embodiment.
Figure 12:
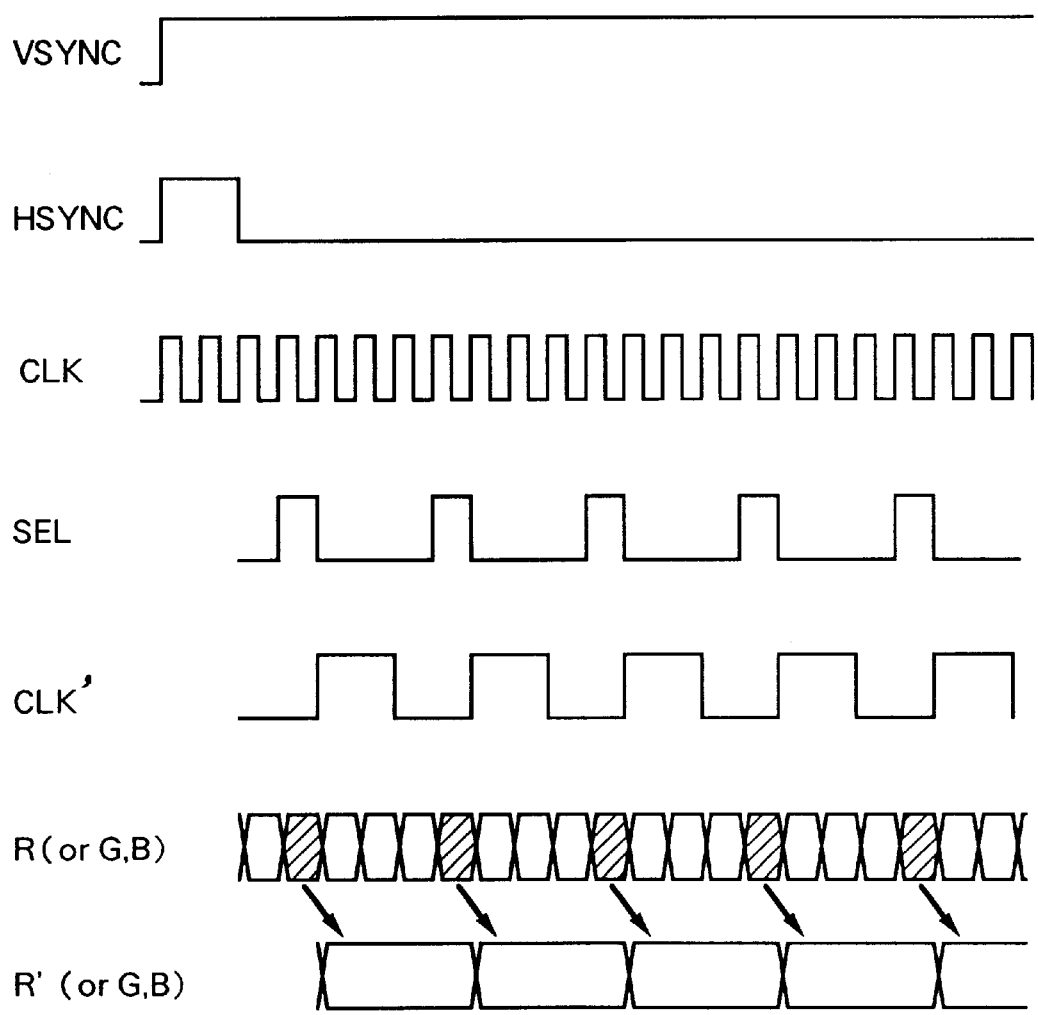
FIG. 12 is a timing chart of signals in a main-scanning direction according to the second embodiment.

FIG. 9 is a circuit diagram showing the construction of the thinning-out circuit according to the second embodiment, FIG. 10 is a circuit diagram showing the construction of the frequency divider circuit according to the second embodiment, and FIG. 12 is a timing chart of signals in the main-scanning direction according to the second embodiment.

In FIG. 12, VSYNC represents a subordinate-scan interval signal, namely a signal that indicates the output interval of a subordinate-scan signal, and HSYNC represents a main-scan synchronizing signal for achieving synchronization with the start of main scanning. CLK is an image transfer clock (an image synchronizing signal) which, in this embodiment, is the basic clock of a variety of image processing operations.

CLK' represents a clock obtained by frequency division of the CLK signal by four. This serves as the basic clock in the decision circuit 704. A SEL signal is a timing signal used in the thinning-out circuit 801, described later. CLK' and SEL are produced by the frequency divider circuit 810 shown in FIG. 10.

The frequency divider circuit 810 is constituted by an inverter 921, a two-bit counter 922, an inverter 923 and an AND gate 929, as illustrated in FIG. 10. After being cleared (initialized) by the HSYNC signal, which is the main-scan synchronizing signal, the two-bit counter 922 counts the CLK signal and outputs the counted value in the form of two bits. The higher order bit D1 of the counter 922 is outputted as the CLK' signal, and the result of taking the AND between this signal and a signal obtained by inverting the lower order bit D0 of the counter is outputted as the SEL signal.

As shown in FIG. 9, the thinning-out circuit 801 comprises flip-flops 901, 902, 903 and 907, 908, 909, which hold data in response to the CLK signal, selectors (comprising for example multiplexer) 904, 905 and 906, and flip-flops 910, 911, 912 that hold data by the CLK' signal. In accordance with the thinning-out circuit 801, the R (or G, B) signal transferred by the CLK signal is thinned out at a ratio of ¼, and an R' (or G', B') signal synchronized to CLK' can be obtained.

Integrator

Figure 11:
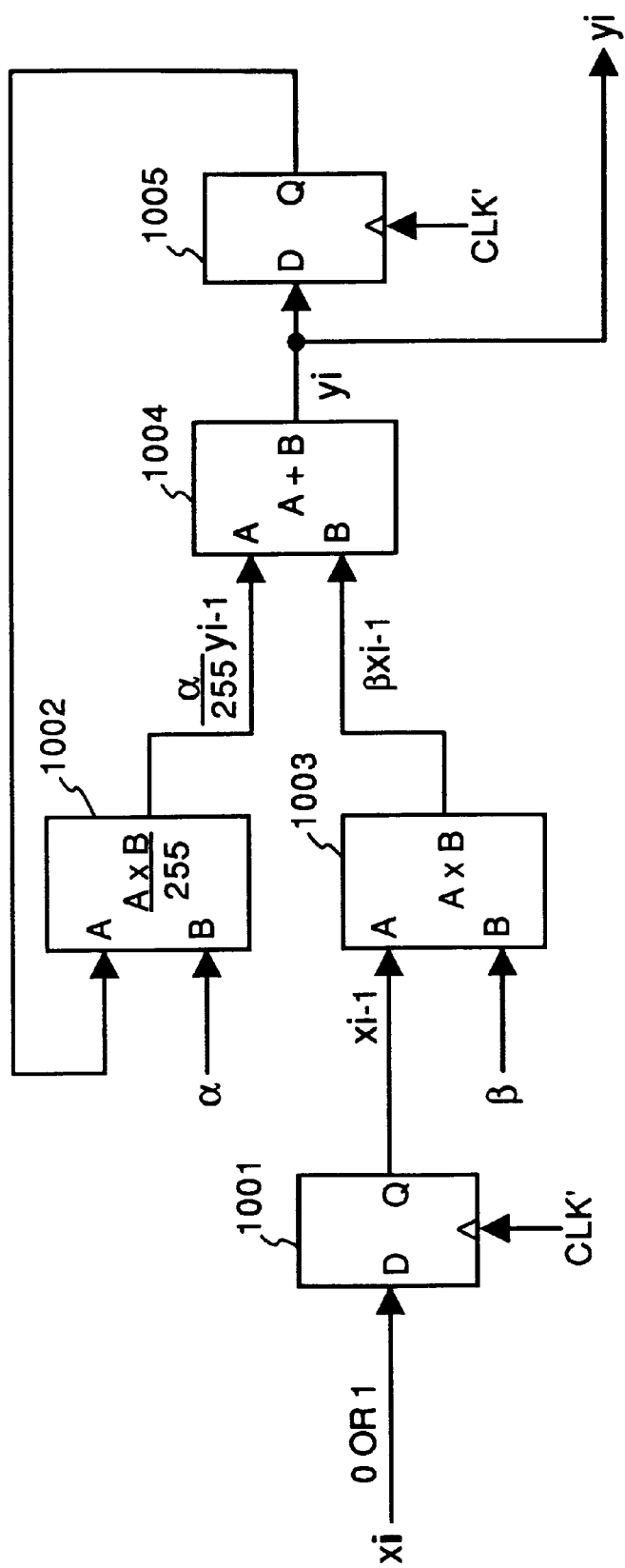
FIG. 11 is a block diagram showing the construction of an integrator according to the second embodiment.
Figure 13:
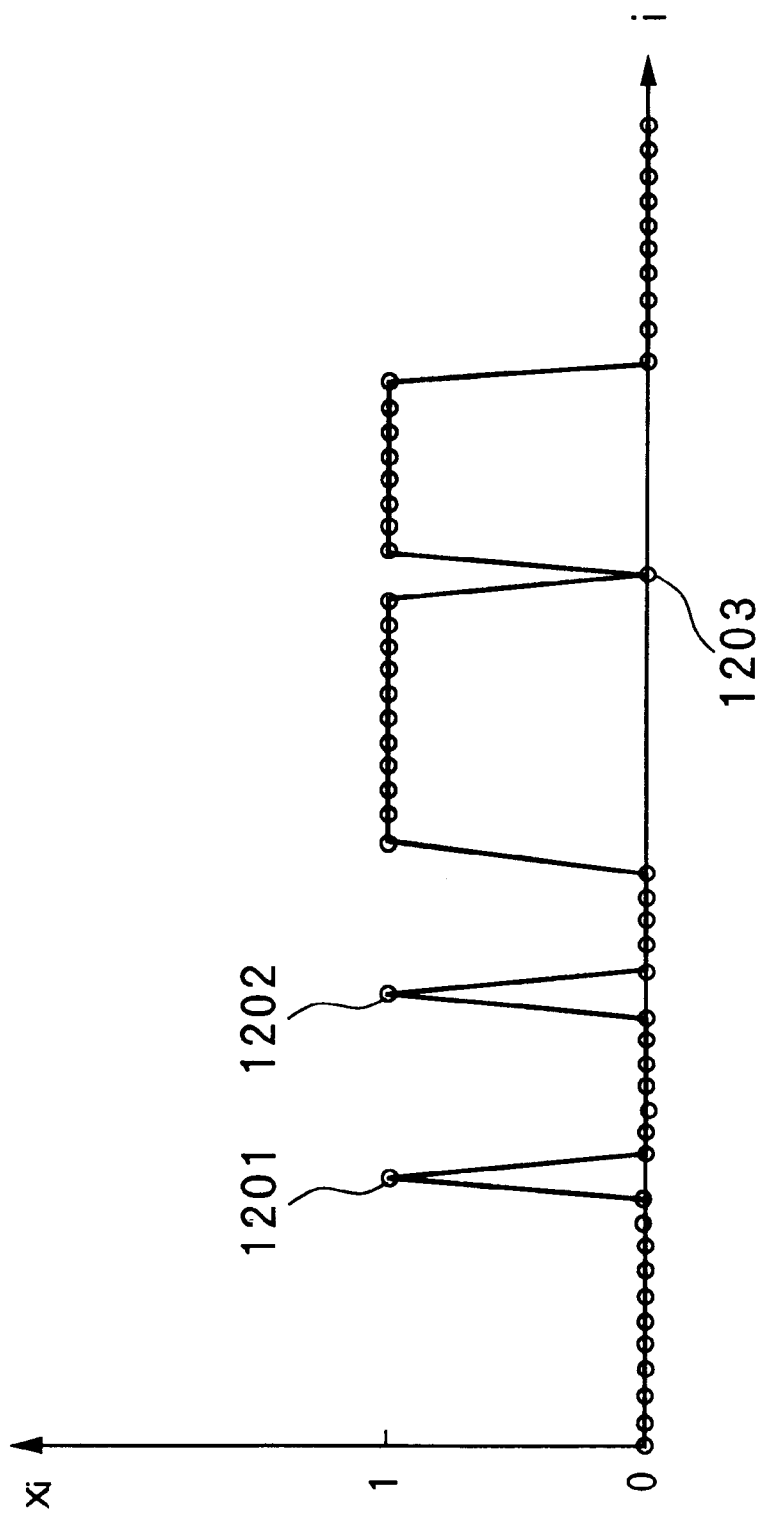
FIGS. 13 and 14 are diagrams showing the input and output of the integrator according to the second embodiment.
Figure 14:
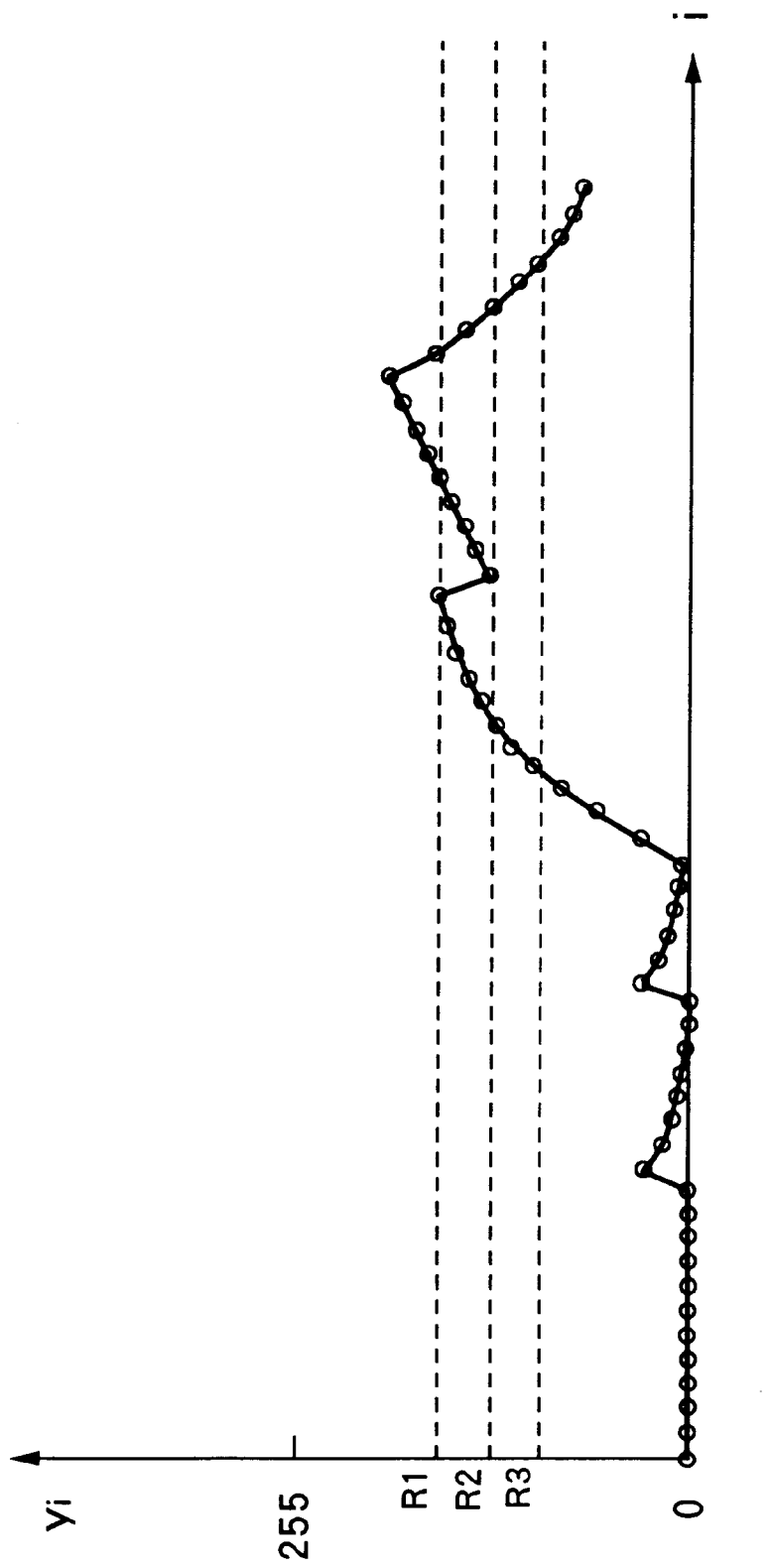

FIG. 11 is a block diagram showing the construction of the integrator 804 according to the second embodiment, and FIGS. 13 and 14 are diagrams showing the input and output of the integrator 804 according to the second embodiment.

In FIG. 11, numerals 1001, 1005 denote flip-flops which hold data at the timing of the leading edge of the CLK' signal. Numeral 1002 denotes a multiplier to which two eight-bit signals (A, B) are inputted. The multiplier 1002 multiplies these signals together and outputs an eight-bit signal $$\left(\frac{A \times B}{255}\right)$$

as the result. Numeral 1003 denotes a multiplier to which a one-bit input signal (A) and an eight-bit input signal (B) are applied. The multiplier 1003 multiplies these signals together and outputs an eight-bit signal (A×B) as the result.

Numeral 1004 denotes an adder to which two eight-bit signals (A, B) are inputted. The adder 1004 adds these signals together and outputs an eight-bit signal (A+B) as the result.

Accordingly, in the integrator of this embodiment, an eight-bit output signal $y_i$ is expressed by the following equation when a two-valued input signal $x_1$ is applied thereto:

$$y_i = (\alpha/255) \cdot y_{i-1} + \beta \cdot x_{i-1} \qquad (1)$$

where $\alpha$ and $\beta$ represent constants that have been preset. The various characteristics of the integrator are decided by the sizes of these values. For example, in a case where $\alpha=247$, $\beta=8$ holds, an output $y_i$ of the kind shown in FIG. 14 is produced in response to an input $x_{i-1}$ of the kind shown in FIG. 13.

An input "1" regardless of the fact that values on either side thereof are almost "0", as at points 1201, 1202, and an input "0" regardless of the fact that values on either side thereof are almost "1", as at point 1203, may be considered to be noise. This is processed by the integrator. Specifically, appropriate threshold values such as R1, R2, R3 are set respectively in the registers 805, 806, 807 of FIG. 8, and the output $y_i$ of the integrator is subjected to a four-value conversion based upon these threshold values, whereby the noise can be removed.

Comparator Module

Figure 15:
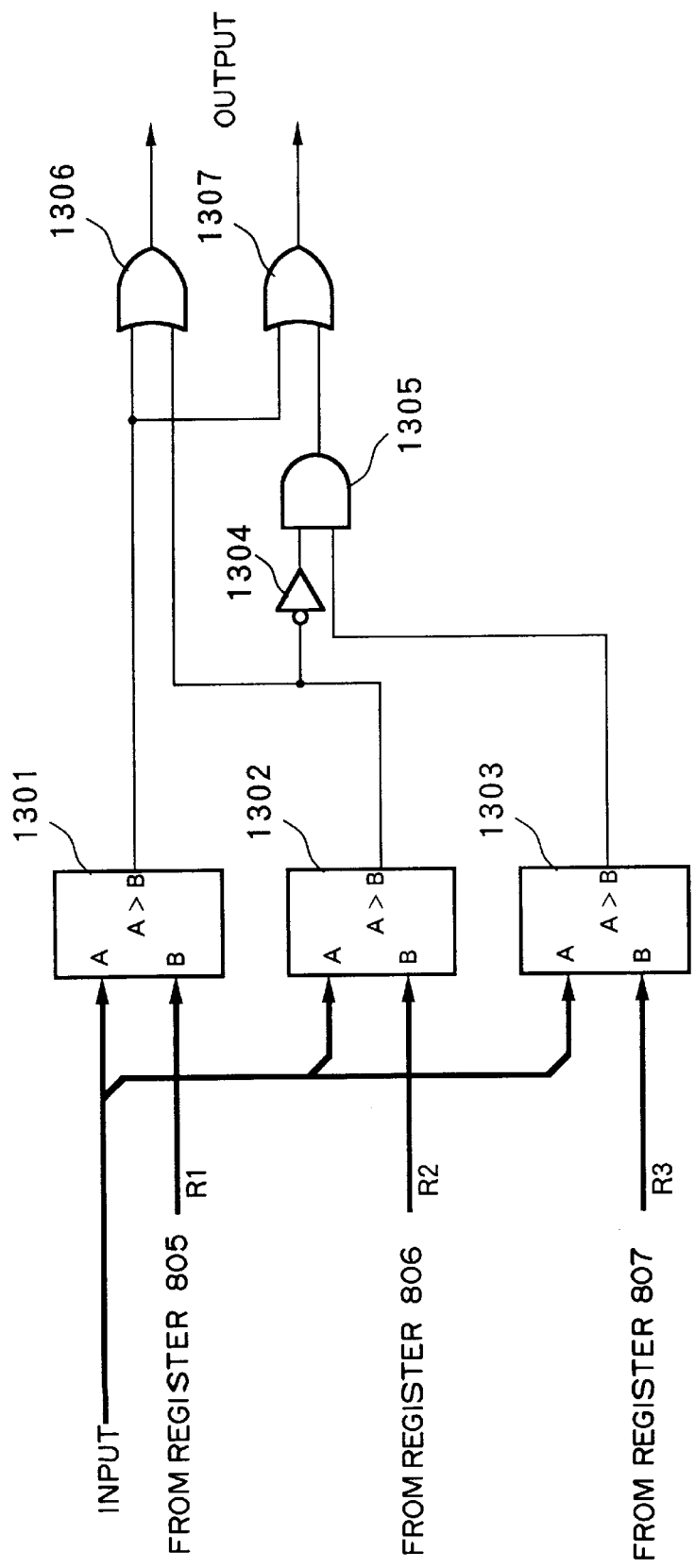
FIG. 15 is a block diagram showing the construction of a comparator module according to the second embodiment.

FIG. 15 is a block diagram showing the construction of a comparator module 808 according to the second embodiment. In FIG. 15, 1301, 1302, 1303 denote comparators, 1304 an inverter, 1305 an AND gate, and 1306, 1307 OR gates. The threshold value R1 (see FIG. 8) is preset in the register 805, the threshold value R2 (see FIG. 8) in the register 806 and the threshold value R3 (see FIG. 8) in the register 807. These values are related as follows: R1>R2>R3.

By virtue of the foregoing arrangement, the decision rendered is quantized to two bits and outputted. More specifically, "11" (binary), "10" (binary), "01" (binary) and "00" (binary) are outputted when the following hold: R1<(input), R2<(input)≦R1, R3<(input)≦R2, (input)≦R3, respectively.

Pattern Adding Circuit

Figure 16:
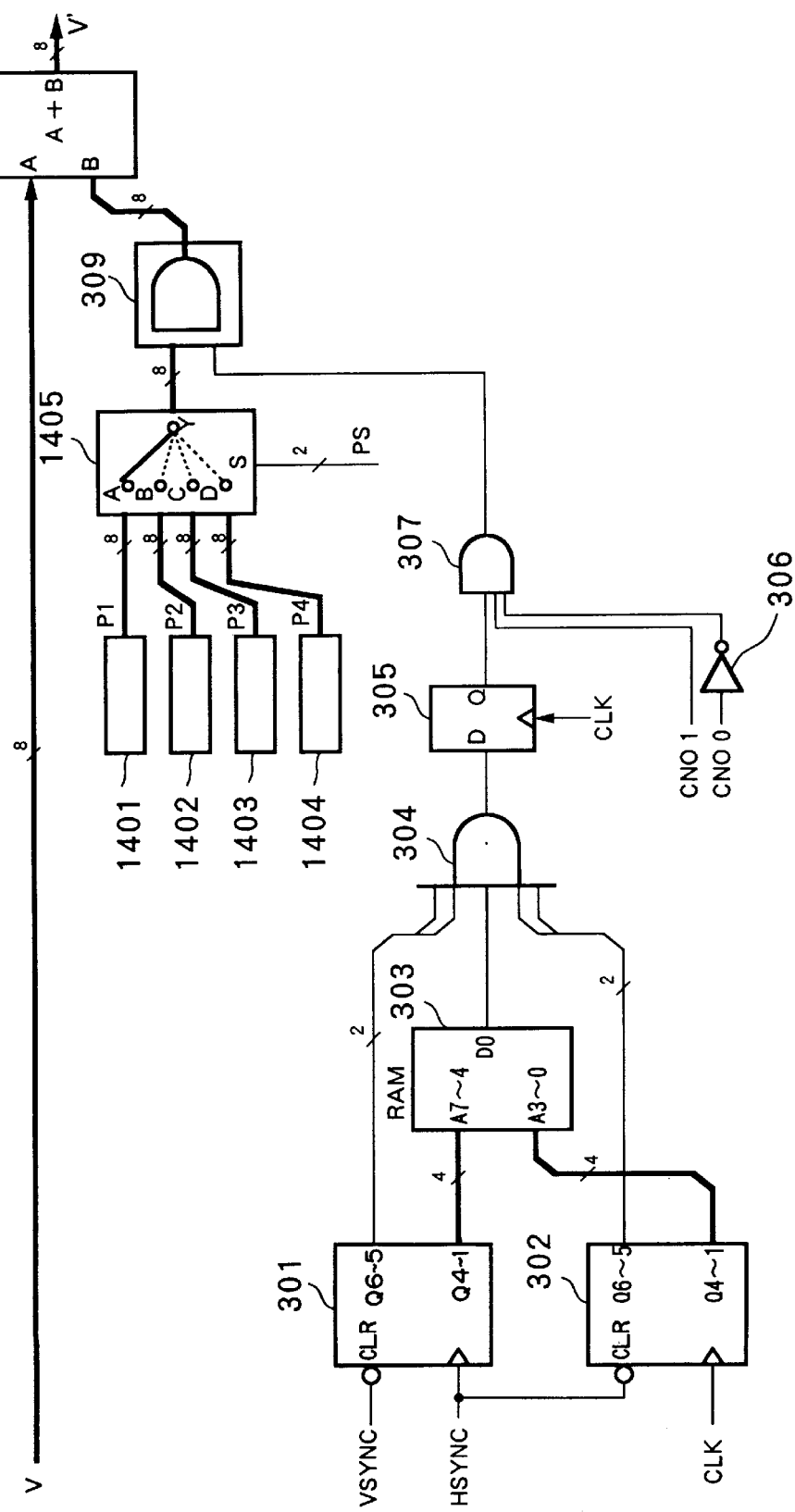
FIG. 16 is a block diagram showing the construction of a pattern adding circuit according to the second embodiment.

FIG. 16 is a block diagram showing the construction of a pattern adding circuit 701 according to the second embodiment. The difference between this arrangement and that of FIG. 3 showing the pattern adding circuit 109 of the first embodiment is the eight-bit input signal to the AND gate 309. In FIG. 16, numeral 1405 denotes a 4-to-1 selector, and numerals 1401, 1402, 1403, 1404 denote registers. Values P1, P2, P3, P4 are stored in the respective registers 1401, 1402, 1403, 1404 in advance. Any level of from P1 to P4 is selected in dependence upon the designated pattern-level selecting signal PS from the CPU 703, the pattern is added to the input signal V via the AND gate 309 and by the action of the adder 310, and V' is outputted. Accordingly, when CNO=2 holds, namely when printing is currently being performed in the color yellow, the pattern that has been stored in the LUT 303 is read out repeatedly and added on to the signal V to be outputted.

Here the setting is such that P1<P2<P3<P4 holds, and the selector 1405 is set in such a manner that Y=A, Y=B, Y=C, Y=D will hold when the following hold: s="00" (binary number), s="01" (binary number), s="10" (binary number) and s="11" (binary number), respectively. Therefore, the pattern is added in such a manner that V'=V+P1, V'=V+P2, V'=V+P3 and V'=V+P4 will hold when the following hold: PS="00" (binary number), PS="01" (binary number), PS="10" (binary number), and PS="11" (binary number), respectively.

By varying the level of the added pattern in dependence upon the possibility that a specific original will be present in an input image, the pattern can be recorded on an ordinary copy so as to be almost indistinguishable by the human eye. In particular, by making the level variable, the pattern can be added to the copy more conspicuously the greater the possibility that the specific original is present in the copy.

Flowchart

Figure 17:
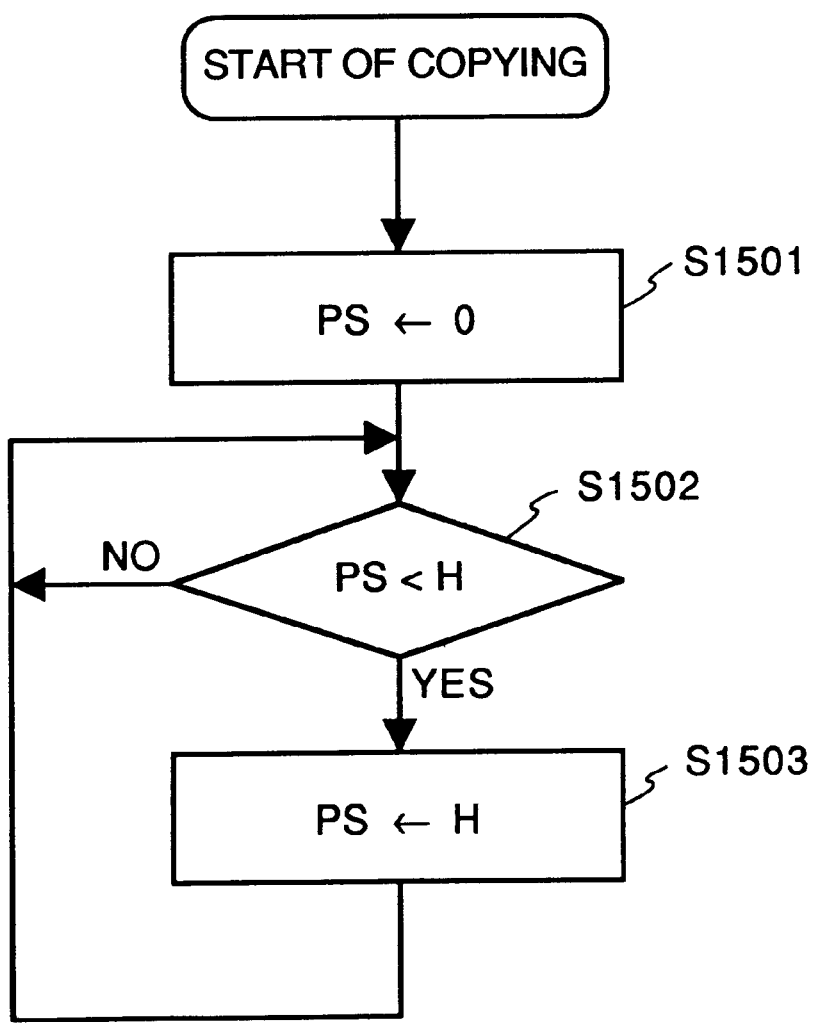
FIG. 17 is a flowchart for describing a procedure for the setting of a pattern-level selecting signal, this procedure being part of the control executed by a CPU according to the second embodiment.

FIG. 17 is a flowchart for describing a procedure for the setting of the pattern-level selecting signal PS, this procedure being part of the control executed by the CPU 703 according to the second embodiment.

Immediately after a copying operation starts, "0" is set as the pattern-level selecting signal PS at step S1501. Next, the present decision level H and the value of PS are compared at step S1502, and the value of H is set at PS at step S1503 if H is greater than PS. If H is not greater than PS, the program returns to step S1502. Thus, the maximum value from the start of copying until the present time is set to PS depending upon the history of the decision signal H.

Thus, in accordance with the second embodiment as described above, the amount of modulation (the pattern level) of the image signal can be reduced in a case where the original is one that is allowed to be copied. This makes it possible to make the added pattern much less conspicuous.

Third Embodiment

A third embodiment of the invention will now be described.

In this embodiment, an array of dots in which the added pattern is broken up and dispersed is used when a reproduced image is obtained by superimposing the added pattern upon the original image. Since the arrangement of the overall copying machine in the third embodiment also is similar to that shown in FIGS. 1 and 2 described in the first embodiment, a description of the arrangement is omitted.

Pattern Adding Circuit

A method which relies upon added patterns according to this embodiment will now be described.

Figure 20:
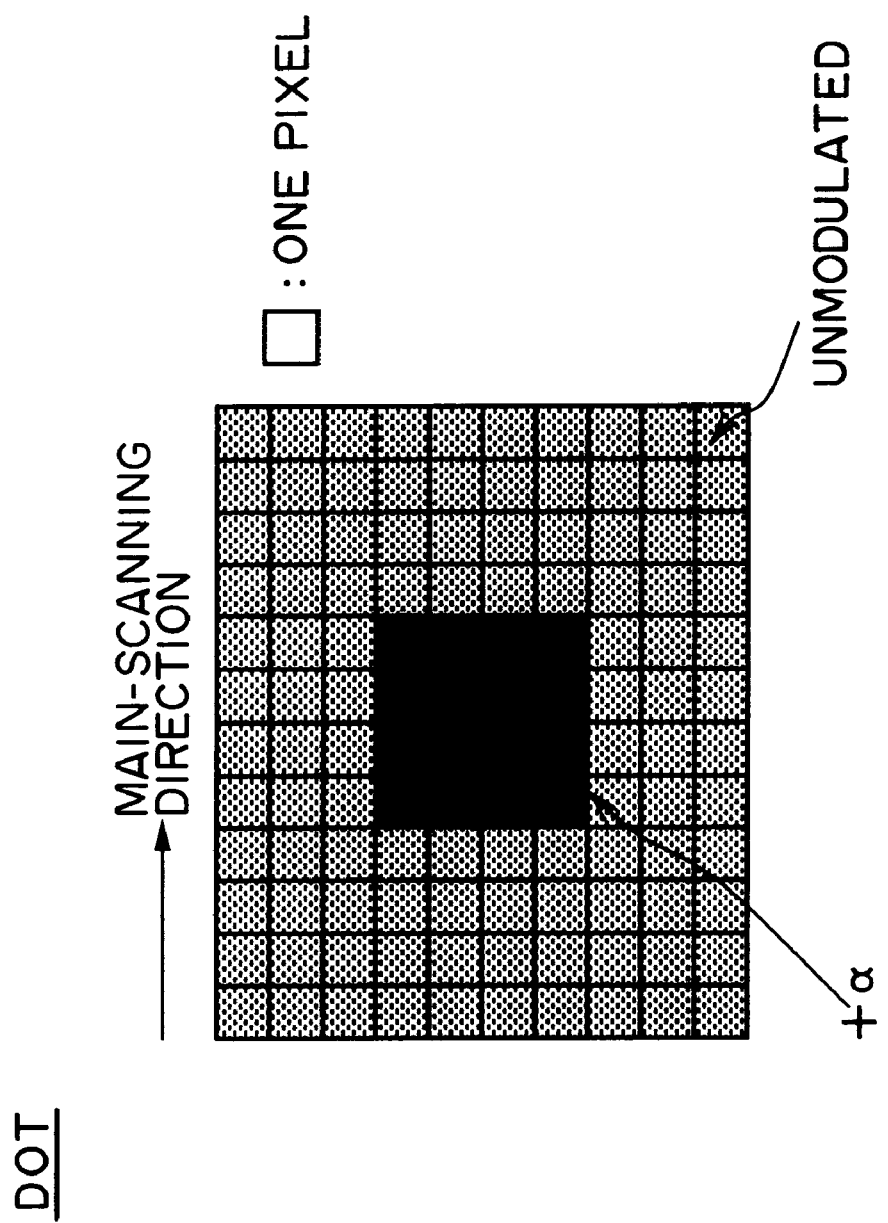
FIG. 20 is a diagram showing an added pattern according to a third embodiment.
Figure 21:
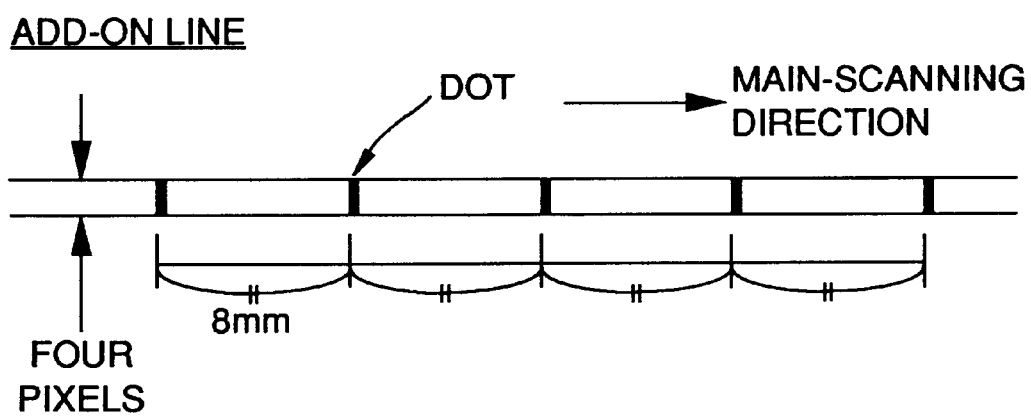
FIG. 21 is a diagram for describing an add-on line according to a third embodiment.
Figure 22:
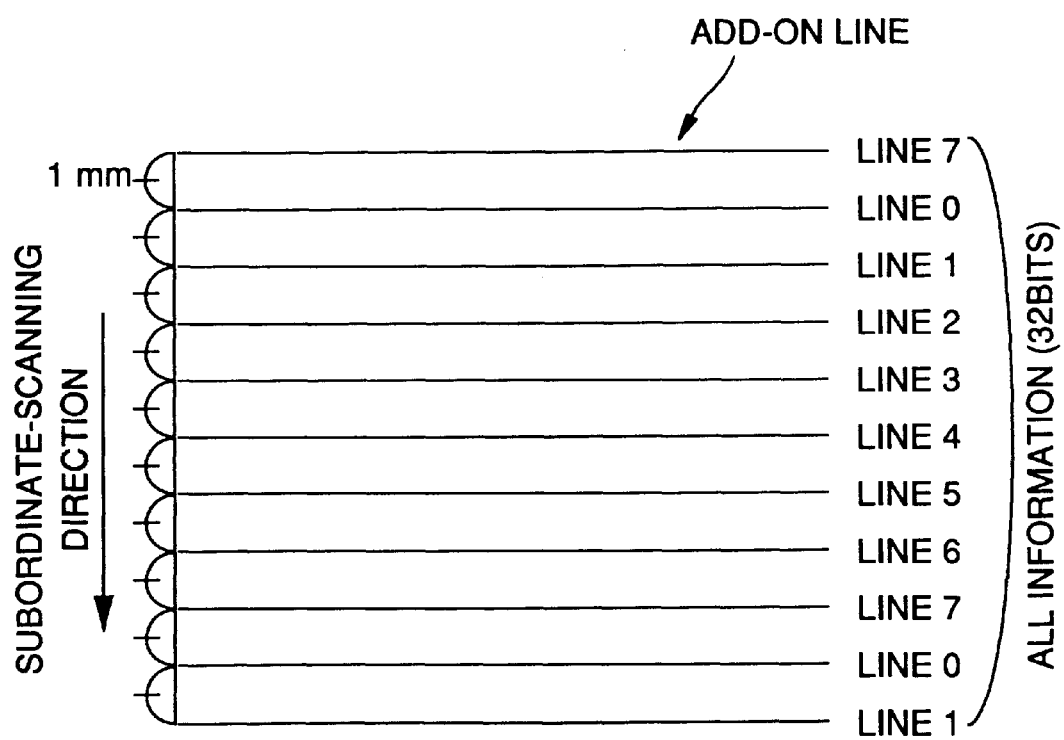
FIG. 22 is a diagram for describing the units of added patterns according to a third embodiment.

FIG. 20 is a diagram showing an added pattern according to the third embodiment, FIG. 21 is a diagram for describing an add-on line according to the third embodiment, FIG. 22 is a diagram for describing the units of added patterns according to a third embodiment, FIG. 23 is a diagram for describing an example of an added pattern according to a third embodiment and FIG. 24 is a diagram for describing a method of adding marks according to a third embodiment.

As shown in FIG. 20, the unit employed by the added pattern is a dot obtained by modulating (e.g., +α) each image signal of a total of 16 pixels (4×4 pixels). The reason for this is that since 200-line processing is executed in the printer of a color copying machine, cases arise in which pattern addition using a single pixel unit results in a pattern that is difficult to read, as mentioned earlier. As shown in FIG. 21, the dot is arrayed at equal intervals, i.e., every 8 mm (128 pixels) in the main-scanning direction. This row of dots shall be referred to as an "add-on line" hereinafter. As will be set forth below, four-bit information is represented by one add-on line (of four pixel width), all added information (32 bits) is represented by eight add-on lines, and this is repeated in the subordinate-scanning direction (FIG. 22). As illustrated in FIG. 23, information is placed upon each add-on line by a phase difference in dot position which occurs when a comparison is made with the immediately preceding add-on line. In order to prevent dots from becoming too conspicuous by appearing too close together, it is so arranged that dots are not printed close to the dots on the immediately preceding add-on line. Further, among the eight add-on lines (Line 0~Line 7) representing all of the added information, a dot is added to the right of each dot on the first add-on line (Line 0) and on the fourth add-on line (Line 3). As shown in FIG. 24, the dot is added 1 mm to the right of the original dot position on Line 0, and the dot is added 2 mm to the right of the original dot position on Line 3. This is a mark for making clear which part of the total added information is being represented by each add-on line. Since top and bottom in the subordinate-scanning direction cannot be determined with just one add-on line that adds on marks, the dots of the marks are added to two add-on lines. An added pattern is added solely by yellow toner so as not to be readily discriminated by the human eye. The reason for this is that the human eye has only a weak ability to discriminate patterns painted using yellow toner.

The pattern adding circuit according to this embodiment will now be described.

Figure 18:
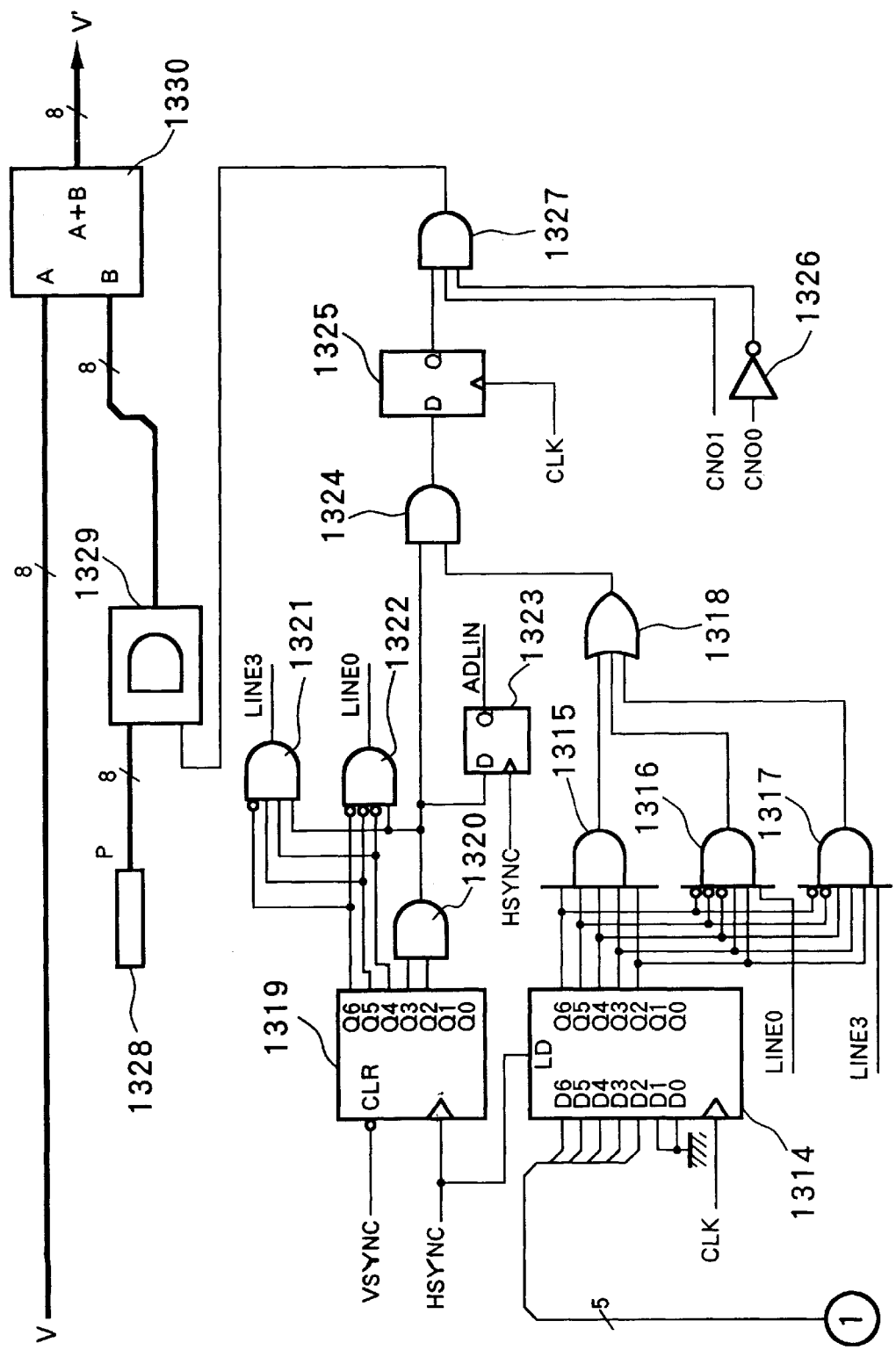
FIGS. 18 and 19 are block diagrams showing the construction of a pattern adding circuit according to a third embodiment.
Figure 19:
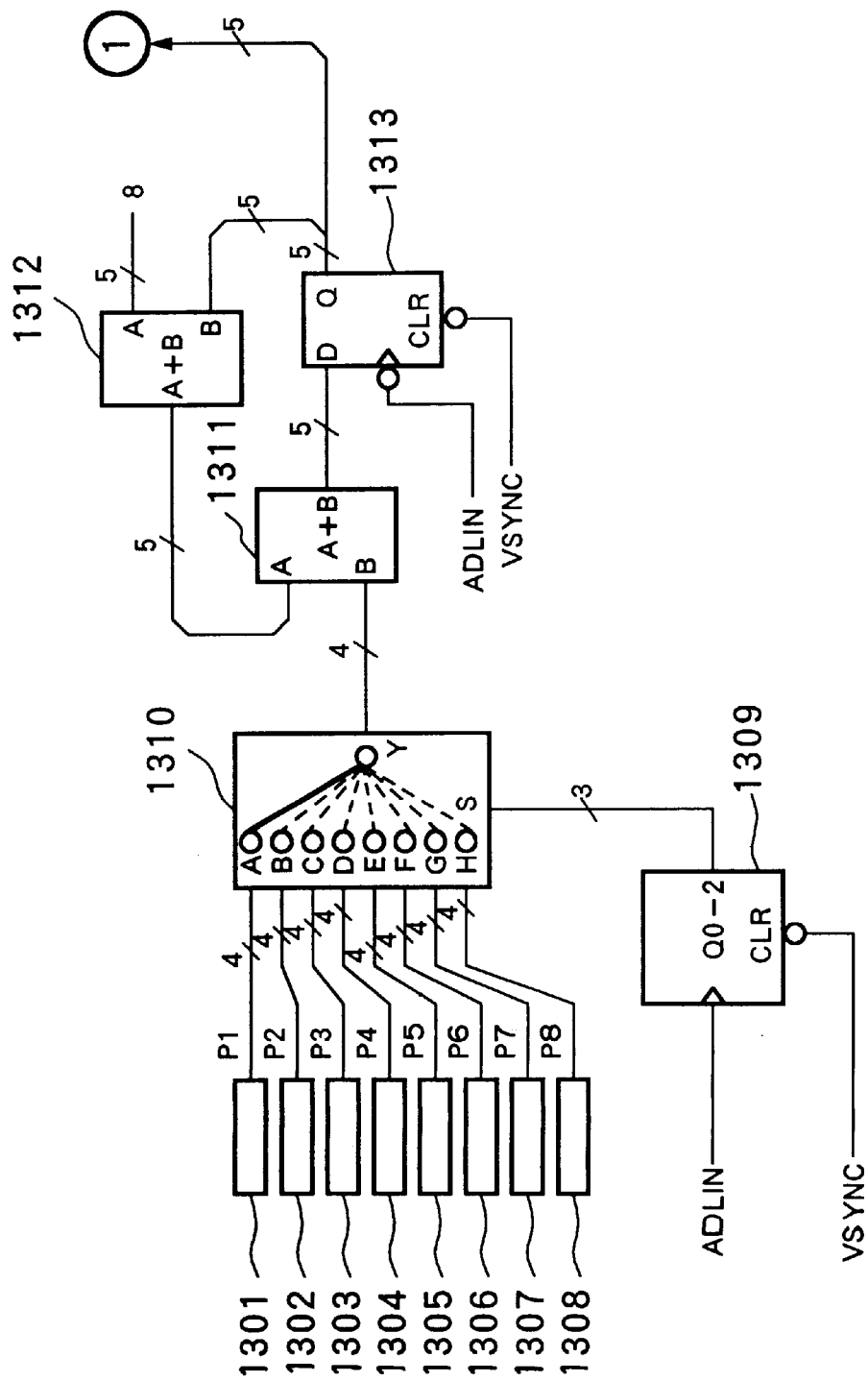

FIGS. 18 and 19 block diagrams showing the construction of a pattern adding circuit according to a third embodiment. The circuit includes a subordinate-scan counter 1319 and a main-scan counter 1314. The subordinate-scan counter 1319 repeatedly counts the main-scan synchronizing signal HSYNC at a seven-bit width, namely at a period of 128, and the main-scan counter 1314 counts the pixel synchronizing signal CLK at the seven-bit width or period of 128. The output of an AND gate 1320 attains the H level when the bits 2 and 3 of the subordinate-scan counter 1319 are both at the H level. That is, an H output of four lines is obtained every 16 lines in the subordinate-scanning direction. This is adopted as an enable signal of an add-on line. LINE 0 and LINE 3 are produced by gates 1322, 1321, the inputs to which are the output of the AND gate 1320 and the three higher order bits of the subordinate-scan counter 1319. These are signals that attain the H level when the add-on lines are Line 0, Line 3. Meanwhile, an initial value is loaded in the main-scan counter 1314 by HSYNC. Since the inputs to an AND gate 1315 are the five higher order bits of the main-scan counter 1314, the output thereof attains the H level for four pixels every 128 pixels. This output is a dot enable signal. Further, gates 1316, 1317, to which the inputs are the five higher order bits of the main-scan counter 1314 and the outputs LINE 0, LINE 3 of gates 1322, 1321, produce enable signals of dots of the marks on Line 0 and Line 3 of the add-on lines, respectively. These dot and mark enable signals are OR'ed by an OR gate 1318. Since the output of the OR gate 1318 becomes H even when there is no add-on line, an L output is obtained from an AND gate 1324 in the absence of an add-on line. The output of the AND gate 1324 is synchronized by the CLK signal using a flip-flop 1325, and an AND gate 1327 takes the AND between the output of this flip-flop and both of the two-bit CNO signals "0" and "1". The output of AND gate 1327 is delivered to an AND gate 1329. This is a signal which is effective only when CNO=2 holds, namely only when printing currently is being performed in the color yellow. The AND gate 1329 passes the value in register 1328 only when the output of the AND gate 1327 is H and outputs zero when the output of the AND gate 1327 is L. The output of the AND gate 1329 is inputted to an adder circuit 1330, where it is added to the image signal V to obtain an output V'. The adder circuit 1330, which is an adder having an eight-bit length, outputs zero when the result of addition becomes less than 0 and outputs 255 when the result of addition exceeds 255.

The value loaded in the main-scan counter 1314 is produced in the manner set forth below. First, a flip-flop 1313 and a counter 1309 are reset by VSYNC. Consequently, zero is set as the initial value of the main-scan counter 1314 in the case of the initial add-on line. A clock input ADLIN to the flip-flop 1309 is a signal that is the result of synchronizing the output of AND gate 1320, namely the add-on line enable signal, to HSYNC by means of a flip-flop 1323. The output of the flip-flop 1313 is applied as the load value of the main-scan counter 1314 and is inputted also to an adder 1312. The latter adds on a constant value of 8. This is an offset value for assuring that dots will not be printed too close to dots on the immediately preceding line. The output of the adder 1312 is inputted to an adder 1311. One other input to the adder 1311 has the output of a selector 1310 connected thereto. The selector 1310 selects one of registers 1301~1308 in which values of respective ones of the eight add-on lines have been set. A select signal applied to the selector 1310 is produced by the counter 1309. Since the counter 1309 is initially reset by VSYNC, the register 1301 is selected. The value in counter 1309 is incremented by the leading edge of the signal ADLIN, whereby the selector 1310 outputs the value of register 1302. This value and the output of the adder 1312 are added by the adder 1311. The output of the adder 1311 is latched by the flip-flop 1313 at the trailing edge of the signal ADLIN and is used as the initial value of the main-scan counter 1314. Thereafter, and in similar fashion, the initial value of the main-scan counter is set while the constant 8 and the register value of the next add-on line are added every add-on line.

Results of Copying

Figure 25:
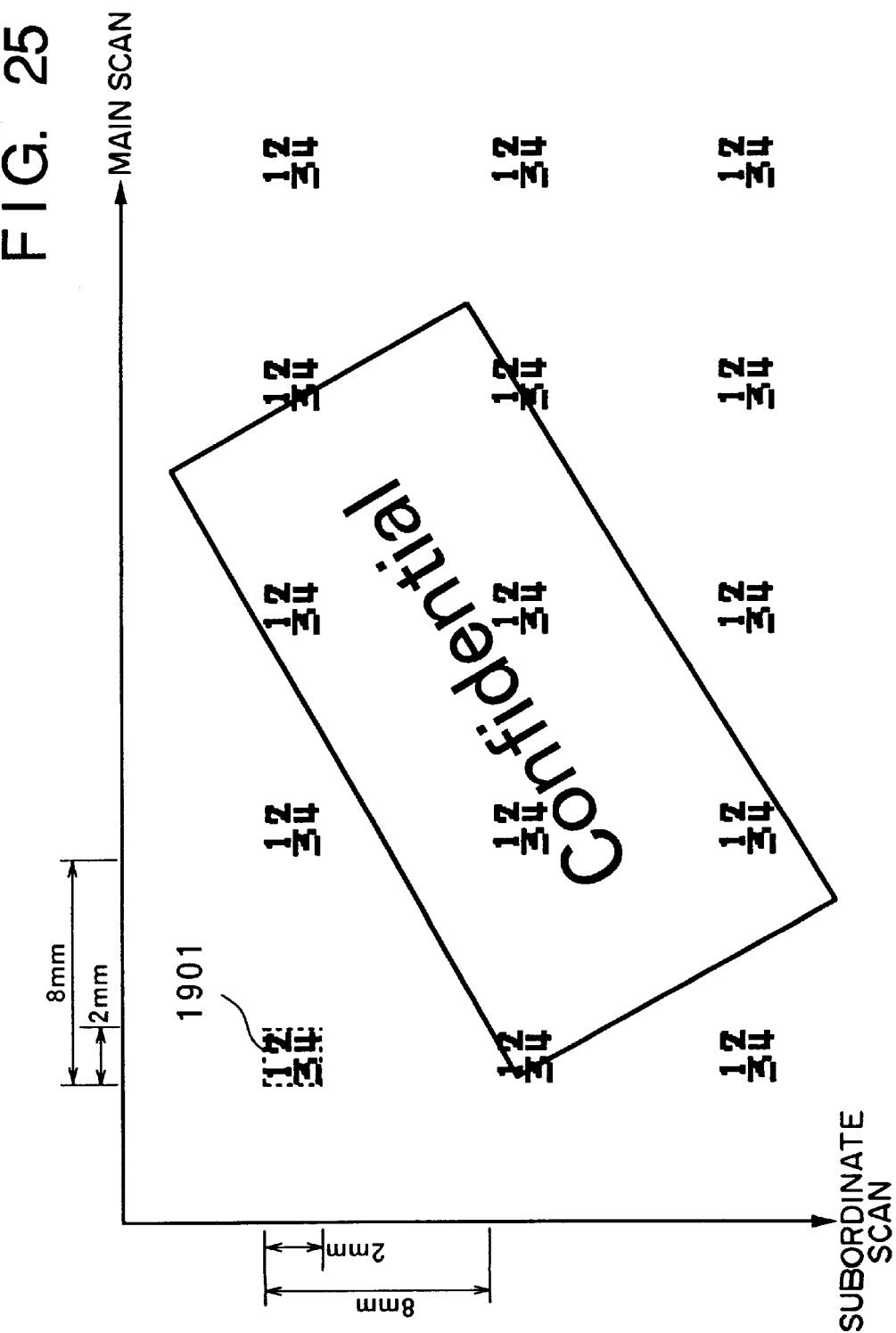

FIG. 25 is a diagram showing an example of the results of copying in a case where a common pattern is added on. A unit pattern is indicated at numeral 1901. These unit patterns thus clustered closely together are repeated in grid-like fashion to form an overall pattern.

Figure 26:
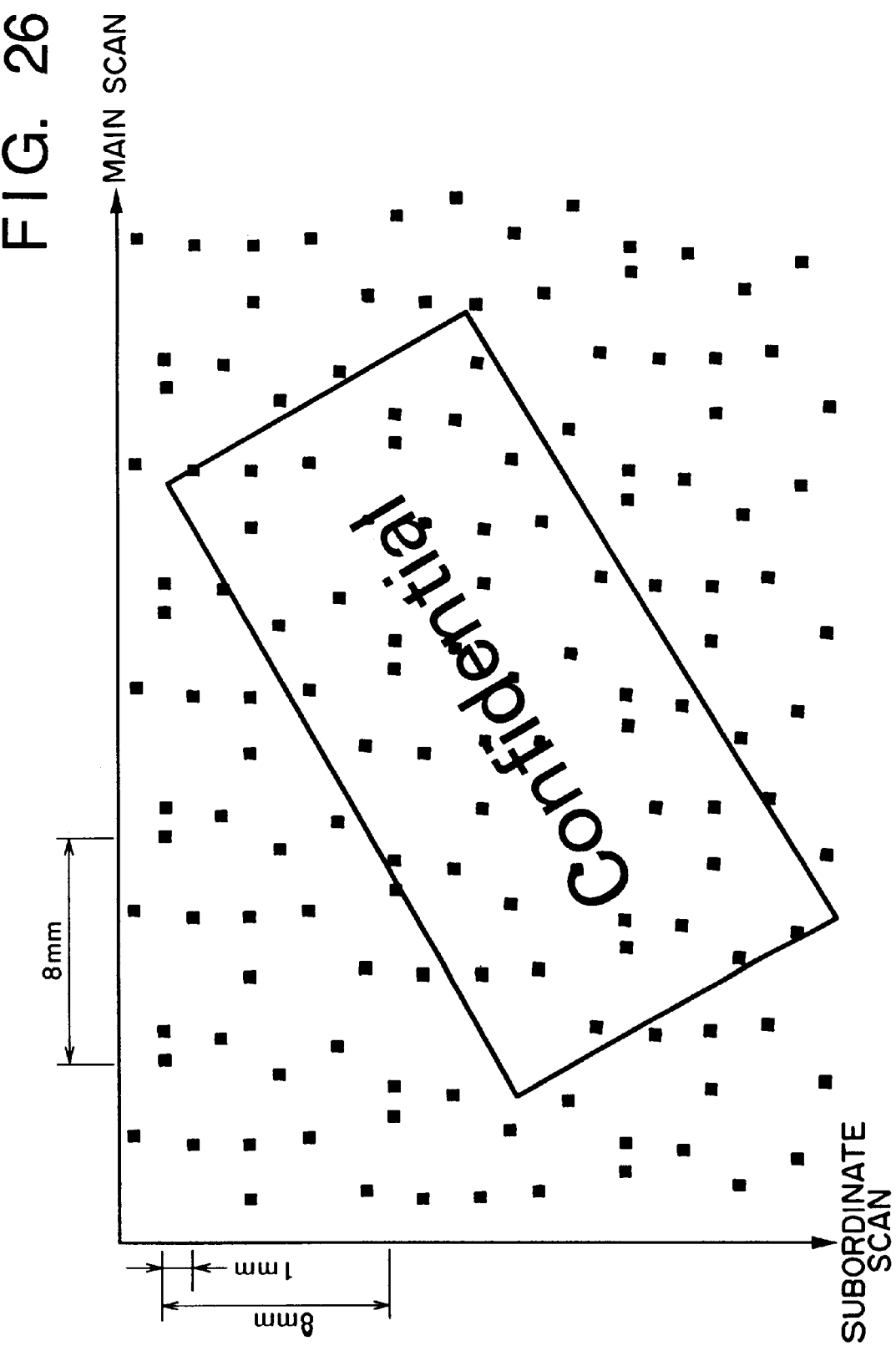
FIG. 26 is a diagram illustrating an example of results of copying according to a third embodiment.

FIG. 26 is a diagram illustrating an example of results of copying according to a third embodiment. In this embodiment, dots that have been dispersed form the pattern and therefore the dots are rendered less conspicuous. The patterns shown in FIGS. 25 and 26 may be manufacturing numbers specific to the copying machine or the results of coding the manufacturing number. When the copy is examined, the apparatus that produced the copy can be identified.

Thus, rather than repeating closely clustered unit patterns in the manner shown in FIG. 25, it is better to adopt the expedient of FIG. 26 since dispersing the dots makes it possible to make the added pattern less conspicuous.

Fourth Embodiment

The third embodiment described above may be applied also to the image scanning section described in the second embodiment.

The pattern adding circuit will be described in detail.

Pattern Adding Circuit

Figure 27:
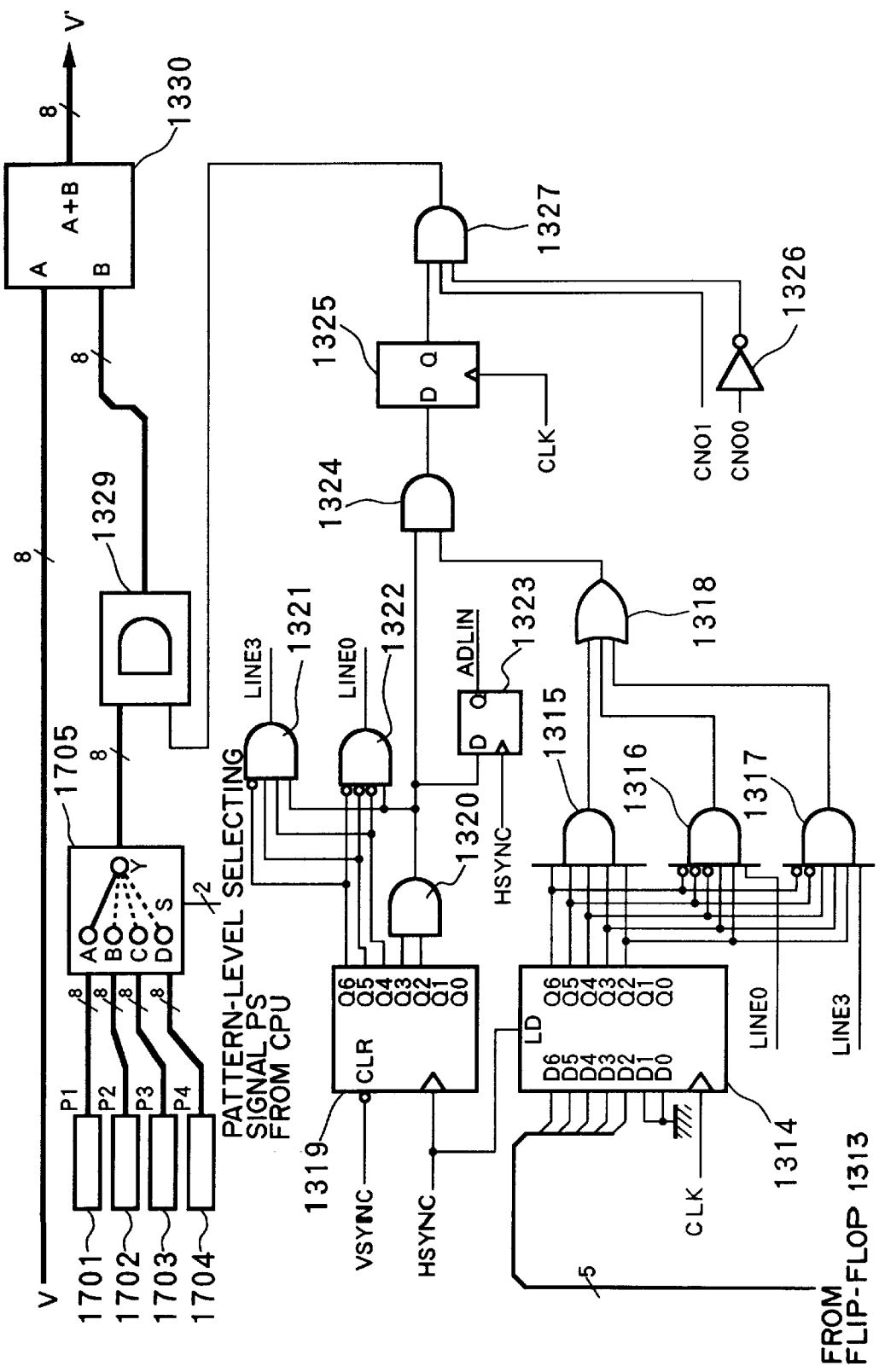
FIG. 27 is a block diagram showing the construction of a pattern adding circuit according to a fourth embodiment.

FIG. 27 is a block diagram showing the construction of a pattern adding circuit according to the fourth embodiment of the invention. Here the input signal of eight-bit width applied to the AND gate 1329 differs from that in the block circuits (FIGS. 18 and 19) of the pattern adding circuit according to the third embodiment. Other components are similar and therefore a description thereof is omitted. Portions corresponding to those in FIG. 19 are omitted from the drawing.

In FIG. 27, numeral 1705 denotes a 4-to-1 selector, and numerals 1701, 1702, 1703, 1704 denote registers. Values P1, P2, P3, P4 are stored in the respective registers 1701, 1702, 1703, 1704 in advance. Any level of from P1 to P4 is selected in dependence upon the designated pattern-level selecting signal PS from the CPU, the pattern is added to the input signal V via the AND gate 1329 and by the action of the adder 1330, and V' is outputted.

Here the operation of the selector 1705, which depends upon P1, P2, P3, P4, is similar to that of the second embodiment and need not be described again.

In the fourth embodiment also, the level of the added pattern is made variable in dependence upon the possibility that a specific original is present in the input image. As a result, the pattern can be made almost indistinguishable to the human eye in the case of an ordinary copy, and the pattern can be added to the copy more conspicuously the greater the possibility that the specific original is present in the copy.

Fifth Embodiment

The invention is not limited to the first through fourth embodiments. For example, though a manufacturing number specific to the apparatus or a code representing the number is added as the specific added pattern in the foregoing embodiments, any pattern will suffice so long as it is information that specifies the apparatus. Examples of information for specifying the apparatus are the date of manufacture, the lot number and the version number thereof.

Sixth Embodiment

In the first through fifth embodiments mentioned above, the copying machine that produced the copy is specified. However, this does not place a limitation upon the invention, for the person making the copy may be specified if desired. For example, copying machines already known include those which require insertion of an ID (identification) card such as one constituted by an IC card for specifying the user, and those requiring entry of an ID number by the pressing of keys, in order for the machine to be used. In copying machines of this kind, the recognized ID number or the coded form thereof may be added as the specific pattern.

Seventh Embodiment

In the first through fifth embodiments mentioned above, the copying machine that produced the copy is specified. In the sixth embodiment, the person making the copy is specified. However, this does not place a limitation upon the invention, for the date the copy was made or the coded form of the date may be added as the specific pattern.

Furthermore, it goes without saying that an embodiment obtained by combining two or more of the first through seventh embodiments also is possible.

The present invention can be applied to a system (a copying system, for example) constituted by a plurality of devices or to an apparatus (an image scanner, for example) comprising a single device. Furthermore, it goes without saying that the invention is applicable also to a case where the object of the invention is attained by supplying a program to a system or apparatus.

In accordance with the foregoing embodiments of the invention, as described above, it is possible to reduce a decline in picture quality brought about by an added pattern.

Eighth Embodiment

Figure 29:
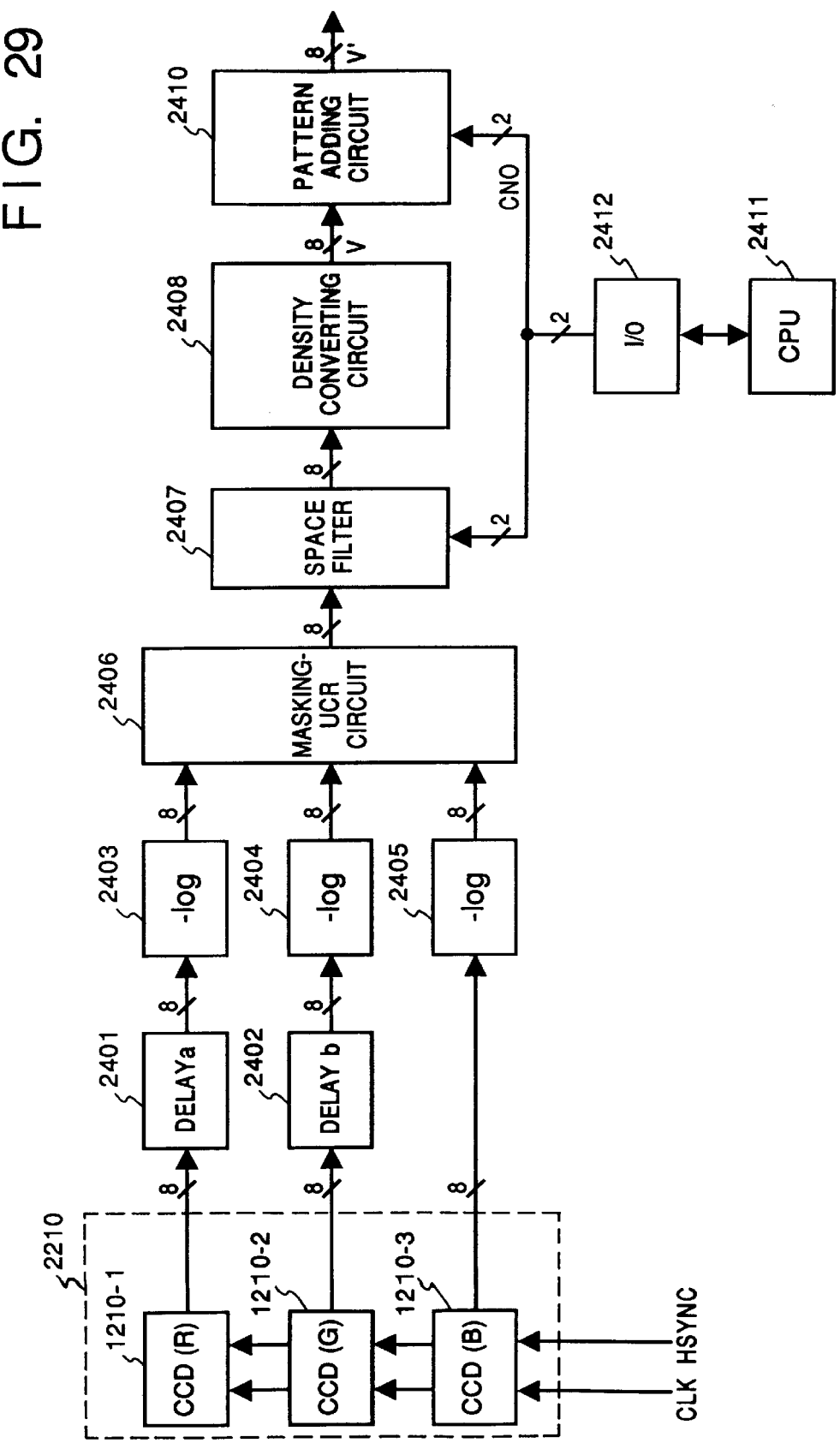
FIG. 29 is a block diagram showing an example of the construction of an image scanner according to the eighth embodiment.

FIG. 29 is a block diagram showing an example of the construction of an image scanner 201 according to an eighth embodiment of the invention.

In FIG. 29, numerals 1210-1 through 1210-3 denote CCD sensors (solid-state image sensing devices) having spectral sensitivity characteristics for red (R), green (G) and blue (B), respectively. These CCD sensors are incorporated in a three-line sensor 2210. The output of each CCD sensor is, say, an eight-bit signal resulting from an A/D conversion. Accordingly, each of the colors R, G, B is divided into 0~255 stages in conformity with the light intensity of each color.

The CCD sensors 1210-1 through 1210-3 of the present embodiment are arranged so as to be spaced apart a fixed distance, and therefore a displacement in terms of time is corrected using delay elements 2401 and 2401.

Numerals 2403~2405 denote log converters constituted by a look-up table ROM or RAM for converting the image data sent from the three-line sensor 2210 from a luminance signal into a density signal. Numeral 2406 denotes a well-known masking-UCR (undercolor removal) circuit. Though a detailed description is omitted, M, C, Y, K signals for output are generated at a prescribed bit length (e.g., eight bits) in field-sequential fashion, based upon the three signals inputted thereto, whenever there is a reading operation, Numeral 2407 denotes a well-known space filter circuit which corrects the space-frequency characteristic of the output signal from the circuit 2406. Numeral 2408 denotes a density converting circuit for correcting the density characteristic possessed by a printer 202. Like the log converters 2403~2405, this circuit is constituted by a ROM or RAM.

Numeral 2411 denotes a CPU for supervising control of the apparatus, and numeral 2412 denotes an I/O port connected to the CPU 2411.

A signal CNO separately inputted to the masking-UCR circuit 2406 and a pattern adding circuit 2410 is as illustrated in FIG. 28 and described above.

Pattern Adding Method

An example of a pattern adding method according to this embodiment will now be described.

Figure 30:
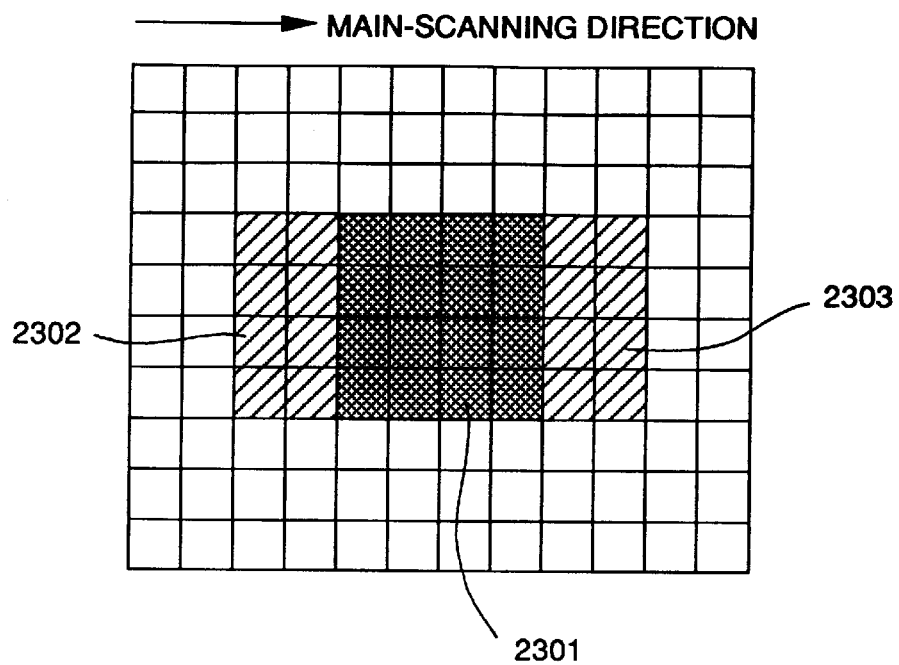
FIG. 30 is a diagram for describing an example of an added pattern according to the eighth embodiment.

FIG. 30 is a diagram for describing an example of an added pattern according to this embodiment.

In FIG. 30, 4×4 pixels contained in an area 2301 are modulated in such a manner that the tone levels of this image signal become +α, groups of 2×4 pixels contained in respective areas 2302 and 2303 are modulated in such a manner that the tone levels of the image signals thereof become −α, and pixels outside the areas 2301, 2302, 2303 are not modulated. The 8×4 pixels contained in the areas 2301, 2302, 2303 serve as the unit dots of an added pattern. The reason for thus using 8×4 pixels as the unit of an added pattern is that 200 line processing is executed, as mentioned earlier. If one pixel were adopted as the unit of an added pattern, instances would arise in which the added pattern would be difficult to read.

Figure 31:
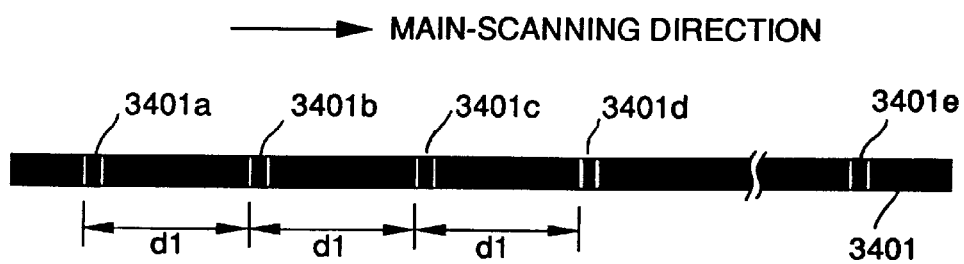
FIGS. 31 and 32 are diagrams showing an example of an add-on line according to the eighth embodiment.
Figure 32:
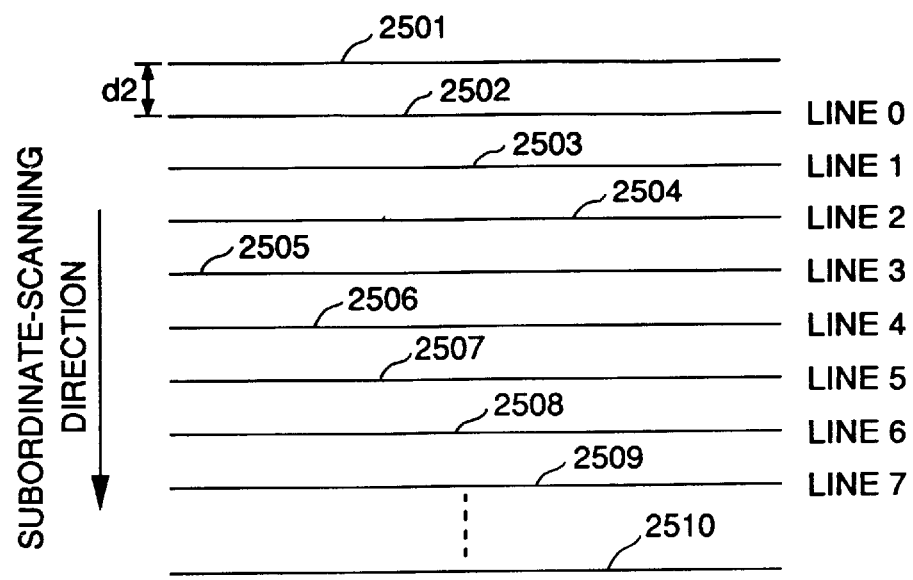

FIGS. 31 and 32 are diagrams showing an example of add-on lines according to this embodiment.

In FIG. 31, numeral 3401 denotes an add-on line, which has a width of four pixels. Numerals 3401a~3401e denote unit dots shown in FIG. 30, each unit dot being composed of 8×4 pixels. The unit dots 3401a~3401e are arrayed linearly at a substantially fixed period of d1 (e.g., 128 pixels) in the main-scanning direction.

In FIG. 32, numerals 2501~2510 denote add-on lines, each having a width of, e.g., four pixels. These add-on lines are arrayed at a substantially fixed period of d2 in the subordinate-scanning direction. Though the details will be described below, one add-on line represents four-bit information, for example, and eight add-on lines 2502~2509 form one set, thus making it possible to represent added information of 32 bits. The add-on lines are formed so as to repeat in the subordinate-scanning direction. Add-on lines 2501~2509 shown in FIG. 32 represent the same information, by way of example.

Figure 33:
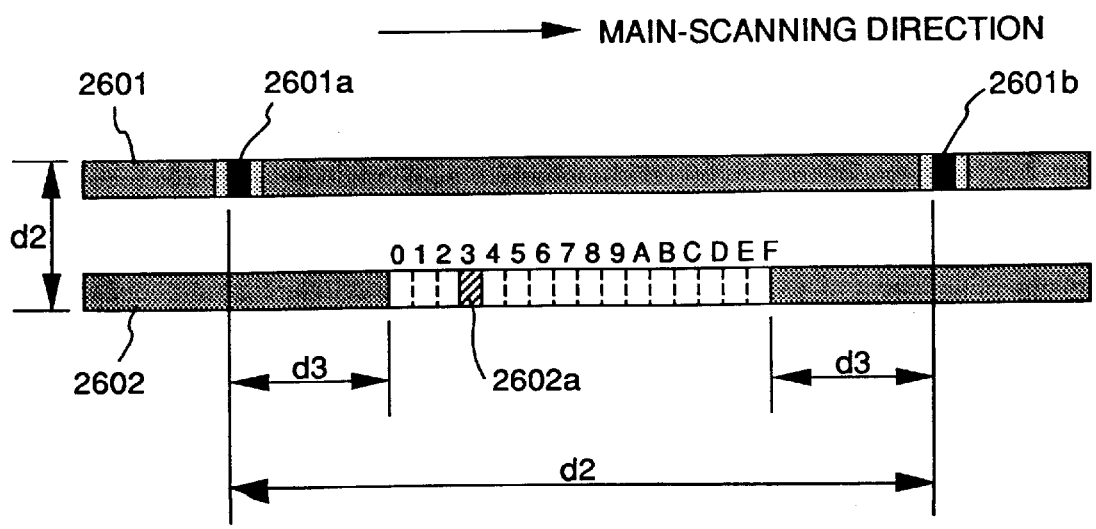

FIGS. 33, 34A and 34B illustrate an example of a method of expressing information by add-on lines.

In FIG. 33, numerals 2601 and 2602 denote add-on lines side by side in the subordinate-scanning direction. Further, numerals 2601a, 2601b and 2602a represent unit dots. In order to prevent the unit dots on mutually adjacent add-on lines from being too close together and, hence, appearing too conspicuously, the unit dots on the mutually adjacent add-on lines are set so as to be spaced apart by at least d3 (32 pixels, for example) in the main-scanning direction.

The data represented by the unit dots is decided by the phase difference between the unit dot 2602a and the unit dot 2601a. FIG. 33 illustrates an example representing four-bit information. In FIG. 33, the unit dot 2602a represents data "2". If the unit dot 2602a is at the leftmost end, for example, it will represent data "0"; if it is at the rightmost end, it will represent data "F".

FIG. 34A illustrates a first add-on line Line 0 and FIG. 34B a fourth add-on line Line 3 from among one set of add-on lines representing all added information.

As illustrated in FIGS. 34A and 34B, dots 2702a~2702d are added at a spacing d4 (e.g., 16 pixels) to the right of all of the original unit dots 2701a~2701d on Line 0, and dots 2705a~2705d are added at a spacing d5 (e.g., 32 pixels) to the right of all of the original unit dots 2704a~2704d on Line 3. The added dots are marks for making clear what the number of each add-on line is. Since top and bottom in the subordinate-scanning direction cannot be determined even from the output image, the marks are added to two add-on lines.

An added pattern is added solely by yellow toner, for example, so as not to be readily discriminated by the human eye. The reason for this is that the human eye has only a weak ability to discriminate patterns painted using yellow toner.

Further, it is required that the dot spacing of the added patterns in the main-scanning direction and the repetition interval of all added information in the subordinate-scanning direction be decided in such a manner that all information will be reliably added to plain, uniform areas of the specific original on which the dots can be discriminated with certainty. One yardstick would be to add the information at a spacing of no more than half the width of a uniform area of the specific original on which the dots can be discriminated reliably.

Pattern Adding Circuit

An example of the pattern adding circuit according to this embodiment will now be described.

Figure 35:
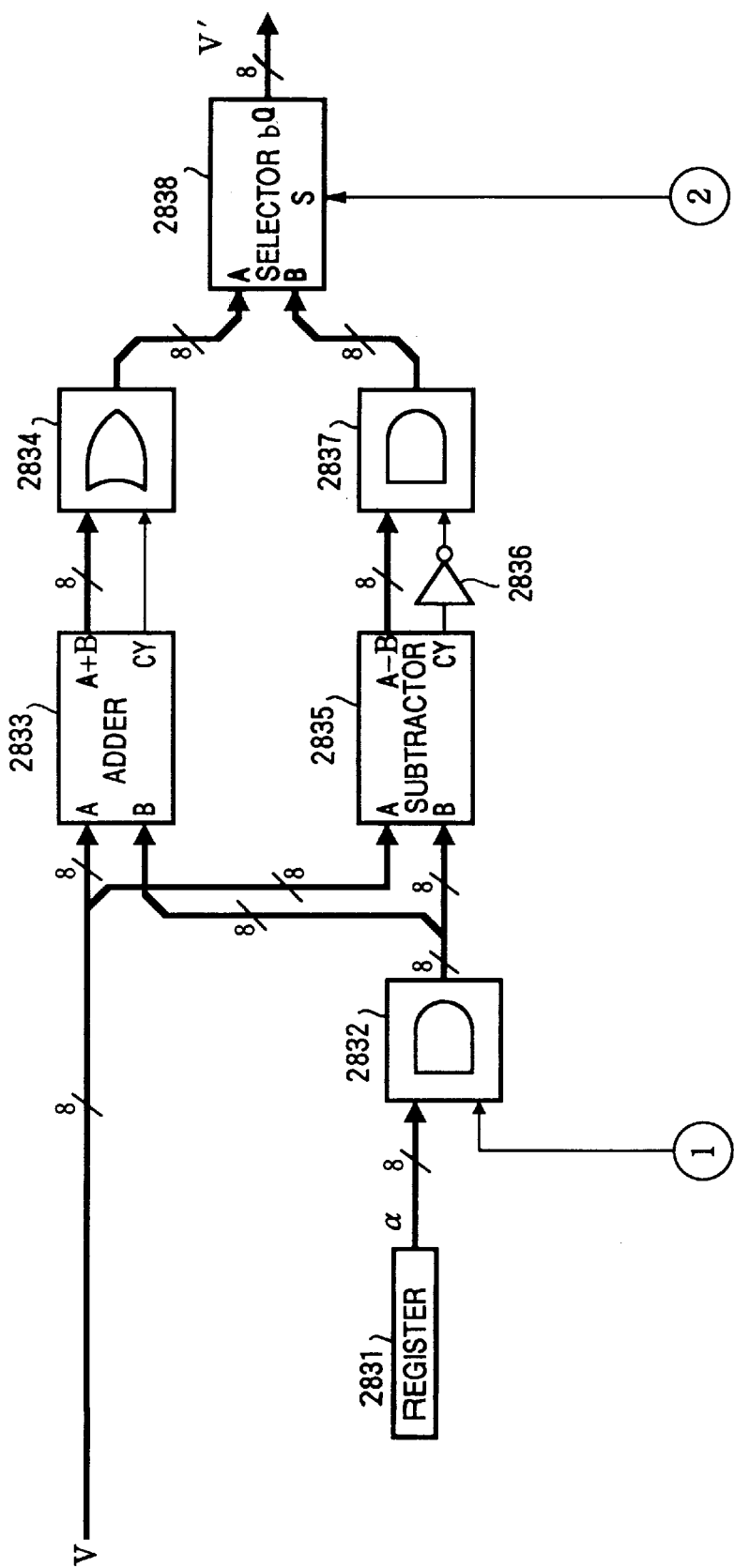
FIGS. 35, 36 and 37 are block diagrams showing an example of the construction of a pattern adding circuit according to the eighth embodiment.
Figure 36:
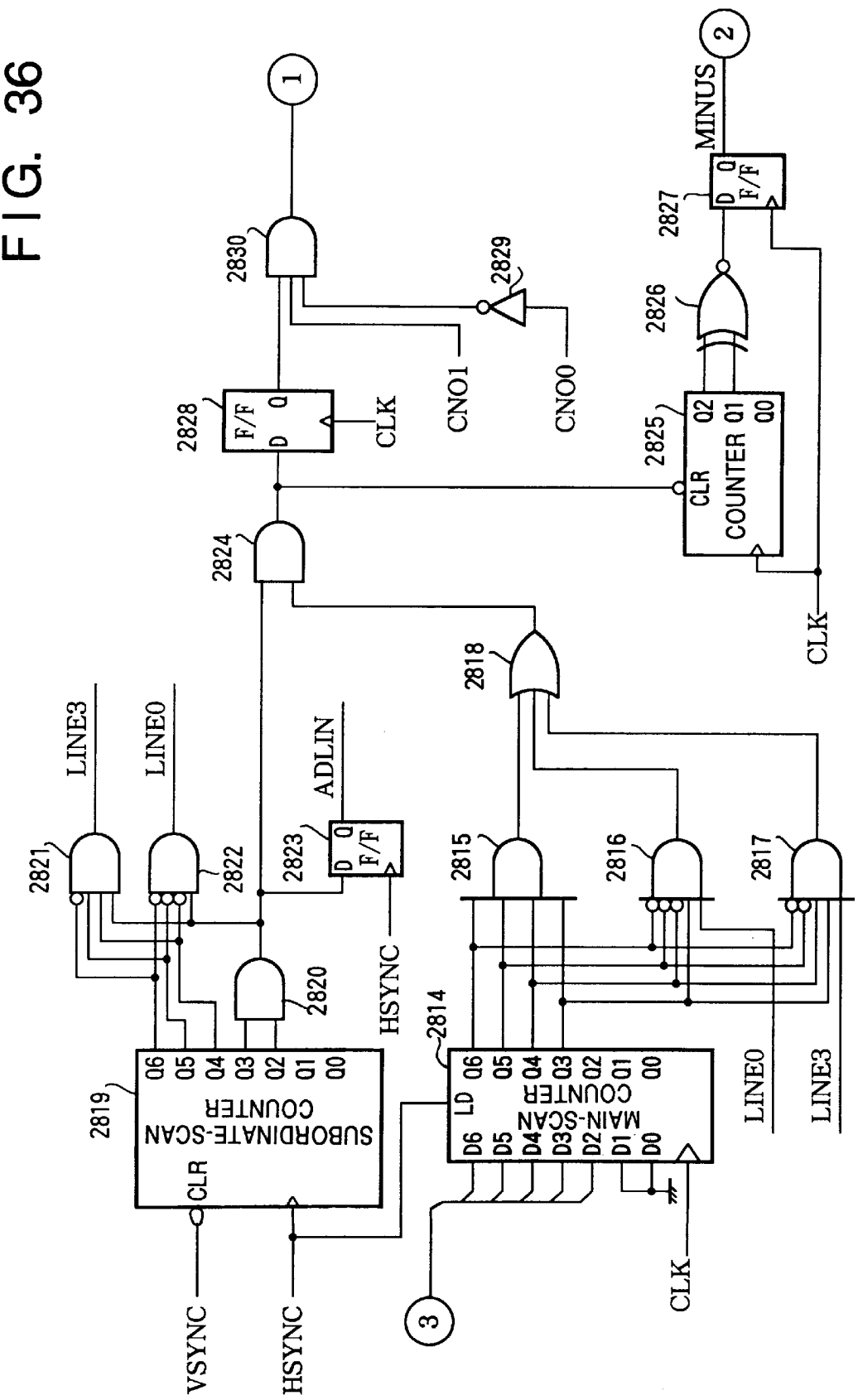
Figure 37:
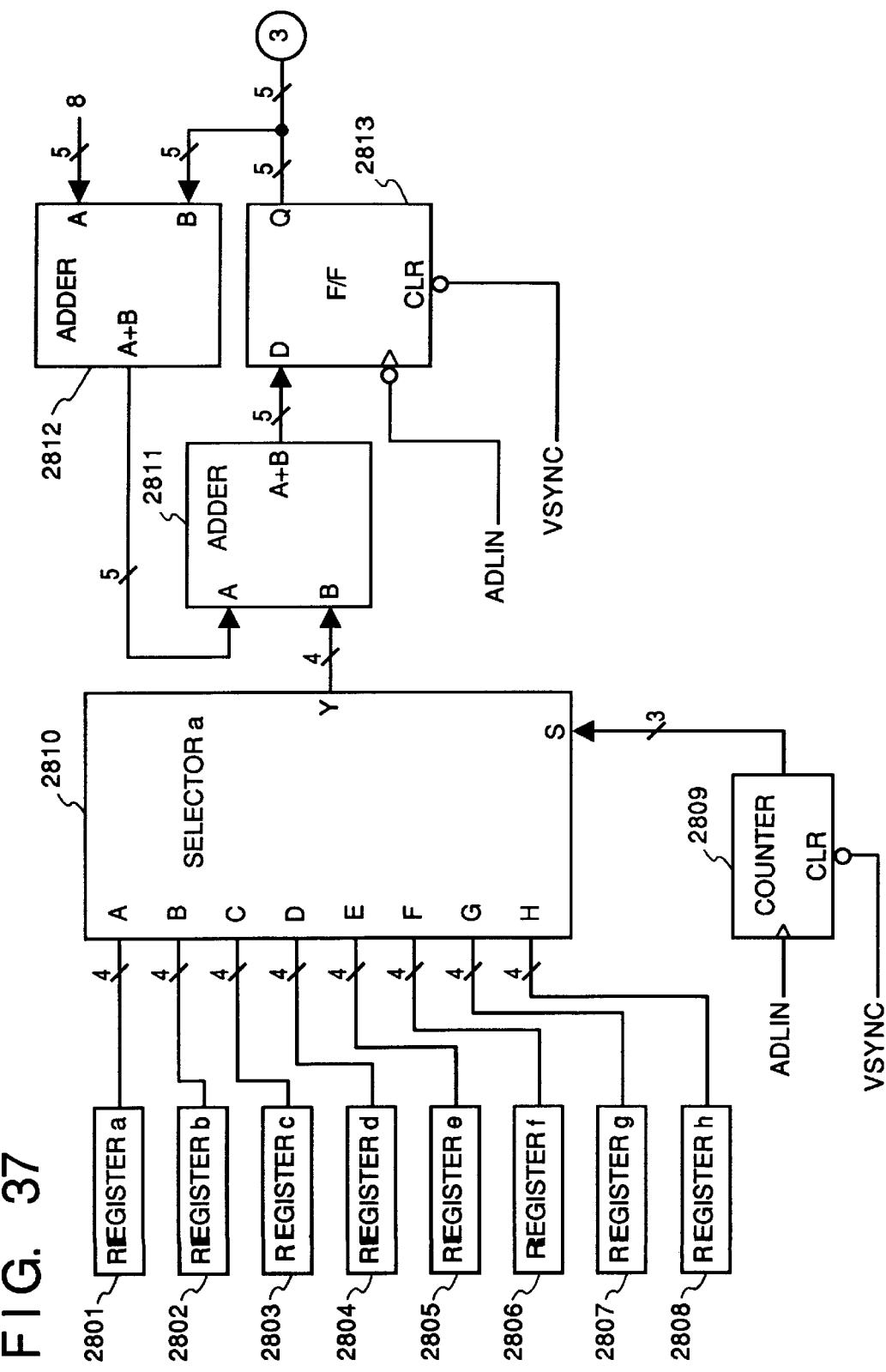

FIGS. 35, 36 and 37 are block diagrams showing an example of the construction of the pattern adding circuit 2410 according to this embodiment.

In these Figures, a subordinate-scan counter 2819 repeatedly counts a main-scan synchronizing signal HSYNC and the main-scan counter 2814 repeatedly counts a pixel synchronizing signal CLK at a seven-bit width or period of 128. An AND gate 2820 connected to outputs Q2, Q3 of the subordinate-scan counter 2819 outputs an H-level signal when bits 2 and 3 of the subordinate-scan counter 2819 are at the H level. That is, the H output of AND gate 2820 attains the H level for a time period of four lines every 16 lines in the subordinate-scanning direction. This is adopted as an enable signal of an add-on line.

The output of the AND gate 2820 and the three higher order bits (Q4~Q6) of the subordinate-scan counter 2819 enter an AND gate 2822 and an AND gate 2821, whereby an enable signal LINE 0 of line 0 of the add-on lines and an enable signal LINE 3 of line 3 of the add-on lines are produced, respectively.

Meanwhile, though the details will be described below, an initial value is loaded in the main-scan counter 2814 by HSYNC, and the four higher order bits (Q3~Q6) of the main-scan counter 3814 are applied to gates 2815~2817. The output of AND gate 2815 attains the H level for a time period of eight pixels every 128 pixels. This output serves as a dot enable signal. Further, gates 2816, 2817, to which the inputs are the four higher order bits of the main-scan counter 2814 as well as the signals LINE 0, LINE 3, respectively, produce enable signals of the marks on Line 0 and Line 3, respectively. These dot and mark enable signals are OR'ed by an OR gate 2818. The output of the OR gate 2818 and the output of the AND gate 2820 are AND'ed by an AND gate 2824, the output of which serves as a dot and mark enable signal that attains the H level only on an add-on line.

The output of the AND gate 2824 is synchronized by pixel synchronizing signal CLK using a flip-flop 2828, and an AND gate 2830 takes the AND between the output of this flip-flop and the output-color selecting CNO signals of two bits. The bit 0 of the signal CNO is inverted by an inverter 2829 before entering the AND gate 2830, and the bit 1 of the signal CNO is applied to the AND gate 2830 intact. Therefore, when signal CNO="10" holds, namely when printing of a color image is performed in the color yellow, the enable signal for the dots and marks become effective.

Furthermore, the output of the AND gate 2824 is connected also to a clear terminal CLR of a counter 2825. The latter counts the pixel synchronizing signal CLK only when the output of AND gate 2824 is H, namely only when a dot on an add-on line is enabled. Bits 1 and 2 at the output of the counter 2825 are inputted to an ex-NOR gate 2826, and the output of the ex-NOR gate 2826 attains the L level for a duration of 4CLK, which is intermediate the dot interval (8CLK) of the add-on line. The output of the ex-NOR gate 2826 is synchronized to the pixel synchronizing signal CLK by a flip-flop 2827 and is delivered as a signal MINUS.

It should be noted that the flip-flop 2827 is for removing spikes from the signal MINUS and establishing phase agreement with the enable signal for the dots of the add-on lines.

The signal MINUS is inputted to the selection terminal S of a selector 2838.

The inputs to an AND gate 2832 are a modulation amount α of, say, eight bits, from a register 3831 and the output of the AND gate 2830. Since the output of the AND gate 2830 attains the H level at the timing of the dot of an add-on line, the AND gate 2832 outputs the modulation amount α at the timing of the dot of the add-on line. Accordingly, pixels other than those of the dot of the add-on line are not modulated since the modulation amount outputted by the AND gate 2832 becomes 0.

Numeral 2833 denotes an adder and numeral 2835 a subtractor to the A terminal of each of which an image signal V of, say, eight bits, is inputted. The modulation amount a outputted by the AND gate 2832 is applied to the B terminal of the adder 2833 and subtractor 2835. The output of the adder 2833 is inputted to the OR gate 2834, and the output of the subtractor 2835 is inputted to the AND gate 2837.

When the sum V+α calculated by the adder 2833 overflows and a carry signal CY is produced, the OR gate 2834 forcibly makes the output of the adder equal to 255, by way of example. When the difference V−α calculated by the subtractor 2835 underflows and a carry signal CY is produced, an AND gate 2837 forcibly makes the output of the subtractor equal to 0, for example, in response to the carry signal CY inverted by an inverter 2836.

The sum and difference thus calculated are inputted to the selector 2838, which outputs one of these signals in response to the signal MINUS.

The dot modulation shown in FIG. 30 is performed by the circuit arrangement described above.

The value loaded in the main-scan counter 2814 is produced in the manner set forth below.

First, a flip-flop 2813 and a counter 2809 are reset by VSYNC. Consequently, zero is set as the initial value of the main-scan counter 2814 in the case of the initial add-on line. A signal ADLIN inputted to the clock terminal of the counter 2809 and flip-flop 2813 is a signal that is the result of synchronizing the output of AND gate 2820, namely the add-on line enable signal, to the main-scan synchronizing signal HSYNC by means of a flip-flop 2823.

A selector 2810 selects and outputs one of registers 2801~2808, in which values (e.g., four-bit values) of respective ones of the eight add-on lines have been set, in dependence upon, say, a three-bit signal inputted to a select terminal S of the selector. The select signal applied to the selector 2810 is produced by the counter 2809. Since the counter 2809 is cleared by the subordinate-scan signal VSYNC at the timing of the initial add-on line, the selector signal is 0 initially. Accordingly, the selector 2810 selects the register 2801. The value in counter 2809 is incremented when the signal ADLIN rises, whereby the selector 2810 selects the register 2802. Thereafter, and in similar fashion, the selector 2810 repeats selection from register 2803 to register 2808 successively in synchronism with the signal ADLIN.

The output of the selector 2810 is added to the output of adder 2812 by an adder 2811, the output of which is inputted to the flip-flop 2813 so as to be latched by the trailing edge of the signal ADLIN before being inputted to the main-scan counter 2814.

The output of the flip-flop 2813 is sent to the main-scan counter 2814 and also to the terminal B of the adder 2812.

Here a constant value of 8, for example, inputted to the terminal A is added to the signal at terminal A, and the resulting sum is sent to the adder 2811. This is an offset value for assuring that the positions of dots on an add-on line will be sufficiently spaced away from the positions of dots on the immediately preceding line in the subordinate-scanning direction.

Results of Copying

Figure 38:
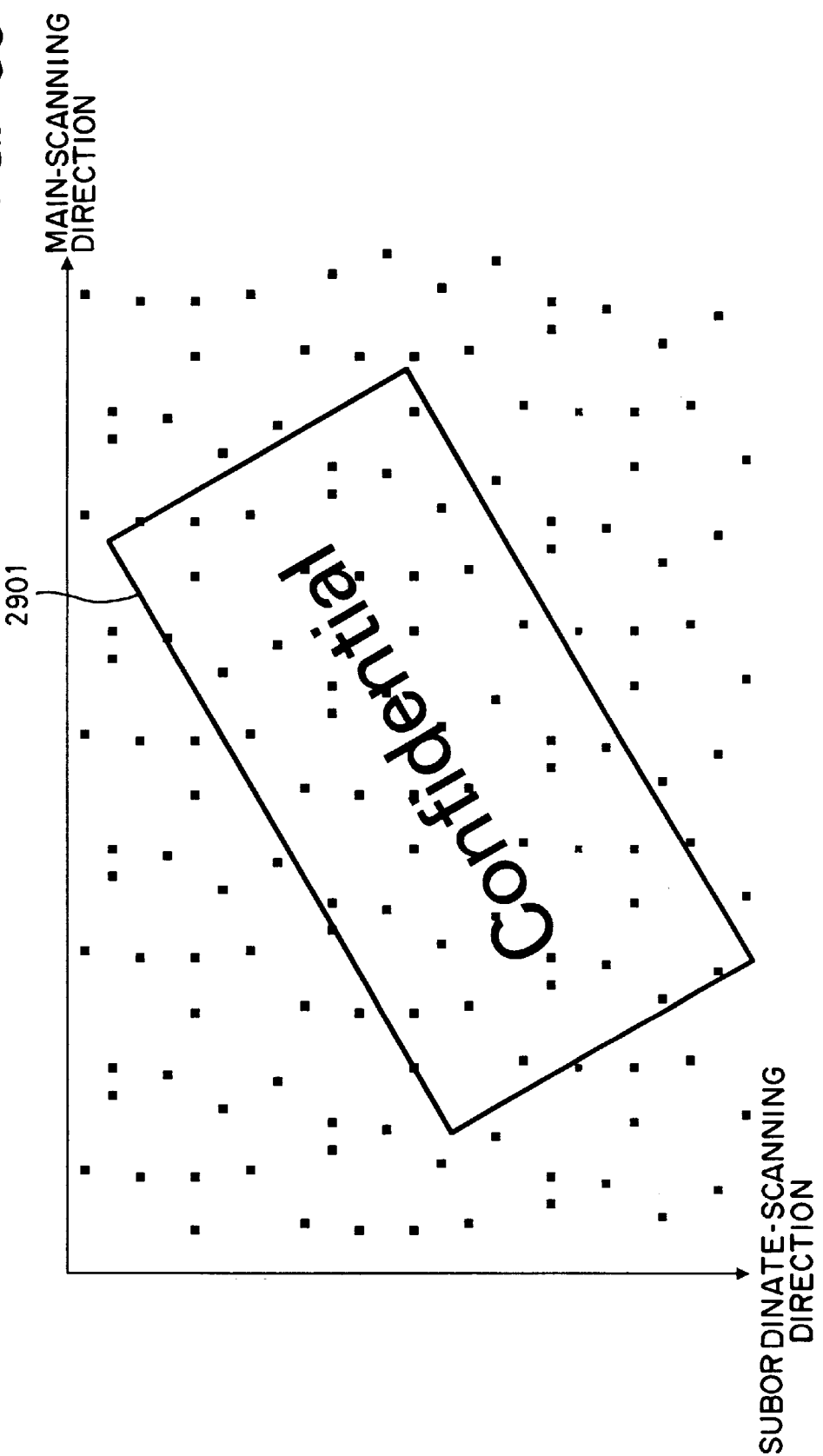
FIG. 38 is a diagram illustrating an example of results of copying according to the eighth embodiment.

FIG. 38 is a diagram illustrating an example of results of copying according to this embodiment. This diagram illustrates only an example of the array of unit dots on add-on lines.

In FIG. 38, numeral 2901 denotes the image of a specific original contained in the results of copying. Unit dots on the add-on lines are indicated by the black squares.

Thus, in accordance with this embodiment, as described above, the manufacturing number specific to a copying machine, or the manufacturing number in the form of a code or symbols, is represented by an added pattern. As a result, even if the embodiment is utilized for unlawful copying, the copying machine used in making the unlawful copy can be specified by examining the copy.

Furthermore, when the pattern is added to the output image, complimentary image-signal modulation is combined with the pattern in small areas and overall density is preserved, thereby making it possible to eliminate a change in color shade and reduce deterioration in picture quality.

According to the complimentary image-signal modulation of the kind shown in FIG. 30, the added patterns become easier to notice and reading of the added information is facilitated.

Ninth Embodiment

A ninth embodiment of the present invention will now be described.

In the ninth embodiment, portions similar to those of the eighth embodiment are designated by like reference characters and need not be described in detail again.

The internal construction of the apparatus according to the ninth embodiment is substantially the same as that shown in FIG. 21 and therefore a detailed description thereof is omitted.

Figure 39:
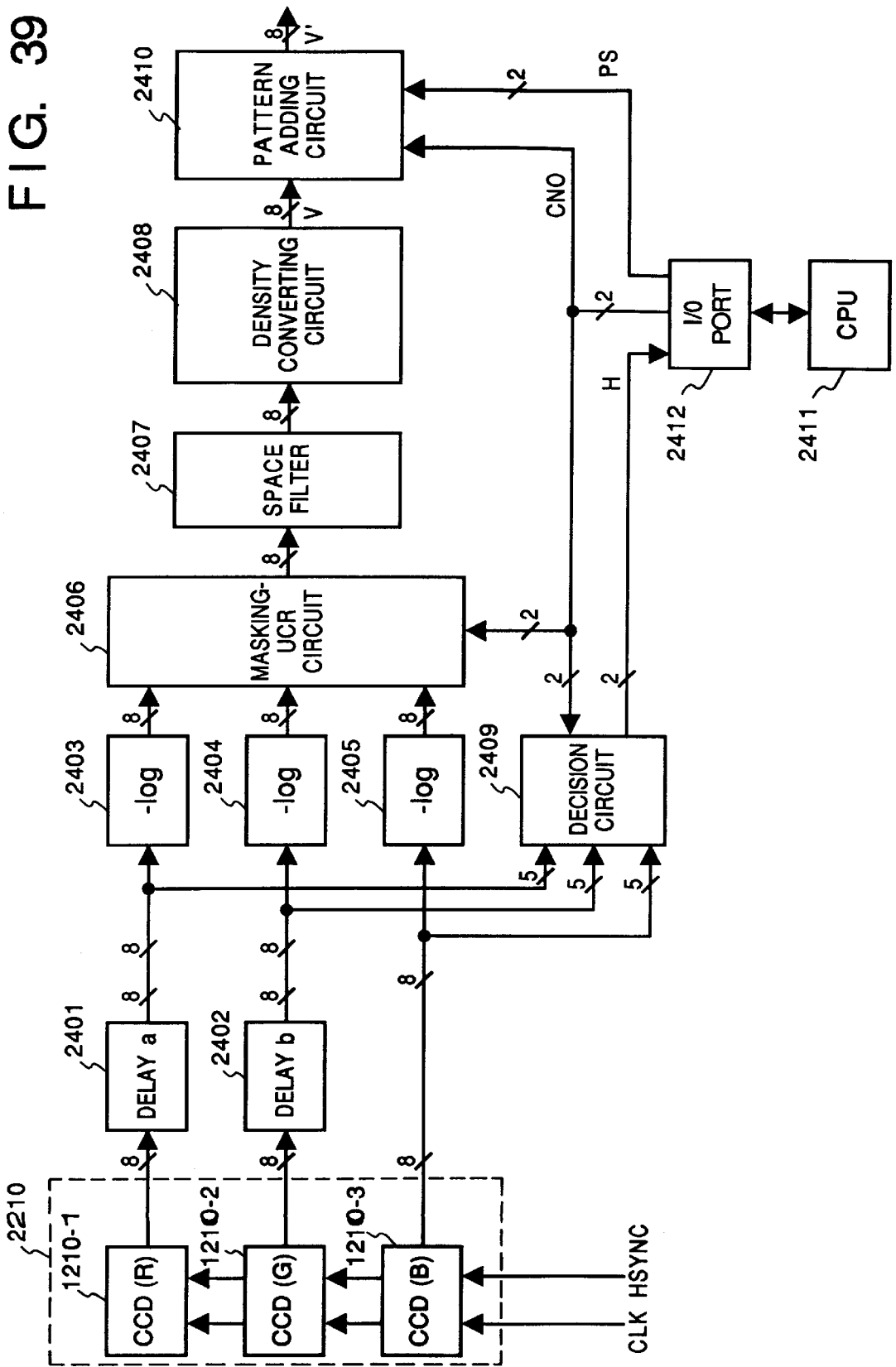
FIG. 39 is a block diagram showing the construction of an image scanner according to a ninth embodiment.

FIG. 39 is a block diagram showing the construction of the image scanner 201 according to the ninth embodiment.

The image scanner of this embodiment differs from the image scanner 201 of the eighth embodiment shown in FIG. 29 in that the scanner is additional provided with a decision circuit 2409 for judging specific originals.

The decision circuit 2409 for judging specific originals judges the possibility that image data currently being read in contains the image data of a specific original, and outputs the result of judgment as a two-bit decision signal H. More specifically, the decision circuit 2409 outputs a signal indicative of H="11" when it is most likely that at least one specific original from among a plurality thereof is currently being read in, and outputs a signal indicative of H="00" when the foregoing is least likely to hold.

Further, the color-output selection signal CNO enters the decision circuit 2409. In accordance with this signal, the decision circuit 2409 changes over the judgment criteria in conformity with each of the four reading operations, whereby a decision regarding different specific originals can be rendered in each reading operation.

Furthermore, though the details will be described below, the pattern adding circuit 2410 changes the pattern adding processing in dependence upon the two-bit pattern-level selecting signal PS outputted by the CPU 2411.

Timing Chart

Figure 40:
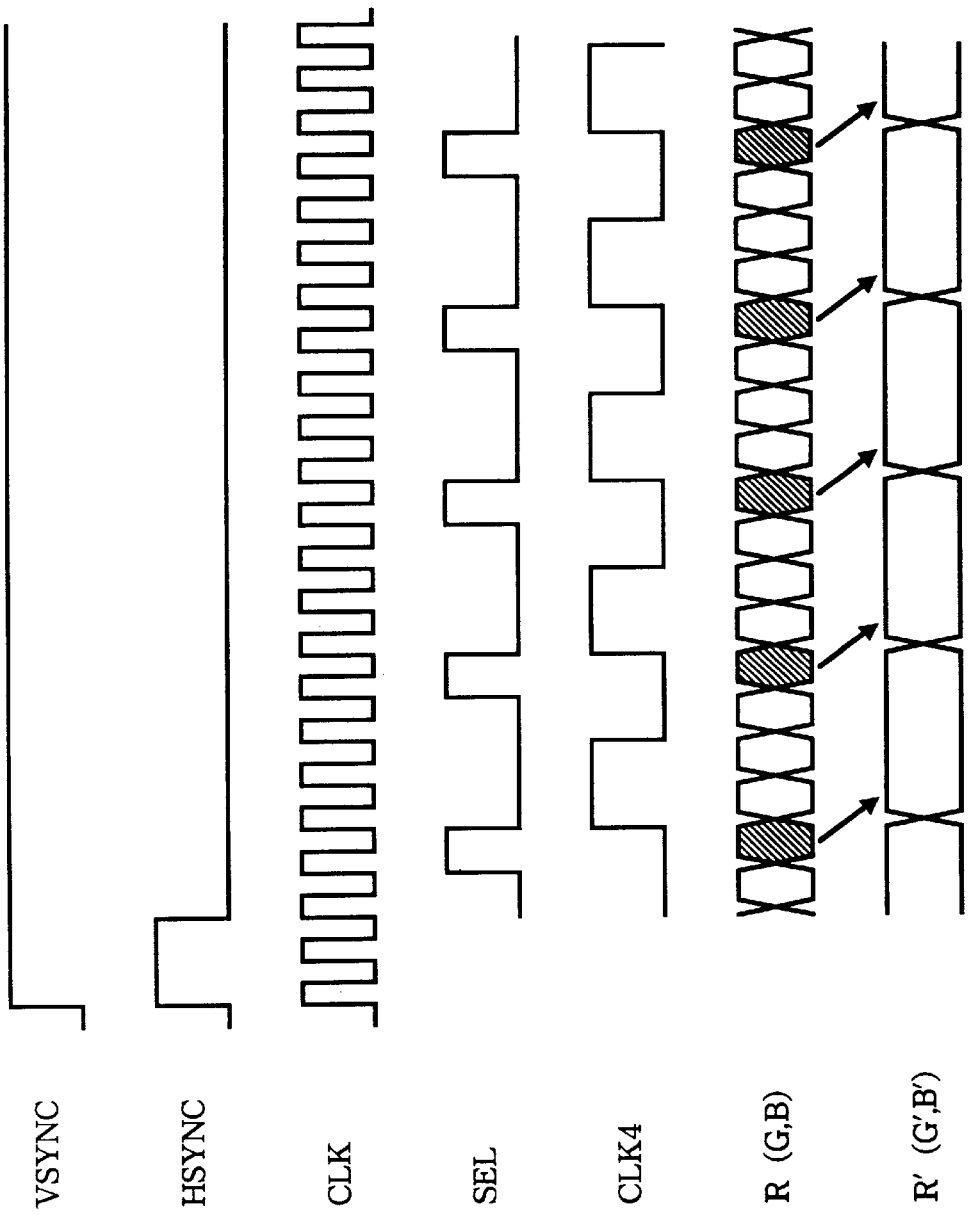
FIG. 40 is an example of a main-scanning timing chart according to the ninth embodiment.

FIG. 40 is an example of a timing chart of main scanning according to this embodiment.

In FIG. 40, VSYNC represents a subordinate-scan synchronizing signal, namely a signal that indicates the image output interval of a subordinate scan, and HSYNC represents a main-scan synchronizing signal for achieving synchronization with the start of main scanning. CLK is an image synchronizing signal which, in this embodiment, is the basic clock of a variety of image processing operations.

A signal CLK4 is a basic clock in the decision circuit 2409 and is obtained as a result of frequency-dividing CLK by four. SEL represents a timing signal used by a thinning-out circuit 3301 shown in FIG. 41A.

Figure 41A:
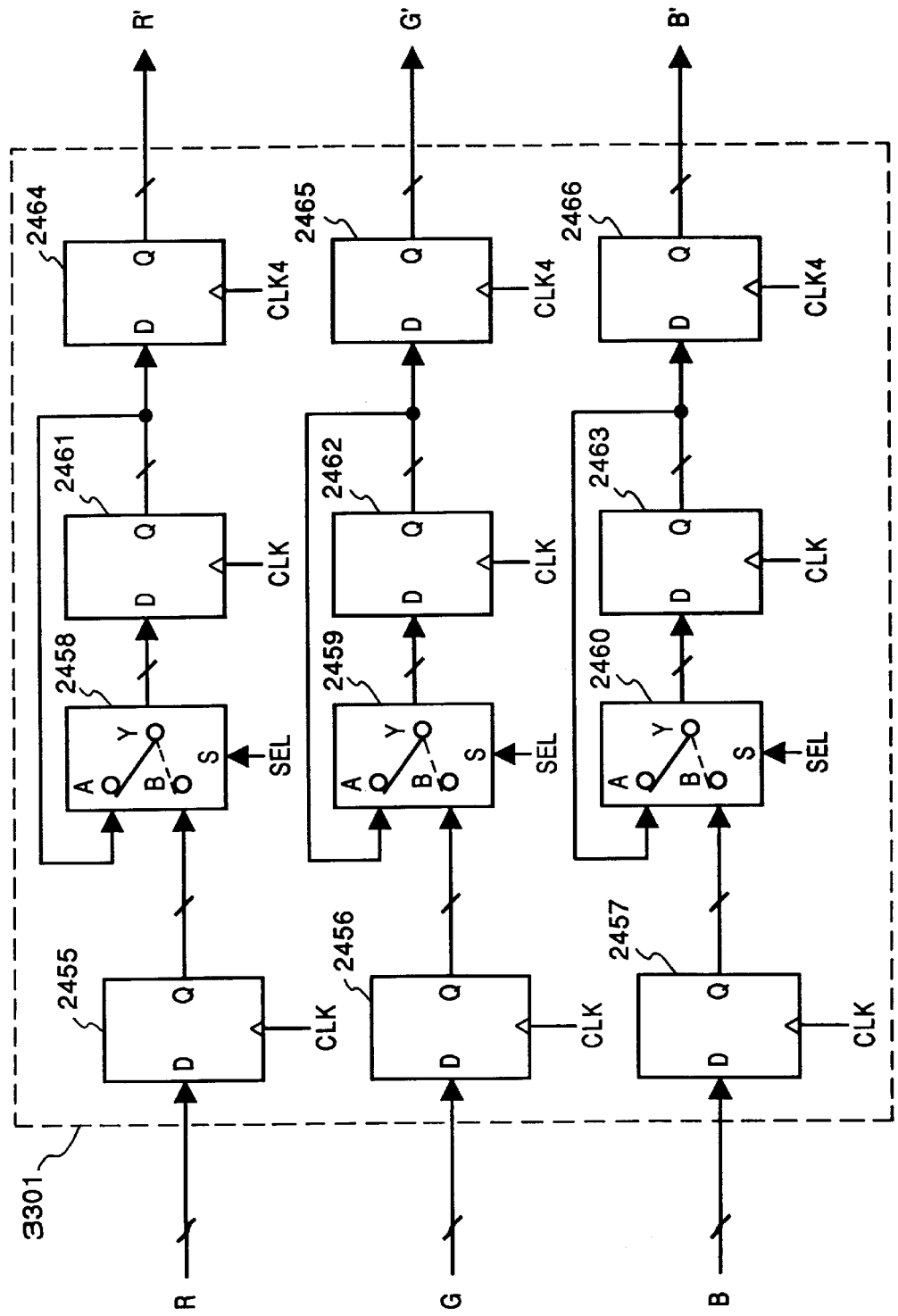
FIGS. 41A and 41B are block showing an example of the construction of a thinning-out circuit and frequency divider circuit according to the ninth embodiment.
Figure 41B:
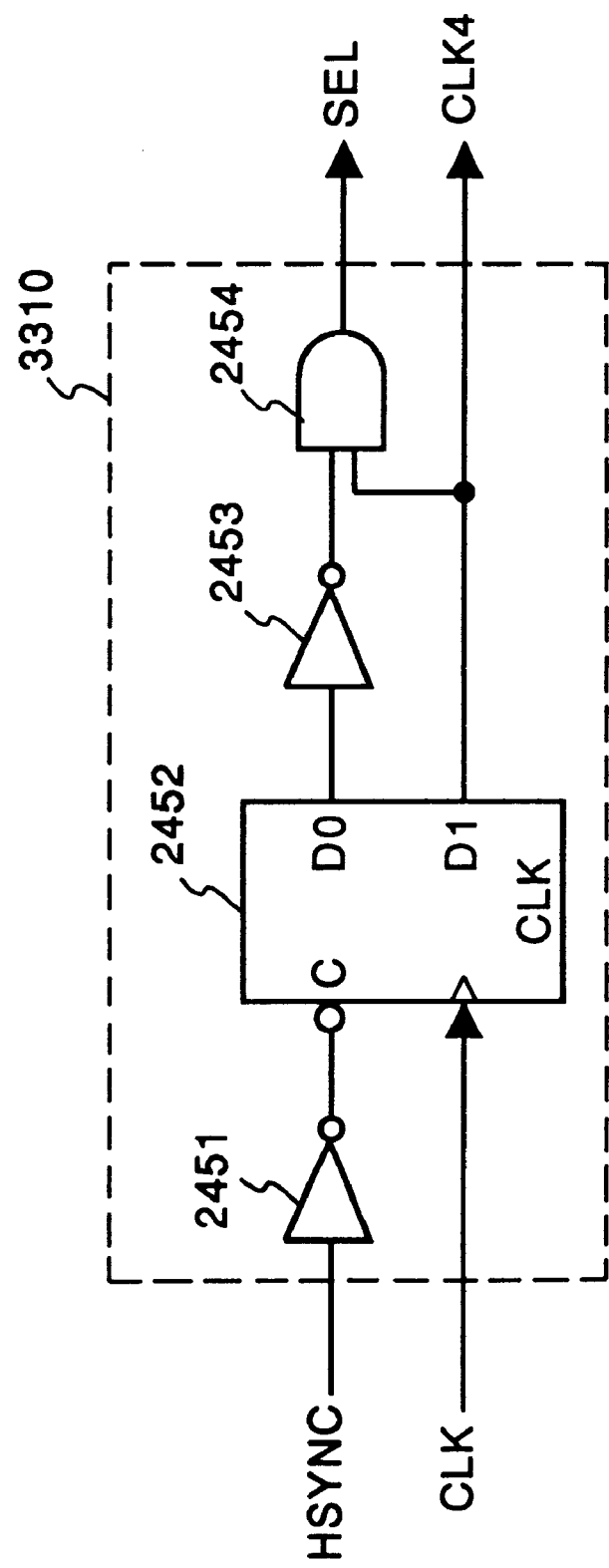

The signal CLK4 and signal SEL are produced by a frequency divider circuit 3310, the construction of which is illustrated in FIG. 41B. Specifically, the frequency divider circuit 3310 is constituted by an inverter 2451, a two-bit counter 2452, an inverter 2453 and an AND gate 2454. After being cleared (initialized) by the HSYNC signal, the two-bit counter 2452 counts the CLK signal and outputs the counted value in the form of two bits. The higher order bit D1 of the counter is outputted as the CLK4 signal, and the result of taking the AND between the higher order bit D1 signal and a signal obtained by inverting the lower order bit D0 of the counter is outputted as the SEL signal.

The thinning-out circuit 3301, an example of the construction of which is shown in FIG. 41A, comprises flip-flops 2455~2457 and 2461~2463, which hold data in response to the CLK signal, selectors 2458~2460, and flip-flops 2464~2466 that hold data in response to CLK4. As shown by the example of FIG. 40, the R (or G, B) signal transferred by the CLK signal is thinned out at a ratio of ¼, and an R' (or G', B') signal synchronized to CLK4 can be obtained.

Decision Means

Figure 42:
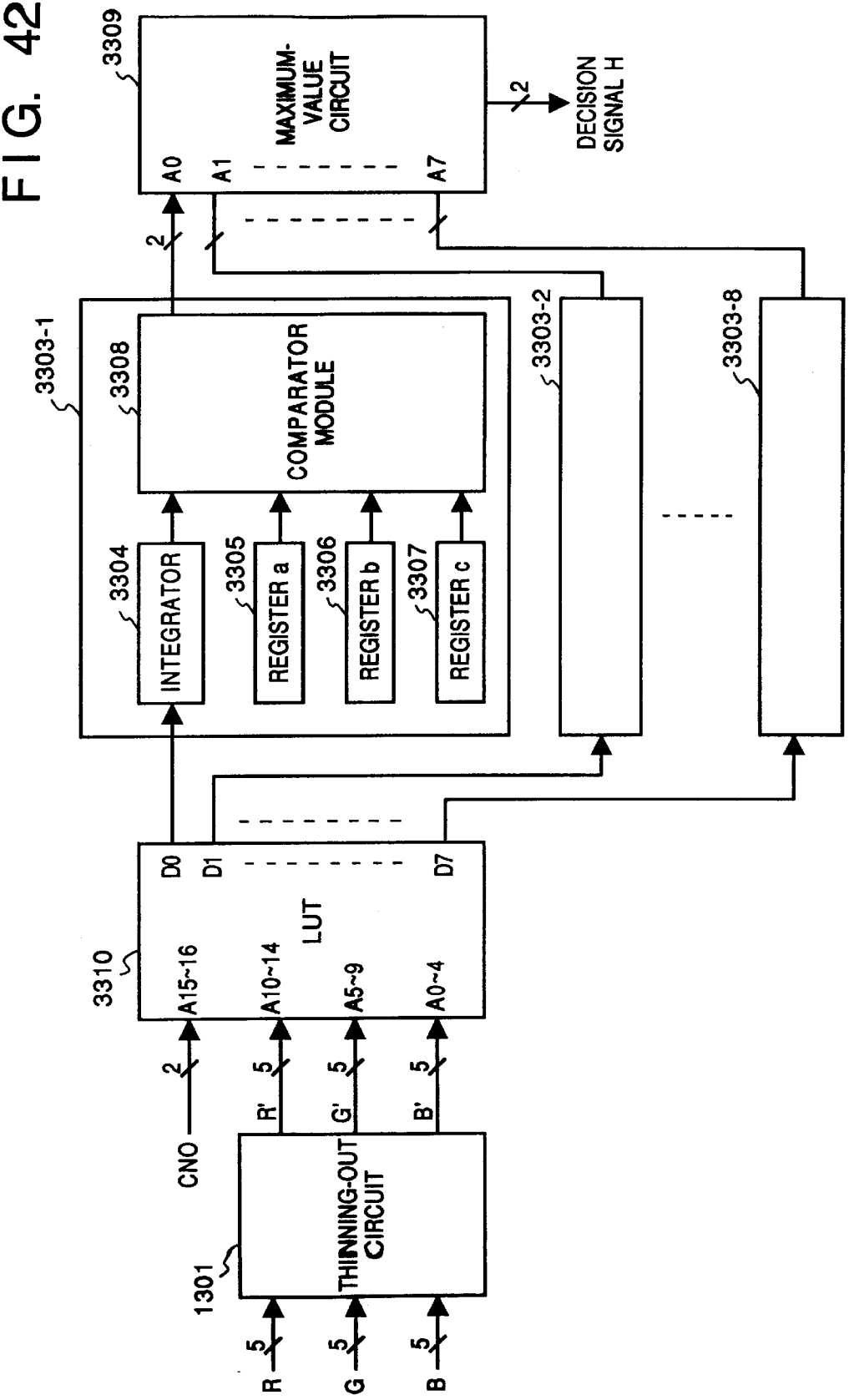
FIG. 42 is a block diagram showing an example of the construction of a decision circuit according to the ninth embodiment.

FIG. 42 is a block diagram showing an example of the construction of the decision circuit 2409.

In FIG. 42, numeral 3301 denotes the thinning-out circuit the example of which is shown in FIG. 41A. This circuit outputs image data obtained by thinning out some of the data in the input image in order to lighten the processing load of the decision circuit 2409.

Numeral 3310 denotes a look-up table LUT constituted by a ROM for matching colors with a plurality of types of specific originals. To this end, the distribution of the shades of color of eight types of specific originals is investigated in advance, and it is determined whether the color shade of an input image coincides with the color shades of the specific originals. Judgment information indicating whether or not coincidence is obtained is stored in the LUT 3310.

The output-color selection signal CNO is inputted to the address terminals of the two higher order bits of the LUT 3310, and the five higher order bits of the thinned-out image signal of each of the colors R, G, B are inputted to the 15 lower order bits of the LUT.

Signals indicative of whether or not the shades of color of relevant pixels agree with the shades of color in, say, eight types of specific originals are outputted simultaneously in correspondence with eight-bit data with regard to the value of the color-output selection CNO signal. In the four reading operations, decisions are rendered with regard to a total of 32 types of specific originals.

Numerals 3303-1 through 3303-8 denote color-shade judging circuits, each of which is composed of identical hardware, namely an integrator 3304, registers 3305~3307 and a comparator module 3308. Each color-shade judging circuit outputs a two-bit signal that indicates the likelihood that an input image contains the image of a specific original.

Numeral 3309 denotes a maximum-value circuit for outputting, in the form of a two-bit decision signal H, the maximum value of the decision outputs produced by the color-shade judging circuits 3303-1 through 3303-8. That is, the maximum-value circuit 3309 delivers the result of judgment as a decision signal H indicating which of the plurality of specific originals is most likely to be present in the image of the original that has been read.

Integrator

Figure 43:
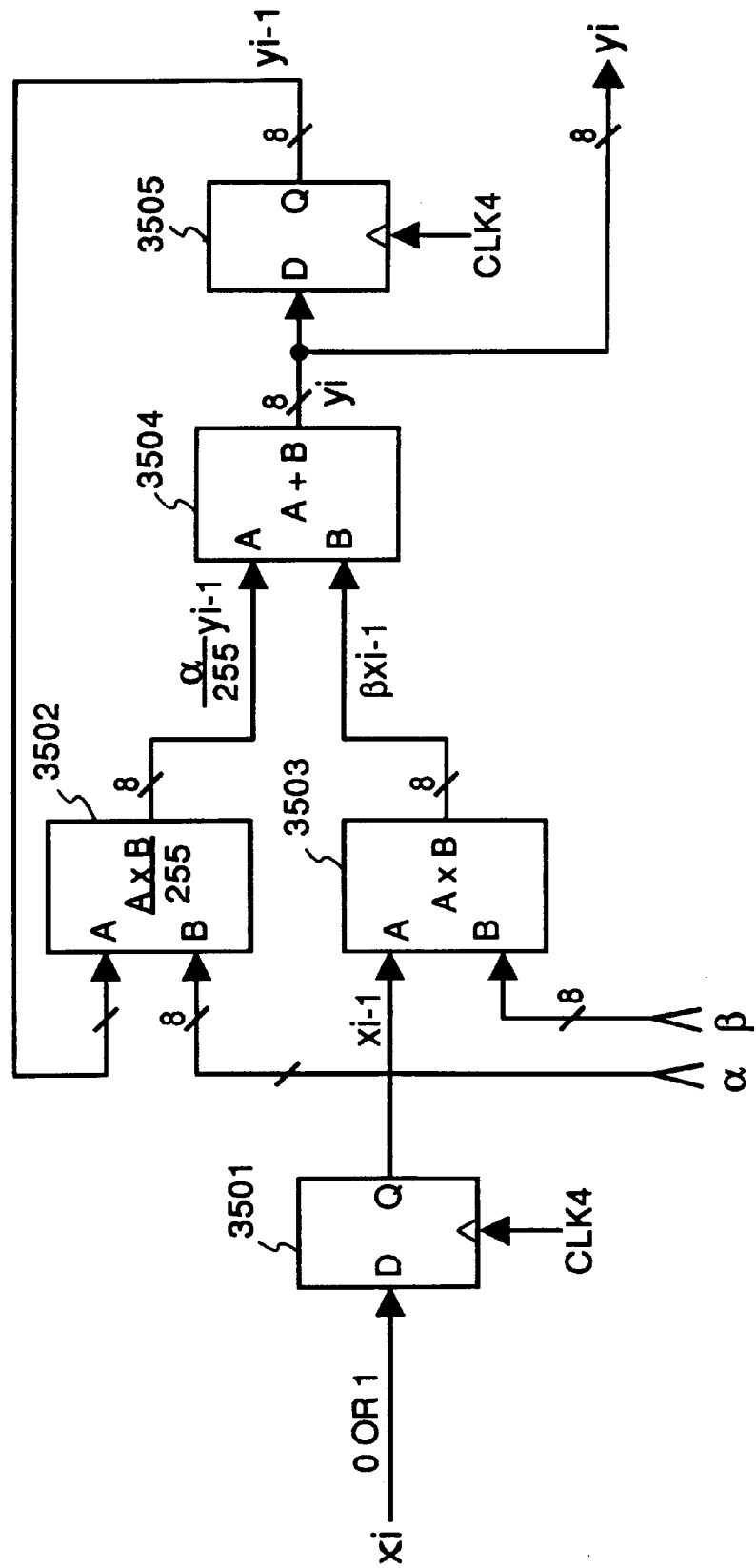
FIG. 43 is a block diagram showing the construction of an integrator according to the ninth embodiment.

FIG. 43 is a block diagram showing an example of the construction of the integrator 3304.

Numerals 3501, 3505 denote flip-flops which hold data at the timing of the leading edge of the CLK4 signal. Numeral 3502 denotes a multiplier to which two eight-bit signals (A, B) are inputted. The multiplier 3502 multiplies these signals together and outputs an eight-bit signal $$\left(\frac{A \times B}{255}\right)$$

as the result. Numeral 3503 denotes a multiplier to which a one-bit input signal (A) and an eight-bit input signal (B) are applied. The multiplier 3503 multiplies these signals together and outputs an eight-bit signal (A×B) as the result.

Numeral 3504 denotes an adder to which two eight-bit signals (A, B) are inputted. The adder 3504 adds these signals together and outputs an eight-bit signal (A+B) as the result.

Accordingly, in the integrator 3304 of this embodiment, the relationship between a two-valued input signal $x_1$ and an eight-bit output signal $y_i$ is expressed by the following equation:

$$y_i = (\alpha/255) \cdot y_{i-1} + \beta \cdot x_{i-1} \quad (1)$$

where $\alpha$ and $\beta$ represent constants that have been preset. The various characteristics of the integrator 3304 are decided by the sizes of these values.

FIG. 44A and FIG. 44B illustrate an example of input and output of the integrator 3304 in a case where $\alpha=247$, $\beta=8$ holds, by way of example. More specifically, an output $y_i$ of the kind shown in FIG. 44A is produced in response to an input $x_i$ of the kind shown in FIG. 44B.

An input $x_i$ of "1" regardless of the fact that the values on other either side thereof are almost "0", as at points 2701, 2702, and an input $x_i$ "0" regardless of the fact that the values on either side thereof almost "1", as at point 2703, may be considered to be noise. The noise can be removed using the comparator module 3308 to binarize $y_i$, which is obtained by integrating the input $x_i$ using the integrator 3304, based upon threshold values R1~R3 set in the registers 3305~3307, examples of these threshold values being indicated at 2704~2706, respectively, in FIG. 44A.

Comparator

Figure 45:
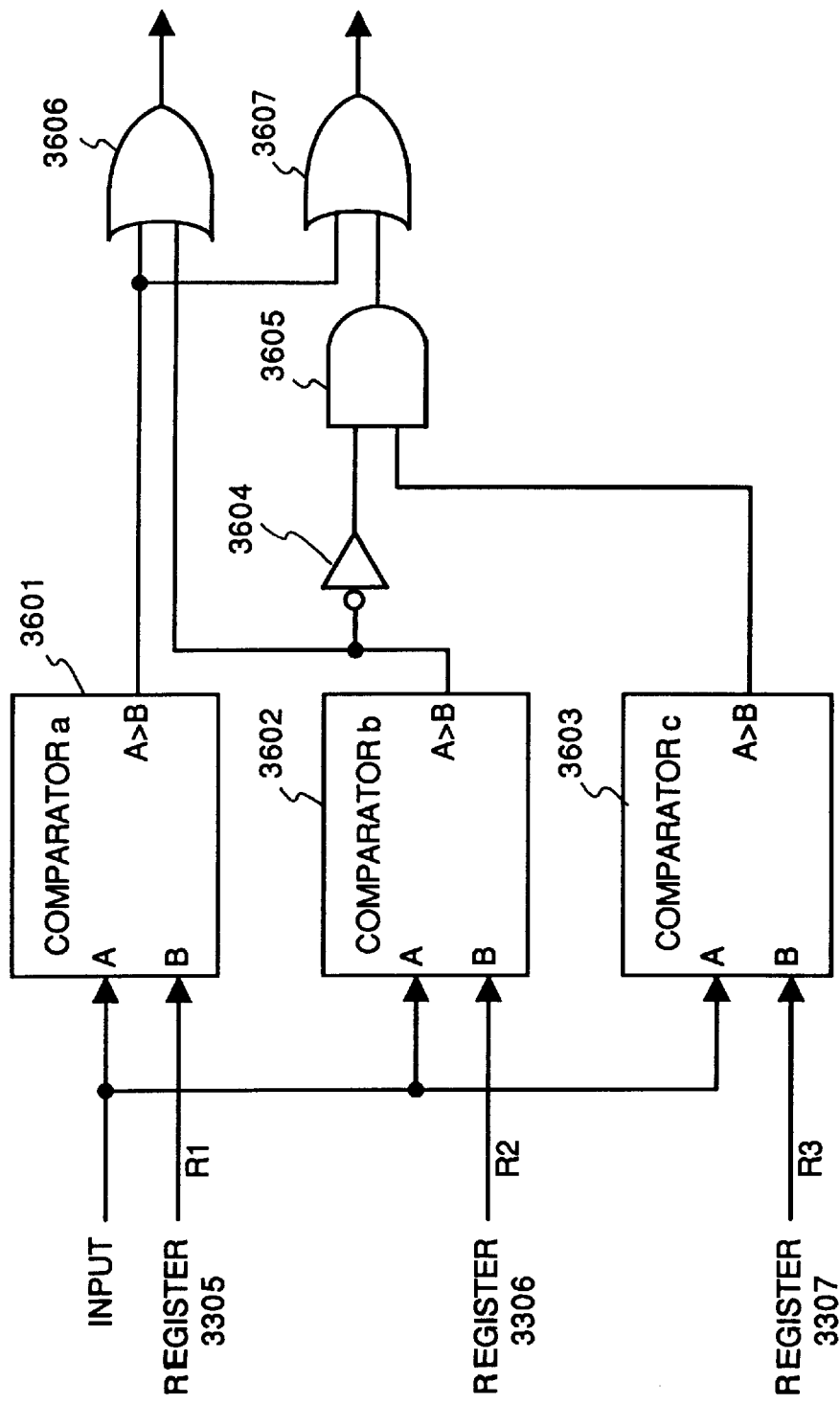
FIG. 45 is a block diagram showing the construction of a comparator according to the ninth embodiment.

FIG. 45 is a block diagram showing an example of the construction of the comparator module 3308. In FIG. 45, 3601~3603 denote comparators, 3604 an inverter, 3605 an AND gate, and 3606, 3607 OR gates. The threshold values R1~R3, which satisfy the relation R1>R2>R3, are set in the registers 3305~3307.

More specifically, the comparator module 3308 outputs "11", "10", "01" and "00" when the following hold: R1<(input), R2<(input)≦R1, R3<(input)≦R2, (input)≦R3, respectively.

Pattern Adding Circuit

Figure 46:
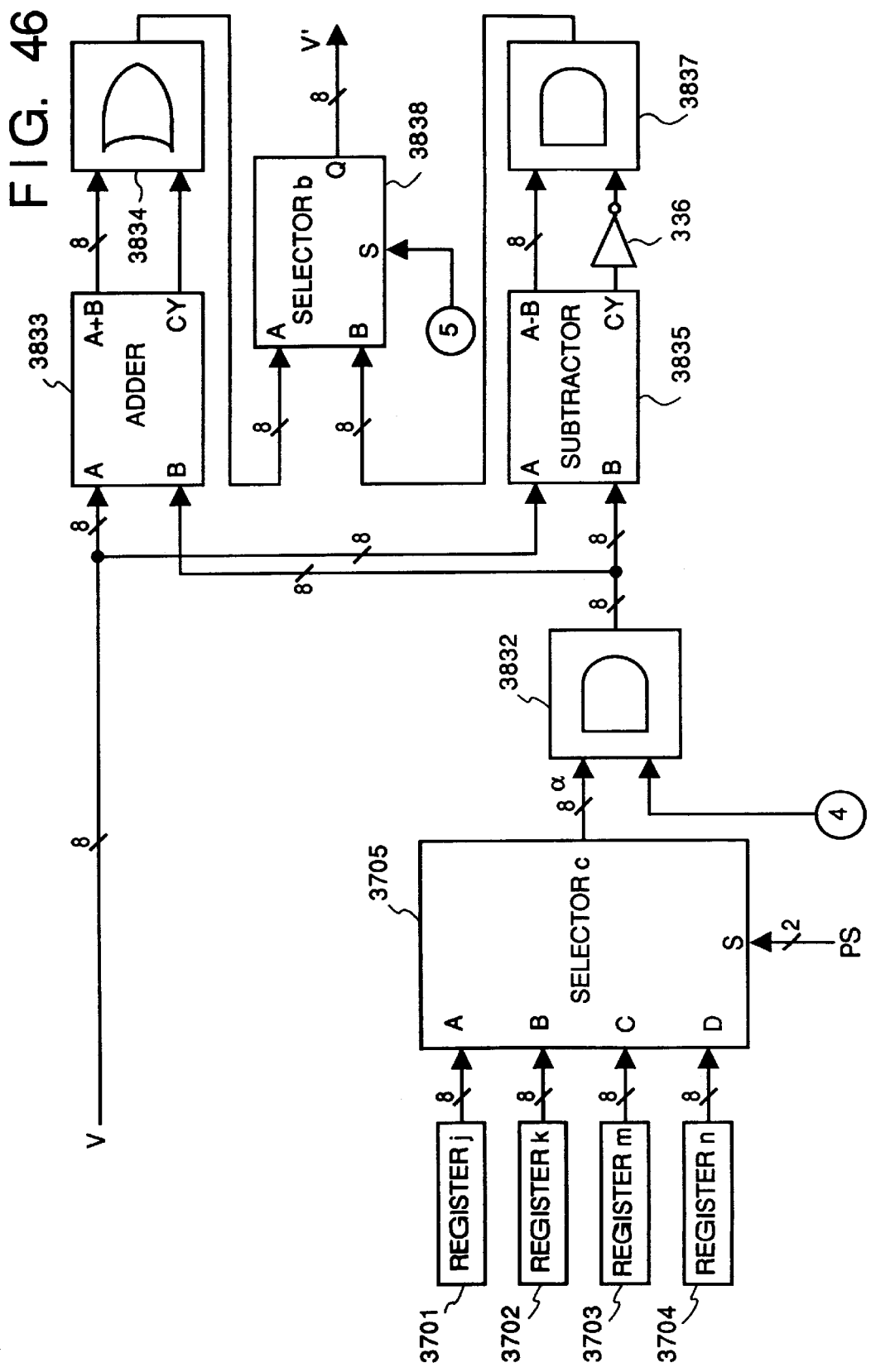
FIGS. 46, 47 and 48 are block diagrams showing examples of the construction of a pattern adding circuit according to the ninth embodiment.
Figure 47:
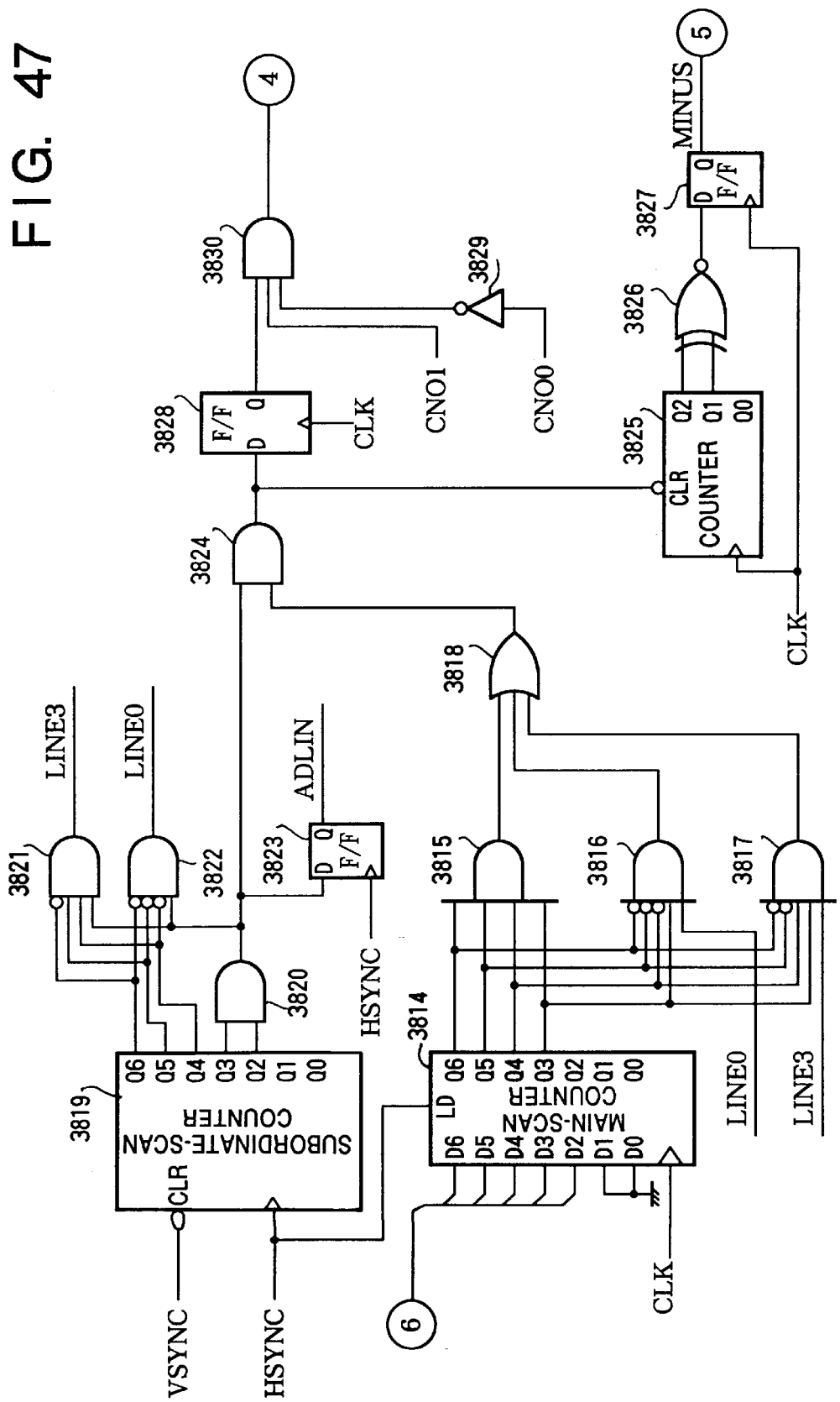
Figure 48:
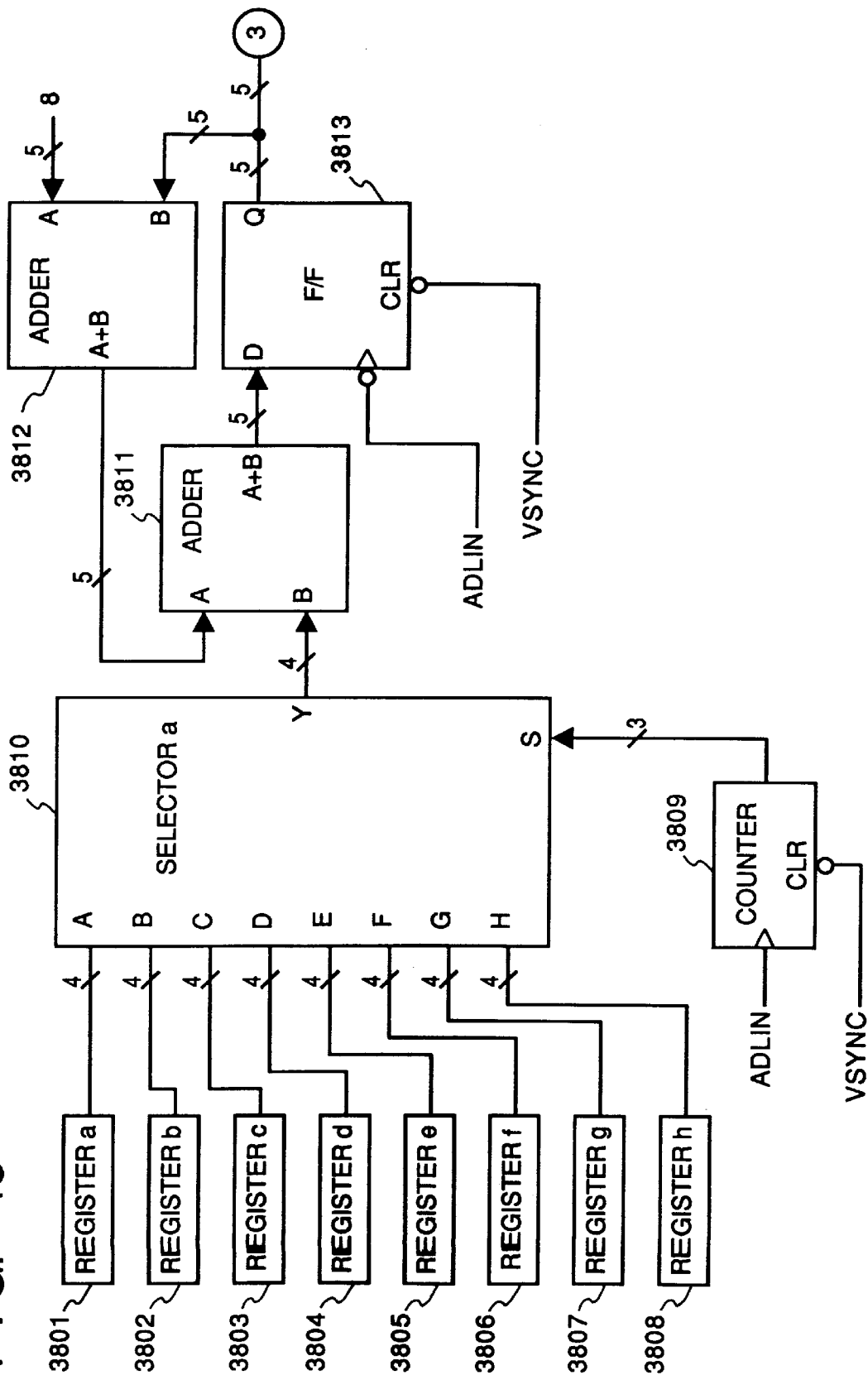

FIGS. 46, 47 and 48 are block diagrams showing and example of the construction of the pattern adding circuit 2410 according to this embodiment.

The difference between the pattern adding circuit of the ninth embodiment shown in FIGS. 46, 47 and 48 and the pattern adding circuit of the eighth embodiment shown in FIGS. 35, 36 and 37 is that there are four registers which store amounts of modulation in this embodiment but only one register, which stores the modulation amount α, in the eighth embodiment. Accordingly, in the ninth embodiment, the arrangement is such that the modulation amounts $\alpha_1 \sim \alpha_4$ stored in the four registers are selected by a selector 3705.

In FIGS. 46, 47 and 48, numerals 3701~3704 denote the registers, in which the different modulation amounts $\alpha_1 \sim \alpha_4$, respectively, are stored.

Numeral 3705 denotes a 4-input/1-output selector which, in dependence upon the pattern-level selecting signal PS outputted by the CPU 2411, selects one of the modulation amounts $\alpha_1 \sim a_4$ stored by the registers 3701~3704 and outputs the selected value to an AND gate 3832.

The amounts of modulation are set to satisfy the relation $\alpha_1 < \alpha_2 < \alpha_3 < \alpha_4$. The selector 3705 outputs $\alpha_1$ in case of PS="00", $\alpha_2$ in case of PS="01", $\alpha_3$ in case of PS="10", and $\alpha_4$ in case of PS="11". Accordingly, the output V' of the selector 3838 is modulated to V±$\alpha_1$ in case of PS="00", to V±$\alpha_2$ in case of PS="01", to V±$\alpha_3$ in case of PS="10" and to V±$\alpha_4$ in case of PS="11".

In other words, the modulation amount α is varied in dependence upon the possibility that a specific original will be present in an input image. In an ordinary input image, a pattern is added to a degree almost unidentifiable by the human eye. The pattern is added to the output image more conspicuously the greater the possibility that the specific original is present in the output image.

Flowchart

Figure 49:
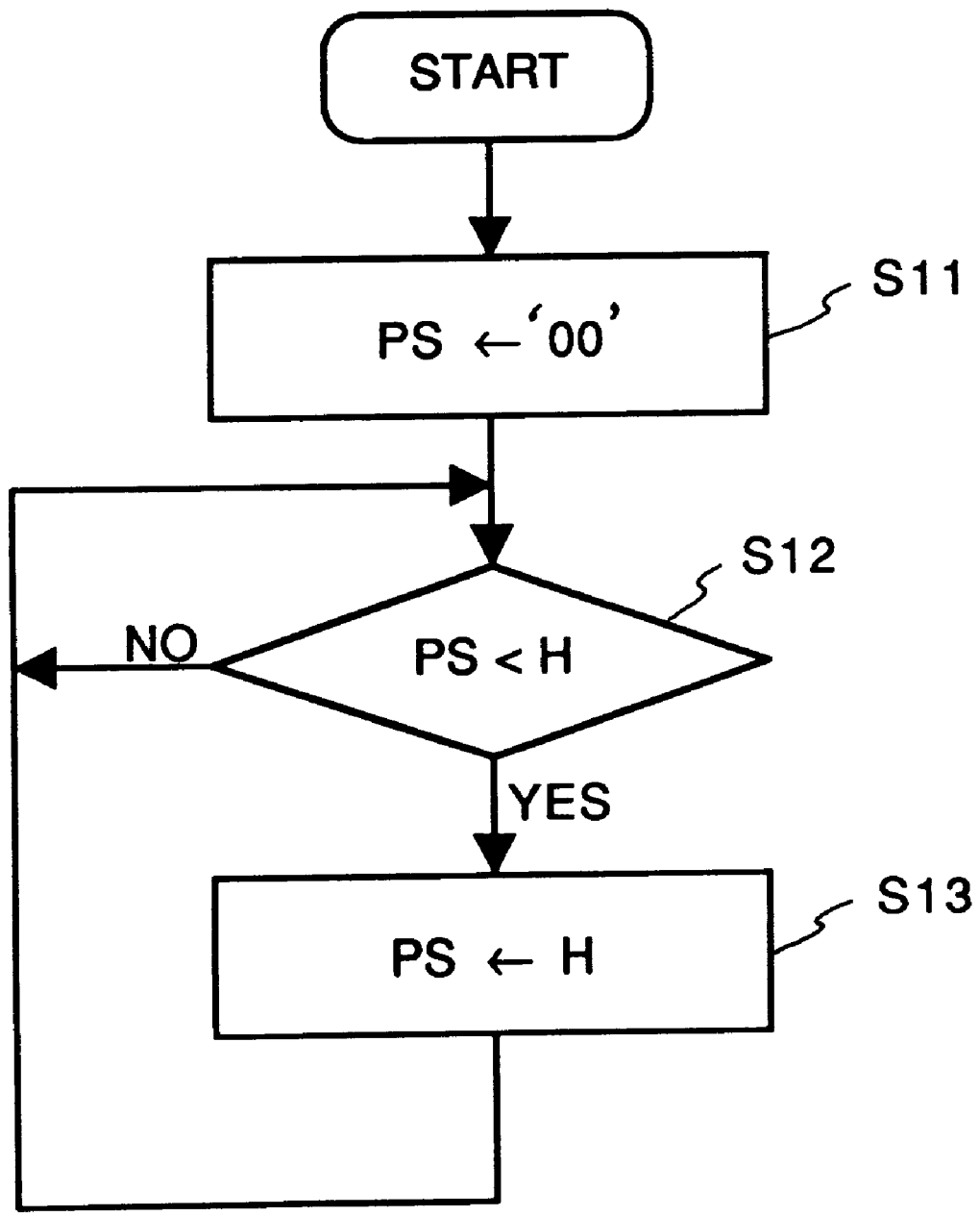
FIG. 49 is a flowchart showing an example of the setting of a pattern-level selecting signal according to the ninth embodiment.

FIG. 49 is a flowchart for describing an example of flow relating to setting of the pattern-level selecting signal PS executed by the CPU 2411.

Immediately after a copying operation starts, the CPU 2411 initializes the pattern-level selecting signal PS to "00" at step S11. Next, the CPU 2411 compares the decision level H and the value of PS at step S12. The CPU 2411 sets the value of the decision signal H to the pattern-level selecting signal PS at step S13 if the result of comparison is such that PS<H holds, and returns the program to step S12 if PS≧H holds.

Thus, the maximum value of the decision signal H from the start of copying until the present time is set to the pattern-level selecting signal PS.

Thus, in accordance with the ninth embodiment as described above, effects similar to those of the eighth embodiment are obtained. In addition, since a pattern added to an output image that does not contain a specific original can be made ore difficult for the human eye to discriminate, a deterioration in the picture quality of an ordinary output image can be made very small.

Accordingly, this embodiment is particularly effective when color reproducibility is important, such as when making color copies for design purposes. In a case where image data in a host computer is to be printed out by a color copying machine or the like via an external interface, a deterioration in the picture quality of colorless areas can be minimized when printing computer graphics, for example.

In this embodiment, it is assumed that the added pattern represents a manufacturing number specific to the apparatus, or the manufacturing number in the form of a code or symbols. However, this does not impose a limitation upon the invention. The pattern may represent any information capable of specifying the apparatus, such as the date of manufacture, the lot number and the version number thereof.

Furthermore, instead of representing information capable of specifying the apparatus, the added pattern may be information capable of specifying the person using the apparatus. For example, copying machines already known include those which require insertion of an ID card for specifying the user and those requiring entry of an ID number in order for the machine to be used. In copying machines of this kind, the recognized ID number or the ID number in the form of a code or symbols may be added as the specific pattern. It is also possible to include the date and time a copy was made, or the date and time in the form of a code or symbols.

Furthermore, the pattern addition described above may be performed not only by an adder but by a multiplier as well. Moreover, the arrangement for performing pattern addition may be provided not only in an image scanner but also in a host computer, a printer interface or the printer itself.

The present invention can be applied to a system (a copying system, for example) constituted by a plurality of devices or to an apparatus (an image scanner or a printer, for example) comprising a single device. Furthermore, it goes without saying that the invention is applicable also to a case where the object of the invention is attained by supplying a program to a system or apparatus.

Thus, in accordance with the present invention as described above, it is possible to provide an image processing method and apparatus in which there is little deterioration in picture quality when specific information is added to image data.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting a plurality of color component data;

adding means for adding a predetermined number of unit dots to partial color component data of said plurality of color component data inputted by said input means so that the predetermined number of unit dots are not recognizable to human eyes, the partial color component data representing predetermined additional information and including less than all of the plurality of color component data; and output means for outputting all the plurality of color component data including the partial color component data to which the predetermined number of unit dots have been added, wherein the predetermined number of unit dots have a same shape, the predetermined additional information is represented by a dot arrangement of the predetermined number of unit dots, and each unit dot includes first and second areas, and wherein said adding means increases a density of a first area of each unit dot and decreases a density of a second area of each unit dot, thereby preserving a density in each unit dot.

2. The image processing apparatus according to claim 1, wherein said plurality of color components data include yellow, magenta and cyan, and the partial color component data comprises yellow.

3. The apparatus according to claim 1, wherein the predetermined additional information comprises information for identifying the image processing apparatus.

4. The apparatus according to claim 1, wherein the predetermined additional information comprises information for identifying a person who used the image processing apparatus.

5. The apparatus according to claim 1, wherein said adding means adds same additional information at repeated positions of the partial color component data.

6. The apparatus according to claim 1, wherein the additional information is represented by a distance between two unit dots included in the predetermined number of unit dots.

7. The apparatus according to claim 1, wherein the predetermined number of unit dots are not adjacent to each other.

8. The apparatus according to claim 1, wherein each unit dot further comprises a third area, and said adding means does not change a density of the third area of each unit dot.

9. The apparatus according to claim 1, wherein said output means comprises image forming means in accordance with an electrophotographic process.

10. An image processing method comprising:

the input step of inputting a plurality of color component data;

the adding step of adding a predetermined number of unit dots to partial color component data of the plurality of color component data inputted in said input step so that the predetermined number of unit dots are not recognizable to human eyes, the partial color component data representing predetermined additional information and including less than all of the plurality of color component data; and the output step of outputting all of the plurality of color component data including the partial color component data to which the predetermined number of unit dots have been added, wherein the predetermined number of unit dots have a same shape, the predetermined additional information is represented by a dot arrangement of the predetermined number of unit dots, and each unit dot includes first and second areas, and wherein said adding step increases a density of a first area of each unit dot and decreases a density of a second area of each unit dot, thereby preserving a density in each unit dot.

* * * * *

UNITED STATES PATENT AND TRADEMARK OFFICE
CERTIFICATE OF CORRECTION

| | |
|---|---|
| PATENT NO. : 6,166,750 | |
| DATED : December 26, 2000 | |
| INVENTOR(S) : Akira Negishi | |

It is certified that error appears in the above-identified patent and that said Letters Patent is hereby corrected as shown below:

Title page,
References Cited item [56],
FOREIGN PATENT DOCUMENTS
"0342060    11/1989    European Pat. Off. ." should be deleted.
"01061777" should read -- 1-061777 --.
"60229572    11/1992    Japan." should be deleted.

Column 1,
Line 26, "if" should be deleted.

Column 2,
Line 67, "on to" should read -- onto --.

Column 4,
Line 40, "33 and 34A" should read -- 33, 34A --.
Line 52, "block" should read -- block diagrams --.
Line 60, "diagram" should read -- diagrams --.

Column 5,
Line 59, "in dependence" should read -- depending --.

Column 6,
Line 34, 'operation," should read -- operation. --.

Column 10,
Line 14, "a" should be deleted.

Column 16,
Line 36, "2401 and 2401." should read -- 2401 and 2402. --
Line 45, "operation," should read -- operation. --.

Column 19,
Line 17, "a" should read -- $\alpha$ --.

Column 20,
Line 48, "additional" should read -- additionally --.

Column 22,
Line 54, "thereof" should read --thereof are --.

UNITED STATES PATENT AND TRADEMARK OFFICE
CERTIFICATE OF CORRECTION

PATENT NO. : 6,166,750
DATED : December 26, 2000
INVENTOR(S) : Akira Negishi

It is certified that error appears in the above-identified patent and that said Letters Patent is hereby corrected as shown below:

Column 23,
Line 6, "and" should read -- an --.
Line 23, "$\alpha_1 \sim a_4$" should read -- $\alpha_1 \sim \alpha_4$ --.
Line 58, "ore" should read -- more --.

Column 25,
Line 2, "components" should read -- component --.

Signed and Sealed this

Fourth Day of December, 2001

Attest:

NICHOLAS P. GODICI
Attesting Officer
Acting Director of the United States Patent and Trademark Office